United States Patent
Mendell et al.

(10) Patent No.: US 10,385,258 B2
(45) Date of Patent: *Aug. 20, 2019

(54) GAS DIVERTER FOR WELL AND RESERVOIR STIMULATION

(71) Applicants: Highlands Natural Resources, Plc, Beckenham (GB); Diversion Technologies, LLC, Denver, CO (US)

(72) Inventors: Paul E. Mendell, Castle Rock, CO (US); Stephen Miller, Arvada, CO (US)

(73) Assignees: Highlands Natural Resources, PLC, Beckenham, Kent (GB); Diversion Technologies, LLC, Castle Rock, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,713

(22) Filed: Jan. 12, 2018

(65) Prior Publication Data

US 2018/0135397 A1 May 17, 2018

Related U.S. Application Data

(63) Continuation of application No. 14/957,182, filed on Dec. 2, 2015, which is a continuation-in-part of (Continued)

(51) Int. Cl.
*E21B 43/26* (2006.01)
*C09K 8/594* (2006.01)
(Continued)

(52) U.S. Cl.
CPC ............ *C09K 8/594* (2013.01); *C09K 8/62* (2013.01); *C09K 8/703* (2013.01); *C09K 8/94* (2013.01); *E21B 43/26* (2013.01); *E21B 43/261* (2013.01)

(58) Field of Classification Search
CPC combination set(s) only.
See application file for complete search history.

(56) References Cited

U.S. PATENT DOCUMENTS 2,813,583 A 11/1957 Marx et al.
2,818,118 A 12/1957 Dixon
(Continued)

FOREIGN PATENT DOCUMENTS

CA 540544 5/1957
CA 568839 1/1959
(Continued)

OTHER PUBLICATIONS

US 6,817,413 B2, 11/2004, Stephenson et al. (withdrawn)
(Continued)

*Primary Examiner* — Angela M DiTrani Leff
(74) *Attorney, Agent, or Firm* — Sheridan Ross P.C.

(57) ABSTRACT

The disclosure provides fracturing methods having advantage over current fracturing methods. The disclosed fracturing methods can change the fracture gradient of the downhole subterranean formation. For example, one or more of the fracture gradients of the low and high stress zones of the downhole subterranean formation can be changed. Furthermore, in relation to current practices, the methods can decrease the extent and/or degree of fracturing within low stress downhole formations and increase the degree of fracturing within high stress formations.

33 Claims, 21 Drawing Sheets

Related U.S. Application Data application No. 14/728,719, filed on Jun. 2, 2015, now Pat. No. 9,759,053, which is a continuation-in-part of application No. 14/690,208, filed on Apr. 17, 2015, now Pat. No. 9,828,843.

(60) Provisional application No. 62/145,439, filed on Apr. 9, 2015, provisional application No. 62/260,090, filed on Nov. 25, 2015, provisional application No. 62/250,365, filed on Nov. 3, 2015, provisional application No. 62/250,361, filed on Nov. 3, 2015, provisional application No. 62/248,907, filed on Oct. 30, 2015, provisional application No. 62/248,890, filed on Oct. 30, 2015, provisional application No. 62/209,201, filed on Aug. 24, 2015, provisional application No. 62/196,485, filed on Jul. 24, 2015.

(51) Int. Cl.
*C09K 8/62* (2006.01)
*C09K 8/70* (2006.01)
*C09K 8/94* (2006.01)

(56) References Cited

U.S. PATENT DOCUMENTS

| | | |
|---|---|---|
| 2,824,834 A | 2/1958 | Cardwell et al. |
| 2,847,202 A | 8/1958 | Pullen et al. |
| 2,880,587 A | 4/1959 | Hendrix et al. |
| 2,889,884 A | 6/1959 | Henderson et al. |
| 2,896,719 A | 7/1959 | Hill |
| 2,919,909 A | 1/1960 | Rule |
| 2,944,803 A | 7/1960 | Hanson |
| 2,946,382 A | 7/1960 | Tek et al. |
| 2,952,449 A | 9/1960 | Bays |
| 2,962,095 A | 11/1960 | Morse |
| 2,970,645 A | 2/1961 | Glass |
| 2,970,826 A | 2/1961 | Woodruff |
| 2,978,025 A | 4/1961 | Clark |
| 2,979,317 A | 4/1961 | Bays |
| 3,018,095 A | 1/1962 | Redlinger |
| 3,058,730 A | 10/1962 | Bays |
| 3,077,930 A | 2/1963 | Beckett |
| 3,086,760 A | 4/1963 | Bays |
| 3,097,690 A | 7/1963 | Terwilliger |
| 3,100,528 A | 8/1963 | Plummer et al. |
| 3,103,975 A | 9/1963 | Hanson |
| 3,105,545 A | 10/1963 | Prats et al. |
| 3,108,636 A | 10/1963 | Peterson |
| 3,111,988 A | 11/1963 | Davis et al. |
| 3,126,962 A | 3/1964 | Blood |
| 3,129,758 A | 4/1964 | Closmann |
| 3,129,761 A | 4/1964 | Staadt |
| 3,134,438 A | 5/1964 | Huitt et al. |
| 3,138,205 A | 6/1964 | Kerver et al. |
| 3,139,930 A | 7/1964 | Hudgins et al. |
| 3,145,772 A | 8/1964 | Huitt |
| 3,159,216 A | 12/1964 | Reed et al. |
| 3,172,470 A | 3/1965 | Huitt et al. |
| 3,189,092 A | 6/1965 | Bodine |
| 3,205,942 A | 9/1965 | Sandberg |
| 3,221,813 A | 12/1965 | Closmann et al. |
| 3,227,211 A | 1/1966 | Gilchrist |
| 3,228,470 A | 1/1966 | Papaila |
| 1,324,547 A | 4/1966 | Henry |
| 3,246,693 A | 4/1966 | Crider |
| 3,270,813 A | 9/1966 | Gilchrist |
| 3,270,816 A | 9/1966 | Staadt |
| 3,280,909 A | 10/1966 | Closmann et al. |
| 3,280,910 A | 10/1966 | Crider |
| 3,303,883 A | 2/1967 | Slusser et al. |
| 3,322,194 A | 5/1967 | Strubhar |
| 3,329,207 A | 7/1967 | Shock et al. |
| 3,331,206 A | 7/1967 | Osborne |
| 3,342,258 A | 9/1967 | Prats |
| 3,342,261 A | 9/1967 | Bond et al. |
| 3,346,044 A | 10/1967 | Slusser |
| 3,349,845 A | 10/1967 | Holbert et al. |
| 3,353,602 A | 11/1967 | Geertsma |
| 3,358,756 A | 12/1967 | Vogel |
| 3,361,201 A | 1/1968 | Howard |
| 3,362,471 A | 1/1968 | Slusser et al. |
| 3,366,176 A | 1/1968 | Parrish |
| 3,369,605 A | 2/1968 | Donaldson et al. |
| 3,379,250 A | 4/1968 | Matthews et al. |
| 3,385,359 A | 5/1968 | Offeringa |
| 3,386,513 A | 6/1968 | Holmes |
| 3,396,791 A | 8/1968 | Meurs et al. |
| 3,399,721 A | 9/1968 | Strange |
| 3,407,003 A | 10/1968 | Dune |
| 3,410,345 A | 11/1968 | Melvin |
| 3,417,817 A | 12/1968 | Moore |
| 3,427,652 A | 2/1969 | Seay |
| 3,436,919 A | 4/1969 | Shock et al. |
| 3,439,742 A | 4/1969 | Durie |
| 3,455,383 A | 7/1969 | Prats |
| 3,468,376 A | 9/1969 | Bramhall |
| 3,474,862 A | 10/1969 | Hubert |
| 3,481,398 A | 12/1969 | Prats |
| 3,500,911 A | 3/1970 | Farley et al. |
| 3,500,913 A | 3/1970 | Closmann et al. |
| 3,501,201 A | 3/1970 | Closmann et al. |
| 3,510,167 A | 5/1970 | Carmody |
| 3,513,100 A | 5/1970 | Stogner |
| 3,525,398 A | 8/1970 | Fisher |
| 3,528,501 A | 9/1970 | Parker |
| 3,537,528 A | 11/1970 | O'Brien et al. |
| 3,537,529 A | 11/1970 | Timmerman |
| 3,542,131 A | 11/1970 | Walton et al. |
| 3,547,198 A | 12/1970 | Slusser |
| 3,565,173 A | 2/1971 | Anderson |
| 3,572,838 A | 3/1971 | Templeton |
| 3,574,402 A | 4/1971 | Davis et al. |
| 3,575,240 A | 4/1971 | Rhoades |
| 3,578,080 A | 5/1971 | Closmann |
| 3,598,183 A | 8/1971 | Scott |
| 3,599,714 A | 8/1971 | Becker et al. |
| 3,602,311 A | 8/1971 | Whitsitt |
| 3,606,465 A | 9/1971 | Hanson |
| 3,612,179 A | 10/1971 | Anderson et al. |
| 3,612,608 A | 10/1971 | Manker et al. |
| 3,613,789 A | 10/1971 | Son, Jr. |
| 3,630,278 A | 12/1971 | Parker |
| 3,670,816 A | 6/1972 | Chenevert |
| 3,674,089 A | 7/1972 | Moore |
| 3,682,246 A | 8/1972 | Closmann |
| 3,688,843 A | 9/1972 | Nordyke |
| 3,698,478 A | 10/1972 | Parker |
| 3,709,295 A * | 1/1973 | Braunlich, Jr. ......... E21B 43/17 166/245 |
| 3,710,114 A | 1/1973 | Vann |
| 3,711,405 A | 1/1973 | Pye et al. |
| 3,727,690 A | 4/1973 | Munson |
| 3,734,180 A | 5/1973 | Rhoades |
| 3,739,851 A | 6/1973 | Beard |
| 3,747,681 A | 7/1973 | Davis et al. |
| 3,752,233 A | 8/1973 | Knight et al. |
| 3,753,594 A | 8/1973 | Beard |
| 3,759,574 A | 9/1973 | Beard |
| 3,775,073 A | 11/1973 | Rhoades |
| 3,779,601 A | 12/1973 | Beard |
| 3,810,510 A | 5/1974 | Fitch et al. |
| 3,814,185 A | 6/1974 | Boardman |
| 3,828,854 A | 8/1974 | Templeton et al. |
| 3,835,928 A | 9/1974 | Strubhar et al. |
| 3,838,738 A | 10/1974 | Redford et al. |
| 3,841,402 A | 10/1974 | Knight et al. |
| 3,845,632 A | 11/1974 | Slobod et al. |
| 3,854,531 A | 12/1974 | Carlin |
| 3,854,533 A | 12/1974 | Gurley et al. |
| 3,858,658 A | 1/1975 | Strubhar |
| 3,863,709 A | 2/1975 | Fitch |

(56) References Cited

U.S. PATENT DOCUMENTS

| | | | |
|---|---|---|---|
| 3,872,924 A * | 3/1975 | Clampitt | E21B 43/164 166/261 |
| 3,881,551 A | 5/1975 | Terry | |
| 3,890,007 A | 6/1975 | Heinen et al. | |
| 3,908,762 A | 9/1975 | Redford | |
| 3,912,330 A | 10/1975 | Carnahan | |
| 3,913,672 A | 10/1975 | Columbus et al. | |
| 3,933,205 A | 1/1976 | Kiel | |
| 3,948,325 A | 4/1976 | Winston et al. | |
| 3,953,340 A | 4/1976 | Templeton et al. | |
| 3,968,840 A | 7/1976 | Tate | |
| 3,987,850 A | 10/1976 | Fitch | |
| 4,003,432 A | 1/1977 | Weston et al. | |
| 4,007,786 A | 2/1977 | Schlinger | |
| 4,015,663 A | 4/1977 | Strubhar | |
| 4,019,577 A | 4/1977 | Fitch et al. | |
| 4,019,578 A | 4/1977 | Stoddard et al. | |
| 4,022,280 A | 5/1977 | Stoddard et al. | |
| 4,026,358 A | 5/1977 | Allen | |
| 4,040,483 A | 8/1977 | Offeringa | |
| 4,042,029 A | 8/1977 | Offeringa | |
| 4,044,831 A | 8/1977 | Allen | |
| 4,068,716 A | 1/1978 | Allen | |
| 4,071,458 A | 1/1978 | Allen | |
| 4,078,609 A | 3/1978 | Pavlich | |
| 4,083,404 A | 4/1978 | Allen | |
| 4,098,336 A | 7/1978 | Allen | |
| 4,110,224 A | 8/1978 | Allen | |
| 4,113,015 A | 9/1978 | Meijs | |
| 4,121,661 A | 10/1978 | Redford | |
| 4,127,170 A | 11/1978 | Redford | |
| 4,127,172 A | 11/1978 | Redford et al. | |
| 4,129,182 A | 12/1978 | Dabbous | |
| 4,151,877 A | 5/1979 | French | |
| 4,168,257 A | 9/1979 | Meijs | |
| 4,185,693 A | 1/1980 | Crumb et al. | |
| 4,186,802 A | 2/1980 | Perlman | |
| 4,200,152 A | 4/1980 | Foster et al. | |
| 4,216,098 A | 8/1980 | Hunter | |
| 4,217,230 A | 8/1980 | Hunter | |
| 4,223,729 A | 9/1980 | Foster | |
| 4,226,730 A | 10/1980 | Hunter | |
| 4,226,731 A | 10/1980 | Hunter | |
| 4,228,016 A | 10/1980 | Hunter | |
| 4,228,018 A | 10/1980 | Hunter | |
| 4,265,310 A | 5/1981 | Britton et al. | |
| 4,271,905 A | 6/1981 | Redford et al. | |
| 4,279,301 A | 7/1981 | Williams | |
| 4,288,334 A | 9/1981 | McCoy et al. | |
| 4,297,226 A | 10/1981 | Hunter | |
| 4,297,469 A | 10/1981 | Hunter | |
| 4,298,479 A | 11/1981 | Hunter | |
| 4,303,126 A | 12/1981 | Blevins | |
| 4,303,127 A | 12/1981 | Freel et al. | |
| 4,323,463 A | 4/1982 | Morduchowitz | |
| 4,324,291 A | 4/1982 | Wong et al. | |
| 4,325,432 A | 4/1982 | Henry | |
| 4,331,796 A | 5/1982 | Hunter | |
| 4,338,203 A | 7/1982 | Hunter | |
| 4,341,647 A | 7/1982 | Hunter | |
| 4,343,363 A | 8/1982 | Norton et al. | |
| 4,357,802 A | 11/1982 | Wahl et al. | |
| 4,364,431 A | 12/1982 | Saidi et al. | |
| 4,368,781 A | 1/1983 | Anderson | |
| 4,371,444 A | 2/1983 | McCoy et al. | |
| 4,374,545 A | 2/1983 | Bullen et al. | |
| 4,378,845 A | 4/1983 | Medlin et al. | |
| 4,398,602 A | 8/1983 | Anderson | |
| 4,398,769 A | 8/1983 | Jacoby | |
| 4,415,035 A | 11/1983 | Medlin et al. | |
| 1,443,048 A | 2/1984 | Hunter | |
| 4,430,482 A | 2/1984 | Hunter | |
| 4,431,055 A | 2/1984 | Parrish | |
| 4,431,778 A | 2/1984 | Hunter | |
| 4,438,976 A | 3/1984 | Baughman et al. | |
| 4,440,652 A | 4/1984 | Hunter | |
| 4,444,258 A | 4/1984 | Kalmar | |
| 4,448,697 A | 5/1984 | McCoy et al. | |
| 4,450,913 A | 5/1984 | Allen | |
| 4,471,840 A | 9/1984 | Lasseter | |
| 4,480,696 A | 11/1984 | Almond et al. | |
| 4,495,995 A | 1/1985 | Chen et al. | |
| 4,501,326 A | 2/1985 | Edmunds | |
| 4,523,642 A | 6/1985 | Venkatesan | |
| 4,548,268 A | 10/1985 | Stipanovic | |
| 4,554,082 A | 11/1985 | Holtmyer et al. | |
| 4,561,696 A | 12/1985 | Graves | |
| 4,567,945 A | 2/1986 | Segalman | |
| 4,605,066 A | 8/1986 | Djabbarah | |
| 4,607,699 A | 8/1986 | Stephens | |
| 4,612,989 A | 9/1986 | Rakach et al. | |
| 4,620,594 A | 11/1986 | Hall | |
| 4,623,021 A | 11/1986 | Stowe | |
| 4,630,678 A | 12/1986 | Mumallah et al. | |
| 4,633,948 A | 1/1987 | Closmann | |
| 4,635,720 A | 1/1987 | Chew | |
| 4,637,461 A | 1/1987 | Hight | |
| 4,665,990 A | 5/1987 | Perlman | |
| 4,673,484 A | 6/1987 | Babcock | |
| 4,679,625 A | 7/1987 | Gibbons | |
| 4,683,950 A | 8/1987 | Lessi | |
| 4,687,057 A | 8/1987 | Moore et al. | |
| 4,687,059 A | 8/1987 | Pathak et al. | |
| 4,693,310 A | 9/1987 | Gibbons | |
| 4,694,904 A | 9/1987 | Sengul et al. | |
| 4,696,345 A | 9/1987 | Hsueh | |
| 4,706,749 A | 11/1987 | Hayes et al. | |
| 4,714,114 A | 12/1987 | Jones | |
| 4,718,489 A | 1/1988 | Hallam et al. | |
| 4,724,905 A * | 2/1988 | Uhri | E21B 43/17 166/250.1 |
| 4,754,808 A | 7/1988 | Harmon et al. | |
| 4,756,369 A | 7/1988 | Jennings et al. | |
| 4,802,144 A | 1/1989 | Holzhausen et al. | |
| 4,815,790 A | 3/1989 | Rosar et al. | |
| 4,828,028 A | 5/1989 | Soliman | |
| 4,834,181 A | 5/1989 | Uhri et al. | |
| 4,852,650 A | 8/1989 | Jennings et al. | |
| 4,867,241 A | 9/1989 | Strubhar | |
| 4,889,186 A | 12/1989 | Hanson et al. | |
| 4,907,204 A | 3/1990 | Medlin | |
| 4,926,940 A | 5/1990 | Stromswold | |
| 4,938,286 A | 7/1990 | Jennings, Jr. | |
| 4,957,167 A | 9/1990 | Schultz | |
| 4,974,675 A | 12/1990 | Austin et al. | |
| 4,977,116 A | 12/1990 | Rumpf et al. | |
| 5,005,645 A | 4/1991 | Jennings et al. | |
| 5,025,859 A | 6/1991 | Hanson et al. | |
| 5,030,603 A | 7/1991 | Rumpf et al. | |
| 5,031,163 A | 7/1991 | Holzhausen et al. | |
| 1,503,691 A | 8/1991 | Jennings et al. | |
| 5,036,918 A | 8/1991 | Jennings et al. | |
| 5,042,580 A | 8/1991 | Alvin et al. | |
| 5,042,581 A | 8/1991 | Jennnings et al. | |
| 5,069,281 A | 12/1991 | Tackett | |
| 5,072,990 A | 12/1991 | Vogt et al. | |
| 5,095,982 A | 3/1992 | Chungshiang et al. | |
| 5,111,881 A * | 5/1992 | Soliman | E21B 43/26 166/250.1 |
| 5,129,457 A | 7/1992 | Sydansk | |
| 5,133,407 A | 7/1992 | Deines et al. | |
| 5,206,836 A | 4/1993 | Holzhausen et al. | |
| 5,220,504 A | 6/1993 | Holzhausen et al. | |
| 5,228,510 A | 7/1993 | Jennings et al. | |
| 5,238,067 A | 8/1993 | Jennings, Jr. | |
| 5,261,489 A | 11/1993 | Jennings et al. | |
| 5,271,465 A | 12/1993 | Schmidt et al. | |
| 5,295,539 A | 3/1994 | Alfred et al. | |
| 5,295,763 A | 3/1994 | Stenborg | |
| 5,305,829 A | 4/1994 | Kumar | |
| 5,309,988 A | 5/1994 | Shy et al. | |
| 5,356,565 A | 10/1994 | Southwell | |
| 5,370,187 A | 12/1994 | Ferguson et al. | |
| 5,411,086 A | 5/1995 | Burcham et al. | |

(56) References Cited

U.S. PATENT DOCUMENTS

| | | |
|---|---|---|
| 5,411,094 A | 5/1995 | Northrop |
| 5,425,421 A | 6/1995 | Coleman et al. |
| 5,431,225 A | 7/1995 | Abass et al. |
| 5,476,145 A | 12/1995 | Sengul et al. |
| 5,503,226 A | 4/1996 | Wadleigh |
| 5,529,122 A | 6/1996 | Thach |
| 5,734,988 A | 3/1998 | Alexander et al. |
| 5,803,171 A | 9/1998 | McCaffrey et al. |
| 5,860,475 A | 1/1999 | Godwin et al. |
| 5,874,385 A | 2/1999 | Mzik et al. |
| 5,961,438 A | 10/1999 | Thomas et al. |
| 5,963,508 A | 10/1999 | Withers |
| 5,969,006 A | 10/1999 | Onan et al. |
| 6,012,524 A | 1/2000 | Chatterji et al. |
| 6,016,868 A | 1/2000 | Gregoli et al. |
| 6,186,236 B1 | 2/2001 | Cox |
| 6,220,087 B1 | 4/2001 | Hache et al. |
| 6,257,334 B1 | 7/2001 | Cyr et al. |
| 6,328,104 B1 | 12/2001 | Graue |
| 6,367,548 B1 | 4/2002 | Purvis et al. |
| 6,527,050 B1 | 3/2003 | Sask |
| 6,729,394 B1 | 5/2004 | Hassan et al. |
| 6,758,271 B1 | 7/2004 | Smith |
| 6,854,874 B2 | 2/2005 | Graham |
| 6,873,947 B1 | 3/2005 | Huang et al. |
| 6,913,080 B2 | 7/2005 | Lehman et al. |
| 6,935,426 B1 | 8/2005 | Rainbolt et al. |
| 6,959,762 B2 | 11/2005 | Sask |
| 7,090,020 B2 | 8/2006 | Hill et al. |
| 7,117,943 B2 | 10/2006 | Harris et al. |
| 7,125,162 B2 | 10/2006 | Graham, Sr. |
| 7,127,353 B2 | 10/2006 | Geiser |
| 7,233,150 B2 | 6/2007 | Chen et al. |
| 7,243,718 B2 | 7/2007 | Chen et al. |
| 7,249,633 B2 | 7/2007 | Ravensbergen et al. |
| 7,264,049 B2 | 9/2007 | Maguire |
| 7,322,417 B2 | 1/2008 | Rytlewski et al. |
| 7,424,905 B2 | 9/2008 | Lai |
| 7,441,603 B2 | 10/2008 | Kaminsky et al. |
| 7,516,784 B2 | 4/2009 | Maguire |
| 7,740,065 B2 | 6/2010 | Choi |
| 7,766,083 B2 | 8/2010 | Willett et al. |
| 7,857,056 B2 | 12/2010 | Kaminsky et al. |
| 7,946,342 B1 | 5/2011 | Robertson |
| 8,021,461 B2 | 9/2011 | Seal |
| 8,141,633 B2 | 3/2012 | Hampton et al. |
| 8,154,419 B2 | 4/2012 | Daussin et al. |
| 8,168,570 B2 | 5/2012 | Barron et al. |
| 8,235,117 B1 | 8/2012 | Hill et al. |
| 8,302,687 B2 | 11/2012 | Chen et al. |
| 8,387,699 B2 | 3/2013 | Leshchyshyn et al. |
| 8,505,632 B2 | 8/2013 | Guerrero et al. |
| 8,506,907 B2 | 8/2013 | Angelescu |
| 8,532,969 B2 | 9/2013 | Li et al. |
| 8,752,651 B2 | 6/2014 | Randall et al. |
| 8,899,327 B2 | 12/2014 | Kuhlman et al. |
| 8,905,133 B2 | 12/2014 | Potapenko et al. |
| 8,905,136 B2 | 12/2014 | Todd et al. |
| 8,905,139 B2 | 12/2014 | Arizmendi, Jr. et al. |
| 8,991,499 B2 | 3/2015 | Nevison |
| 9,051,511 B2 | 6/2015 | Parse et al. |
| 9,057,261 B2 | 6/2015 | Walters et al. |
| 9,181,789 B2 | 11/2015 | Nevison |
| 9,260,921 B2 | 2/2016 | Graham et al. |
| 9,354,336 B2 | 5/2016 | Riley et al. |
| 9,389,326 B2 | 7/2016 | Vermilye et al. |
| 9,394,774 B2 | 7/2016 | Soliman et al. |
| 9,410,406 B2 * | 8/2016 | Yuan ............... E21B 43/26 |
| 9,441,470 B2 | 9/2016 | Guerrero et al. |
| 9,500,069 B2 | 11/2016 | Ersoz et al. |
| 9,528,351 B2 | 12/2016 | Vidma et al. |
| 9,557,433 B2 | 1/2017 | Geiser et al. |
| 9,569,521 B2 | 2/2017 | Crafton |
| 9,598,931 B2 | 3/2017 | Murphree et al. |
| 9,605,531 B2 | 3/2017 | Xin et al. |
| 9,611,721 B2 | 4/2017 | Snider et al. |
| 9,617,839 B2 * | 4/2017 | Modavi ............... E21B 43/16 |
| 9,619,592 B2 | 4/2017 | Gurpinar et al. |
| 9,638,017 B2 | 5/2017 | Detournay et al. |
| 9,683,165 B2 * | 6/2017 | Mendell ............... C09K 8/594 |
| 9,702,222 B2 | 7/2017 | Hardesty et al. |
| 9,725,640 B2 | 8/2017 | Tang et al. |
| 9,759,053 B2 | 9/2017 | Mendell |
| 9,772,414 B2 | 9/2017 | Diller |
| 9,796,910 B2 | 10/2017 | Nevison |
| 9,796,911 B2 | 10/2017 | Salla |
| 9,803,135 B2 | 10/2017 | Barron et al. |
| 9,828,840 B2 | 11/2017 | Dawson |
| 9,828,843 B2 | 11/2017 | Mendell |
| 2002/0007949 A1 | 1/2002 | Tolman et al. |
| 2002/0148608 A1 | 10/2002 | Shaw |
| 2003/0037926 A1 | 2/2003 | Sask |
| 2003/0095871 A1 | 5/2003 | Hebert |
| 2003/0116314 A1 | 6/2003 | Dallas |
| 2003/0195733 A1 | 10/2003 | Huang et al. |
| 2004/0143427 A1 | 7/2004 | Huang et al. |
| 2004/0188093 A1 | 9/2004 | Funchess |
| 2004/0206495 A1 | 10/2004 | Lehman et al. |
| 2005/0020454 A1 | 1/2005 | Francini et al. |
| 2005/0067351 A1 | 3/2005 | Graham |
| 2005/0077043 A1 | 4/2005 | Dallas |
| 2005/0121193 A1 | 6/2005 | Buchanan et al. |
| 2005/0121196 A1 | 6/2005 | East et al. |
| 2005/0124500 A1 | 6/2005 | Chen et al. |
| 2005/0145385 A1 | 7/2005 | Nguyen |
| 2005/0176590 A1 | 8/2005 | Lehman et al. |
| 2005/0187114 A1 | 8/2005 | Lehman et al. |
| 2005/0252656 A1 | 11/2005 | Maguire |
| 2005/0279161 A1 | 12/2005 | Chen et al. |
| 2005/0279497 A1 | 12/2005 | Chen et al. |
| 2006/0065400 A1 | 3/2006 | Smith |
| 2006/0124309 A1 | 6/2006 | Nguyen et al. |
| 2006/0162924 A1 | 7/2006 | Blevins et al. |
| 2006/0198704 A1 | 9/2006 | Kerfoot |
| 2007/0000666 A1 | 1/2007 | Vozniak et al. |
| 2007/0023186 A1 | 2/2007 | Kaminsky et al. |
| 2007/0156479 A1 | 7/2007 | Long |
| 2007/0235194 A1 | 10/2007 | Maier |
| 2007/0272413 A1 | 11/2007 | Rytlewski et al. |
| 2007/0295499 A1 | 12/2007 | Arthur et al. |
| 2007/0295503 A1 | 12/2007 | Maguire |
| 2008/0093073 A1 | 4/2008 | Bustos et al. |
| 2008/0128131 A1 | 6/2008 | Nguyen et al. |
| 2008/0133186 A1 | 6/2008 | Li et al. |
| 2008/0164030 A1 | 7/2008 | Young |
| 2009/0139715 A1 | 6/2009 | Choi |
| 2009/0166024 A1 | 7/2009 | Chen et al. |
| 2009/0256575 A1 | 10/2009 | Pisklak et al. |
| 2009/0260880 A1 | 10/2009 | Thambynayagam et al. |
| 2009/0277630 A1 | 11/2009 | McDaniel et al. |
| 2010/0044048 A1 | 2/2010 | Leshchyshyn et al. |
| 2010/0071366 A1 | 3/2010 | Klemencic |
| 2010/0076738 A1 | 3/2010 | Dean et al. |
| 2010/0096129 A1 | 4/2010 | Hinkel et al. |
| 2010/0122809 A1 | 5/2010 | Robichaux |
| 2010/0132959 A1 | 6/2010 | Tinker |
| 2010/0138202 A1 | 6/2010 | Mallison et al. |
| 2010/0155142 A1 | 6/2010 | Thambynayagam et al. |
| 2010/0200235 A1 | 8/2010 | Luo et al. |
| 2010/0212906 A1 | 8/2010 | Fulton et al. |
| 2010/0250216 A1 | 9/2010 | Narr et al. |
| 2011/0005761 A1 | 1/2011 | Luo et al. |
| 2011/0048708 A1 | 3/2011 | Glasbergen et al. |
| 2011/0186295 A1 | 8/2011 | Kaminsky et al. |
| 2011/0220359 A1 * | 9/2011 | Soliman ............... C09K 8/588 166/305.1 |
| 2011/0277996 A1 | 11/2011 | Cullick et al. |
| 2012/0037360 A1 | 2/2012 | Arizmendi, Jr. et al. |
| 2012/0067571 A1 | 3/2012 | Boerrigter et al. |
| 2012/0145390 A1 | 6/2012 | Parse et al. |
| 2012/0318533 A1 | 12/2012 | Keller et al. |
| 2012/0325467 A1 | 12/2012 | Lebel et al. |
| 2012/0325555 A1 | 12/2012 | Jette et al. |
| 2013/0032336 A1 | 2/2013 | Abbate et al. |

(56) References Cited

U.S. PATENT DOCUMENTS

| | | |
|---|---|---|
| 2013/0037265 A1 | 2/2013 | Chabert et al. |
| 2013/0056171 A1 | 3/2013 | Klemencic |
| 2013/0100770 A1 | 4/2013 | Diller |
| 2013/0146293 A1 | 6/2013 | Zazovsky et al. |
| 2013/0180712 A1 | 7/2013 | Nasr et al. |
| 2013/0194892 A1 | 8/2013 | Golparian et al. |
| 2013/0199779 A1 | 8/2013 | Scott |
| 2013/0215712 A1 | 8/2013 | Geiser et al. |
| 2013/0220604 A1* | 8/2013 | El-Rabaa ............... E21B 43/26 166/259 |
| 2013/0269423 A1 | 10/2013 | Angelescu |
| 2013/0277050 A1 | 10/2013 | Cherian et al. |
| 2013/0312976 A1 | 11/2013 | Shirley |
| 2013/0341025 A1 | 12/2013 | Gupta |
| 2013/0346035 A1 | 12/2013 | Madasu et al. |
| 2014/0019057 A1 | 1/2014 | Diller |
| 2014/0034309 A1 | 2/2014 | Saini et al. |
| 2014/0076570 A1 | 3/2014 | Nguyen |
| 2014/0083687 A1 | 3/2014 | Poe et al. |
| 2014/0096950 A1 | 4/2014 | Pyecroft et al. |
| 2014/0116682 A1 | 5/2014 | Bracho Dominguez et al. |
| 2014/0166280 A1 | 6/2014 | Stone et al. |
| 2014/0174739 A1 | 6/2014 | Bourcier et al. |
| 2014/0208841 A1 | 7/2014 | Hausot et al. |
| 2014/0212986 A1 | 7/2014 | Angelescu et al. |
| 2014/0216730 A1 | 8/2014 | Ersoz |
| 2014/0246194 A1* | 9/2014 | Artus ..................... E21B 43/17 166/271 |
| 2014/0251472 A1 | 9/2014 | Woods |
| 2014/0251626 A1 | 9/2014 | Gomaa et al. |
| 2014/0252260 A1 | 9/2014 | Woods |
| 2014/0262265 A1 | 9/2014 | Hutchins et al. |
| 2014/0299326 A1 | 10/2014 | Crews |
| 2014/0318793 A1 | 10/2014 | van Petergem et al. |
| 2014/0352966 A1 | 12/2014 | Yuan |
| 2014/0371114 A1 | 12/2014 | Todd et al. |
| 2014/0374094 A1 | 12/2014 | Kelly et al. |
| 2014/0374108 A1 | 12/2014 | Vandeponseele et al. |
| 2014/0378354 A1 | 12/2014 | Kelly et al. |
| 2015/0000935 A1 | 1/2015 | Pabon et al. |
| 2015/0075784 A1 | 3/2015 | Fonseca Ocampos et al. |
| 2015/0107830 A1 | 4/2015 | Ersoz et al. |
| 2015/0129211 A1 | 5/2015 | Dusseault et al. |
| 2015/0129212 A1 | 5/2015 | Noe et al. |
| 2015/0152719 A1 | 6/2015 | Bahorich |
| 2015/0167441 A1 | 6/2015 | Howell et al. |
| 2015/0175878 A1 | 6/2015 | Kelly et al. |
| 2015/0176394 A1 | 6/2015 | Roussel et al. |
| 2015/0192002 A1 | 7/2015 | Rogers et al. |
| 2015/0211347 A1 | 7/2015 | Snider et al. |
| 2015/0232742 A1 | 8/2015 | Parse et al. |
| 2015/0240148 A1 | 8/2015 | Luharuka et al. |
| 2015/0247385 A1 | 9/2015 | Chen et al. |
| 2015/0258352 A1 | 9/2015 | Lin et al. |
| 2015/0260025 A1 | 9/2015 | Hughes et al. |
| 2015/0275627 A1 | 10/2015 | Xu et al. |
| 2015/0345272 A1 | 12/2015 | Kajaria et al. |
| 2015/0353816 A1 | 12/2015 | Thrash et al. |
| 2015/0354337 A1 | 12/2015 | Ersoz et al. |
| 2015/0369023 A1 | 12/2015 | MacPhail et al. |
| 2016/0003020 A1 | 1/2016 | Sharma |
| 2016/0061026 A1 | 3/2016 | Cherian et al. |
| 2016/0083639 A1 | 3/2016 | Xu et al. |
| 2016/0115772 A1 | 4/2016 | Graham et al. |
| 2016/0123119 A1 | 5/2016 | Tueckmantel et al. |
| 2016/0146963 A1 | 5/2016 | Hall et al. |
| 2016/0160114 A1 | 6/2016 | Chittattukara et al. |
| 2016/0160642 A1 | 6/2016 | Hall et al. |
| 2016/0168968 A1 | 6/2016 | Lecerf et al. |
| 2016/0194945 A1 | 7/2016 | Chen et al. |
| 2016/0222284 A1 | 8/2016 | He et al. |
| 2016/0237797 A1 | 8/2016 | Arizmendi et al. |
| 2016/0237799 A1 | 8/2016 | Dawson |
| 2016/0264849 A1 | 9/2016 | Oliveira et al. |
| 2016/0272875 A1 | 9/2016 | Ghumare et al. |
| 2016/0298025 A1 | 10/2016 | Thrash |
| 2016/0298425 A1 | 10/2016 | Thrash |
| 2016/0298437 A1 | 10/2016 | Mendell et al. |
| 2016/0312110 A1 | 10/2016 | Vo et al. |
| 2016/0312594 A1 | 10/2016 | Kuchuk et al. |
| 2016/0313469 A1 | 10/2016 | Von Gonten et al. |
| 2016/0319189 A1 | 11/2016 | Dusterhoft et al. |
| 2016/0326427 A1 | 11/2016 | Ogle et al. |
| 2016/0333249 A1 | 11/2016 | Patil et al. |
| 2016/0333261 A1 | 11/2016 | Sparks et al. |
| 2016/0333680 A1 | 11/2016 | Richter et al. |
| 2016/0355728 A1 | 12/2016 | Vendetti et al. |
| 2016/0356116 A1 | 12/2016 | Schmidt et al. |
| 2016/0356138 A1 | 12/2016 | Hughes et al. |
| 2016/0356140 A1 | 12/2016 | Hughes et al. |
| 2016/0356157 A1 | 12/2016 | Hughes et al. |
| 2016/0376495 A1 | 12/2016 | Nguyen et al. |
| 2016/0376882 A1 | 12/2016 | Mendell et al. |
| 2017/0002652 A1 | 1/2017 | Kampfer et al. |
| 2017/0009129 A1 | 1/2017 | Bryant et al. |
| 2017/0017011 A1 | 1/2017 | Howard et al. |
| 2017/0058634 A1 | 3/2017 | Roessler et al. |
| 2017/0058637 A1 | 3/2017 | Roessler et al. |
| 2017/0058639 A1 | 3/2017 | Hardesty et al. |
| 2017/0058640 A1 | 3/2017 | Roessler et al. |
| 2017/0068638 A1 | 3/2017 | Hardesty et al. |
| 2017/0074998 A1 | 3/2017 | McColpin et al. |
| 2017/0074999 A1 | 3/2017 | Walters et al. |
| 2017/0075000 A1 | 3/2017 | Dusterhoft et al. |
| 2017/0075001 A1 | 3/2017 | McColpin et al. |
| 2017/0075002 A1 | 3/2017 | Ranjan et al. |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0075006 A1 | 3/2017 | Dusterhoft et al. |
| 2017/0075007 A1 | 3/2017 | Walters et al. |
| 2017/0096881 A1 | 4/2017 | Dusterhoft et al. |
| 2017/0096886 A1 | 4/2017 | Chuprakov et al. |
| 2017/0108605 A1 | 4/2017 | Walters et al. |
| 2017/0121589 A1 | 5/2017 | Reddy et al. |
| 2017/0123089 A1 | 5/2017 | Walters et al. |
| 2017/0130121 A1 | 5/2017 | Xu et al. |
| 2017/0137696 A1 | 5/2017 | Mohanty |
| 2017/0138169 A1 | 5/2017 | Bogdan et al. |
| 2017/0145295 A1 | 5/2017 | Nguyen et al. |
| 2017/0152728 A1 | 6/2017 | Abou-Sayed et al. |
| 2017/0210965 A1 | 7/2017 | Cortez et al. |
| 2017/0210974 A1 | 7/2017 | Nguyen et al. |
| 2017/0210977 A1 | 7/2017 | He et al. |
| 2017/0212029 A1 | 7/2017 | Scharmach |
| 2017/0226834 A1 | 8/2017 | Ayasse |
| 2017/0234443 A1 | 8/2017 | Gardiner |
| 2017/0241595 A1 | 8/2017 | Herndon |
| 2017/0267916 A1 | 9/2017 | Singh et al. |
| 2017/0275527 A1 | 9/2017 | LaBlanc et al. |
| 2017/0283689 A1 | 10/2017 | Mendell et al. |
| 2017/0284179 A1 | 10/2017 | Butula et al. |
| 2017/0292375 A1 | 10/2017 | Feng et al. |
| 2017/0298710 A1 | 10/2017 | Xu et al. |
| 2017/0341981 A1 | 11/2017 | Pinkerton et al. |
| 2017/0349813 A1 | 12/2017 | Rahal et al. |
| 2017/0349821 A1 | 12/2017 | Wei et al. |

FOREIGN PATENT DOCUMENTS

| | | |
|---|---|---|
| CA | 635605 | 1/1962 |
| CA | 640397 | 4/1962 |
| CA | 643314 | 6/1962 |
| CA | 647015 | 8/1962 |
| CA | 650458 | 10/1962 |
| CA | 654739 | 12/1962 |
| CA | 658803 | 3/1963 |
| CA | 660884 | 4/1963 |
| CA | 661285 | 4/1963 |
| CA | 681288 | 3/1964 |
| CA | 684438 | 4/1964 |
| CA | 684710 | 4/1964 |
| CA | 689817 | 6/1964 |
| CA | 709671 | 5/1965 |

(56) References Cited

FOREIGN PATENT DOCUMENTS

| | | |
|---|---|---|
| CA | 715357 | 8/1965 |
| CA | 716377 | 8/1965 |
| CA | 730498 | 3/1966 |
| CA | 740257 | 8/1966 |
| CA | 745455 | 11/1966 |
| CA | 772945 | 12/1967 |
| CA | 778616 | 2/1968 |
| CA | 779091 | 2/1968 |
| CA | 782367 | 4/1968 |
| CA | 785584 | 5/1968 |
| CA | 785585 | 5/1968 |
| CA | 805963 | 2/1969 |
| CA | 805966 | 2/1969 |
| CA | 821504 | 8/1969 |
| CA | 838477 | 4/1970 |
| CA | 840209 | 4/1970 |
| CA | 840789 | 5/1970 |
| CA | 850443 | 9/1970 |
| CA | 852006 | 9/1970 |
| CA | 889692 | 1/1972 |
| CA | 900842 | 5/1972 |
| CA | 913890 | 11/1972 |
| CA | 933343 | 9/1973 |
| CA | 938548 | 12/1973 |
| CA | 1032076 | 5/1975 |
| CA | 989524 | 5/1976 |
| CA | 995130 | 8/1976 |
| CA | 1015656 | 8/1977 |
| CA | 1030062 | 4/1978 |
| CA | 1063015 | 9/1979 |
| CA | 1077833 | 5/1980 |
| CA | 1085718 | 9/1980 |
| CA | 1095226 | 2/1981 |
| CA | 1102234 | 6/1981 |
| CA | 1110163 | 10/1981 |
| CA | 1156550 | 11/1983 |
| CA | 1196268 | 11/1985 |
| CA | 1209031 | 8/1986 |
| CA | 1210322 | 8/1986 |
| CA | 1210687 | 9/1986 |
| CA | 1214988 | 12/1986 |
| CA | 1221026 | 4/1987 |
| CA | 1235652 | 4/1988 |
| CA | 1251390 | 3/1989 |
| CA | 1253794 | 5/1989 |
| CA | 1286217 | 7/1991 |
| CA | 1287565 | 8/1991 |
| CA | 1289057 | 9/1991 |
| CA | 1297401 | 3/1992 |
| CA | 1298780 | 4/1992 |
| CA | 1301444 | 5/1992 |
| CA | 2039919 | 10/1992 |
| CA | 1323561 | 10/1993 |
| CA | 2180267 | 3/1997 |
| CA | 2108194 | 5/1997 |
| CA | 2119682 | 5/1997 |
| CA | 2226988 | 7/1998 |
| CA | 2287944 | 11/1998 |
| CA | 2452364 | 1/2003 |
| CA | 2412911 | 5/2003 |
| CA | 2444043 | 4/2005 |
| CA | 2528696 | 6/2006 |
| CA | 2628778 | 6/2006 |
| CA | 2615972 | 1/2007 |
| CA | 2335737 | 9/2007 |
| CA | 2363909 | 9/2007 |
| CA | 2044473 | 9/2009 |
| CA | 2707209 | 1/2011 |
| CA | 2713325 | 2/2011 |
| CA | 2729430 | 7/2011 |
| CA | 2732675 | 8/2011 |
| CA | 2757125 | 2/2013 |
| CA | 2813878 | 10/2013 |
| CA | 2900549 | 10/2014 |
| CA | 2900550 | 10/2014 |
| CA | 2900552 | 10/2014 |
| CA | 2900554 | 10/2014 |
| CA | 2901058 | 10/2014 |
| CA | 2901061 | 10/2014 |
| CA | 2817612 | 11/2014 |
| CA | 2915797 | 2/2015 |
| CA | 2917580 | 2/2015 |
| CA | 2862556 | 3/2015 |
| CA | 2863764 | 3/2015 |
| CA | 2832626 | 5/2015 |
| CA | 2937225 | 6/2015 |
| CA | 2930183 | 7/2015 |
| CA | 2931183 | 7/2015 |
| CA | 2933425 | 7/2015 |
| CA | 2847759 | 9/2015 |
| CA | 2933487 | 9/2015 |
| CA | 2946277 | 11/2015 |
| CA | 2894383 | 12/2015 |
| CA | 2945469 | 12/2015 |
| CA | 2945472 | 12/2015 |
| CA | 2945740 | 12/2015 |
| CA | 2945742 | 12/2015 |
| CA | 2946179 | 12/2015 |
| CA | 2946183 | 12/2015 |
| CA | 2946184 | 12/2015 |
| CA | 2947101 | 12/2015 |
| CA | 2947576 | 12/2015 |
| CA | 2947581 | 12/2015 |
| CA | 2947674 | 12/2015 |
| CA | 2947675 | 12/2015 |
| CA | 2947842 | 12/2015 |
| CA | 2951621 | 2/2016 |
| CA | 2934651 | 4/2016 |
| CA | 2869778 | 6/2016 |
| CA | 2823598 | 8/2016 |
| CA | 2893909 | 10/2016 |
| CA | 2831928 | 11/2016 |
| CA | 2937865 | 1/2017 |
| CA | 2944980 | 2/2017 |
| EP | 353740 | 2/1990 |
| EP | 898049 | 2/1999 |
| EP | 2128653 | 12/2009 |
| EP | 2431567 | 3/2012 |
| EP | 2436748 | 4/2012 |
| EP | 2924233 | 9/2015 |
| EP | 2231824 | 4/2016 |
| EP | 2649148 | 5/2016 |
| EP | 2649147 | 6/2016 |
| EP | 3135858 | 3/2017 |
| EP | 3168595 | 5/2017 |
| EP | 2607313 | 12/2017 |
| GB | 844229 | 8/1960 |
| GB | 905936 | 9/1962 |
| GB | 960112 | 6/1964 |
| GB | 1045578 | 10/1966 |
| GB | 1309281 | 3/1973 |
| GB | 1327937 | 8/1973 |
| GB | 1401712 | 7/1975 |
| GB | 1458799 | 12/1976 |
| GB | 1460647 | 1/1977 |
| GB | 1463444 | 2/1977 |
| GB | 1470855 | 4/1977 |
| GB | 1493890 | 11/1977 |
| GB | 1504192 | 3/1978 |
| GB | 1542810 | 3/1979 |
| GB | 2033258 | 5/1980 |
| GB | 2033259 | 5/1980 |
| GB | 2062063 | 4/1983 |
| GB | 2050467 | 8/1983 |
| GB | 2354781 | 8/2001 |
| GB | 2360304 | 9/2001 |
| GB | 2394735 | 5/2004 |
| GB | 2435657 | 6/2009 |
| GB | 2520719 | 1/2014 |
| GB | 2514075 | 11/2014 |
| MX | PA05010022 | 3/2006 |
| MX | 2011001947 | 4/2011 |
| MX | 2012004100 | 7/2012 |
| MX | 2012009133 | 9/2012 |

(56) References Cited

FOREIGN PATENT DOCUMENTS

| | | |
|---|---|---|
| MX | 2012011101 | 11/2012 |
| MX | 2013001121 | 5/2013 |
| MX | 2013007512 | 8/2013 |
| MX | 2013001364 | 9/2013 |
| MX | 2013008324 | 11/2014 |
| MX | 2014005083 | 2/2015 |
| MX | 2015009419 | 1/2016 |
| MX | 2015008297 | 2/2016 |
| MX | 2015008405 | 2/2016 |
| MX | 2015015739 | 3/2016 |
| MX | 2015015943 | 4/2016 |
| MX | 2015016569 | 4/2016 |
| MX | 2015017806 | 4/2016 |
| MX | 2015017813 | 4/2016 |
| MX | 2015015125 | 6/2016 |
| MX | 2015014256 | 7/2016 |
| MX | 2016004356 | 7/2016 |
| MX | 2016004925 | 7/2016 |
| MX | 341255 | 8/2016 |
| MX | 2015016764 | 8/2016 |
| MX | 2015017867 | 11/2016 |
| MX | 2016012330 | 1/2017 |
| MX | 2016013294 | 1/2017 |
| MX | 2016013936 | 1/2017 |
| MX | 345470 | 2/2017 |
| MX | 2016014601 | 2/2017 |
| MX | 2016016240 | 3/2017 |
| MX | 2016016331 | 3/2017 |
| MX | 2016015837 | 4/2017 |
| MX | 2015014405 | 7/2017 |
| MX | 2017003124 | 8/2017 |
| WO | WO 87/02410 | 4/1987 |
| WO | WO 96/03566 | 2/1996 |
| WO | WO 97/12119 | 4/1997 |
| WO | WO 97/38208 | 10/1997 |
| WO | WO 98/50679 | 11/1998 |
| WO | WO 99/04292 | 1/1999 |
| WO | WO 99/67505 | 12/1999 |
| WO | WO 03002152 | 1/2003 |
| WO | WO 03038278 | 5/2003 |
| WO | WO 03060281 | 7/2003 |
| WO | WO 2005/045192 | 5/2005 |
| WO | WO 2005/124395 | 12/2005 |
| WO | WO 2008/041990 | 4/2008 |
| WO | WO 2009/113895 | 9/2009 |
| WO | WO 2009/137565 | 11/2009 |
| WO | WO 2009/146563 | 12/2009 |
| WO | WO 2010/011402 | 1/2010 |
| WO | WO 2010/033710 | 3/2010 |
| WO | WO 2010/039448 | 4/2010 |
| WO | WO 2010/065769 | 6/2010 |
| WO | WO 2010/111398 | 9/2010 |
| WO | WO 2010/123587 | 10/2010 |
| WO | WO 2011/079742 | 7/2011 |
| WO | WO 2011/100509 | 8/2011 |
| WO | WO 2011/109143 | 9/2011 |
| WO | WO 2011/115723 | 9/2011 |
| WO | WO 2011/119409 | 9/2011 |
| WO | WO 2011/146866 | 11/2011 |
| WO | WO 2012/080296 | 6/2012 |
| WO | WO 2012/097426 | 7/2012 |
| WO | WO 2013/006794 | 1/2013 |
| WO | WO 2013/074237 | 5/2013 |
| WO | WO 2013/109638 | 7/2013 |
| WO | WO 2013/154537 | 10/2013 |
| WO | WO 2014/031607 | 2/2014 |
| WO | WO 2014/036245 | 3/2014 |
| WO | WO 2014/048119 | 4/2014 |
| WO | WO 2014/053043 | 4/2014 |
| WO | WO 2014/065973 | 5/2014 |
| WO | WO 2014/121270 | 8/2014 |
| WO | WO 2014/124533 | 8/2014 |
| WO | WO 2014/163816 | 10/2014 |
| WO | WO 2014/163817 | 10/2014 |
| WO | WO 2014/163818 | 10/2014 |
| WO | WO 2014/163820 | 10/2014 |
| WO | WO 2014/163821 | 10/2014 |
| WO | WO 2014/163822 | 10/2014 |
| WO | WO 2014/167056 | 10/2014 |
| WO | WO 2014/193409 | 12/2014 |
| WO | WO 2015/026319 | 2/2015 |
| WO | WO 2015/026331 | 2/2015 |
| WO | WO 2015/066804 | 5/2015 |
| WO | WO 2015/072882 | 5/2015 |
| WO | WO 2015/074243 | 5/2015 |
| WO | WO 2015/088682 | 6/2015 |
| WO | WO 2015/095557 | 6/2015 |
| WO | WO 2015/102580 | 7/2015 |
| WO | WO 2015/105491 | 7/2015 |
| WO | WO 2015/105513 | 7/2015 |
| WO | WO 2015/112130 | 7/2015 |
| WO | WO 2015/112132 | 7/2015 |
| WO | WO 2015/122896 | 8/2015 |
| WO | WO 2015/122899 | 8/2015 |
| WO | WO 2015/126418 | 8/2015 |
| WO | WO 2015/134022 | 9/2015 |
| WO | WO 2015/137955 | 9/2015 |
| WO | WO 2015/175477 | 11/2015 |
| WO | WO 2015/178909 | 11/2015 |
| WO | WO 2014/204709 | 12/2015 |
| WO | WO 2015/184437 | 12/2015 |
| WO | WO 2015/187136 | 12/2015 |
| WO | WO 2015/187137 | 12/2015 |
| WO | WO 2015/187139 | 12/2015 |
| WO | WO 2015/187140 | 12/2015 |
| WO | WO 2015/187141 | 12/2015 |
| WO | WO 2015/187142 | 12/2015 |
| WO | WO 2015/187145 | 12/2015 |
| WO | WO 2015/187147 | 12/2015 |
| WO | WO 2015/187149 | 12/2015 |
| WO | WO 2015/187150 | 12/2015 |
| WO | WO 2015/187151 | 12/2015 |
| WO | WO 2015/187153 | 12/2015 |
| WO | WO 2015/188115 | 12/2015 |
| WO | WO 2015/191038 | 12/2015 |
| WO | WO 2015/195451 | 12/2015 |
| WO | WO 2015/199660 | 12/2015 |
| WO | WO 2015187152 | 12/2015 |
| WO | WO 2016/004137 | 1/2016 |
| WO | WO 2016/004215 | 1/2016 |
| WO | WO 2016/015654 | 2/2016 |
| WO | WO 2016/018429 | 2/2016 |
| WO | WO 2016/018431 | 2/2016 |
| WO | WO 2016/028256 | 2/2016 |
| WO | WO 2016/028284 | 2/2016 |
| WO | WO 2016/032458 | 3/2016 |
| WO | WO 2016/032459 | 3/2016 |
| WO | WO 2016/032513 | 3/2016 |
| WO | WO 2016/041189 | 3/2016 |
| WO | WO 2016/048349 | 3/2016 |
| WO | WO 2016/076862 | 5/2016 |
| WO | WO 2016/076877 | 5/2016 |
| WO | WO 2016/082188 | 6/2016 |
| WO | WO 2016/089387 | 6/2016 |
| WO | WO 2016/089388 | 6/2016 |
| WO | WO 2016/091972 | 6/2016 |
| WO | WO 2016/093835 | 6/2016 |
| WO | WO 2016/105338 | 6/2016 |
| WO | WO 2016/118167 | 7/2016 |
| WO | WO 2016/126266 | 8/2016 |
| WO | WO 2016/127108 | 8/2016 |
| WO | WO 2016/137448 | 9/2016 |
| WO | WO 2016/144767 | 9/2016 |
| WO | WO 2016/175784 | 11/2016 |
| WO | WO 2016/182581 | 11/2016 |
| WO | WO 2016/200367 | 12/2016 |
| WO | WO 2017/003813 | 1/2017 |
| WO | WO 20171011658 | 1/2017 |
| WO | WO 2017/018996 | 2/2017 |
| WO | WO 2017/018998 | 2/2017 |
| WO | WO 2017/025821 | 2/2017 |
| WO | WO 2017/027433 | 2/2017 |
| WO | WO 2017/039600 | 3/2017 |
| WO | WO 2017/052524 | 3/2017 |

(56) References Cited

FOREIGN PATENT DOCUMENTS

| | | |
|---|---|---|
| WO | WO 2017/052525 | 3/2017 |
| WO | WO 2017/052527 | 3/2017 |
| WO | WO 2017/052529 | 3/2017 |
| WO | WO 2017/062627 | 3/2017 |
| WO | WO 2017/058245 | 4/2017 |
| WO | WO 2017/058267 | 4/2017 |
| WO | WO 2017/063073 | 4/2017 |
| WO | WO 2017/074393 | 5/2017 |
| WO | WO 2017/074400 | 5/2017 |
| WO | WO 2017/074462 | 5/2017 |
| WO | WO 2017/078685 | 5/2017 |
| WO | WO 2017/078703 | 5/2017 |
| WO | WO 2017/091586 | 6/2017 |
| WO | WO 2017/099717 | 6/2017 |
| WO | WO 2017/106724 | 6/2017 |
| WO | WO 2017/150962 | 9/2017 |
| WO | WO 2017/161011 | 9/2017 |
| WO | WO 2017/171731 | 10/2017 |
| WO | WO 2017/173329 | 10/2017 |
| WO | WO 2017/189199 | 11/2017 |
| WO | WO 2017/205250 | 11/2017 |
| WO | WO 2017/209740 | 12/2017 |
| WO | WO 2017/209768 | 12/2017 |

OTHER PUBLICATIONS

U.S. Appl. No. 15/870,677, filed Jan. 12, 2018, Mendell et al.
8231_SearchReport-1_dated Dec. 28, 2017_1-200, 232 pages.
8231_SearchReport-1_dated Dec. 28, 2017_201-400, 230 pages.
8231_SearchReport-1_dated Dec. 28, 2017_401-600, 243 pages.
8231_SearchReport-1_dated Dec. 28, 2017_601-800, 241 pages.
8231_SearchReport-1_dated Dec. 28, 2017_801-1000, 216 pages.
8231_SearchReport-1_dated Dec. 28, 2017_1001-1047, 48 pages.
8231_2ndSearchReport_dated Dec. 28, 2017, 116 pages.
"Is using nitrogen for water-free fracking the way forward?," Shale Gas International, 2014, 5 pages.
"MistFracsm Service," Halliburton Communications, 2005, 2 pages.
Freeman, "A Stimulation Technique Using Only Nitrogen," Society of Petroleum Engineers, SPE-10129-PA, 1983, 2 pages, abstract only.
Grundmann et al., "Cryogenic Nitrogen as a Hydraulic Fracturing Fluid in the Devonian Shale," Society of Petroleum Engineers, SPE-51067-MS, 1998, 2 pages, abstract only.
Gurule, "Nitrogen gas fracking," Frackwire, 2013, 5 pages.
Kennedy et al., "Case Study on the Effectiveness of Nitrogen Foams and Water Zone Diverting Agents in Multistage Matrix Acid Treatments," Society of Petroleum Engineers, SPE-20621-PA, 1992, 2 pages, abstract only.
Li et al., "Chemical Additives and Foam to Enhance SAGD Performance," Society of Petroleum Engineers, SPE-174489-MS, 2015, 2 pages, abstract only.
Little, "Nitrogen-heavy gas drilling method common in Tenn.," Knoxville News Sentinel, 2010, 6 pages.
Morgenthaler et al., "Model Wellbore Evaluation of Diverter Effectiveness Confirmed by Field Results," Society of Petroleum Engineers, SPE-31140-MS, 1996, 2 pages, abstract only.
Parton et al., "Long Interval Foamed Diversion Treatment: A Mid-Scale Multizone Diversion Treatment Study," Society of Petroleum Engineers, SPE-174247-MS, 2015, 2 pages, abstract only.
Presley, "Energized fracturing comes to the Bakken," EP Magazine, 2015, 1 page.
Vincent et al., "Refracs—Why Do They Work, and Why Do They Fail in 100 Published Field Studies?," Society of Petroleum Engineers, SPE 134330-MS, 2010, 2 pages, abstract only.
Vincent, "Restimulation of Unconventional Reservoirs: When are Refracs Beneficial?," Society of Petroleum Engineers, SPE-136757-MS, 2010, 2 pages, abstract only.
Watts, "Waterless fracking promises more energy, less trouble," Watts Up With That?, 2014, 2 pages.
International Search Report and Written Opinion for International (PCT) Patent Application No. PCT/US2015/027301, dated Jul. 10, 2015, 9 pages.
International Preliminary Report on Patentability for International (PCT) Patent Application No. PCT/US2015/027301, dated Oct. 19, 2017, 9 pages.
International Search Report and Written Opinion for International (PCT) Patent Application No. PCT/IB2015/002469, dated Mar. 30, 2016, 11 pages.
International Preliminary Report on Patentability for International (PCT) Patent Application No. PCT/IB2015/002469, dated Oct. 19, 2017, 8 pages.
International Search Report and Written Opinion for International (PCT) Patent Application No. PCT/US2016/063354, dated Feb. 15, 2017, 13 pages.
International Search Report and Written Opinion for International (PCT) Patent Application No. PCT/US17/26089, dated Jun. 20, 2017, 6 pages.
Official Action for Great Britain Patent Application No. 1508229.0, dated May 26, 2015, 2 pages.
Search Report for Great Britain Patent Application No. 1508229.0, dated Jun. 18, 2015, 5 pages.
Official Action for Great Britain Patent Application No. 1522493.4, dated Dec. 31, 2015, 2 pages.
Search Report for Great Britain Patent Application No. 1522493.4, dated Feb. 26, 2016, 5 pages.
Official Action for U.S. Appl. No. 14/690,208, dated Dec. 21, 2016, 15 pages.
Final Action for U.S. Appl. No. 14/690,208, dated Apr. 5, 2017, 22 pages.
Notice of Allowance for U.S. Appl. No. 14/690,208, dated Aug. 14, 2017, 7 pages.
Official Action for U.S. Appl. No. 14/728,719, dated Dec. 21, 2016, 20 pages.
Final Action for U.S. Appl. No. 14/728,719, dated Apr. 3, 2017, 9 pages.
Notice of Allowance for U.S. Appl. No. 14/728,719, dated May 17, 2017, 7 pages.
Official Action for U.S. Appl. No. 14/957,182, dated Dec. 23, 2016, 25 pages.
Final Action for U.S. Appl. No. 14/957,182, dated Apr. 12, 2017, 50 pages.
Notice of Allowance for U.S. Appl. No. 14/957,182, dated Oct. 2, 2017, 8 pages.
Official Action for U.S. Appl. No. 15/197,384, dated Nov. 14, 2016, 8 pages, Restriction Requirement.
Official Action for U.S. Appl. No. 15/197,384, dated Feb. 2, 2017, 27 pages.
Notice of Allowance for U.S. Appl. No. 15/197,384, dated Mar. 8, 2017 26 pages.
Notice of Allowance for U.S. Appl. No. 14/957,182, dated Jan. 31, 2018, 9 pages.
Official Action for U.S. Appl. No. 15/870,713, dated Apr. 6, 2018, 17 pages.
International Preliminary Report on Patentability for International (PCT) Patent Application No. PCT/US2016/063354, dated Jun. 7, 2018, 14 pages.
U.S. Appl. No. 16/096,904, filed Oct. 26, 2018, Mendell et al.
U.S. Appl. No. 16/209,705, filed Dec. 4, 2018, Mendell et al.
International Preliminary Report on Patentability for International (PCT) Patent Application No. PCT/US17/26089, dated Nov. 8, 2018, 5 pages.
Official Action for U.S. Appl. No. 15/870,677, dated Nov. 9, 2018, 37 pages.

\* cited by examiner

GAS DIVERTER FOR WELL AND RESERVOIR STIMULATION

CROSS REFERENCE TO RELATED APPLICATIONS

The present application is a continuation application of and claims priority to U.S. patent application Ser. No. 14/957,182, which was filed Dec. 2, 2015, which claims priority under 35 U.S.C. § 119 to U.S. Provisional Patent Application Nos. 62/196,485, which was filed Jul. 24, 2015; 62/209,201, which was filed Aug. 24, 2015; 62/248,890, which was filed on Oct. 30, 2015; 62/248,907, which was filed Oct. 30, 2015; 62/250,361, which was filed Nov. 3, 2015; 62/250,365, which was filed Nov. 3, 2015; and 62/260,090, which was filed Nov. 25, 2015, and which is a continuation-in-part of and claims priority to U.S. patent application Ser. No. 14/728,719 (now U.S. Pat. No. 9,759,053), which was filed Jun. 2, 2015, which is a continuation-in-part of and claims priority to U.S. patent application Ser. No. 14/690,208 (now U.S. Pat. No. 9,828,843), which was filed Apr. 17, 2015, which claims priority under 35 U.S.C. § 119 to U.S. Provisional Patent Application No. 62/145,439, which was filed Apr. 9, 2015, all of which are entitled "GAS DIVERTER FOR WELL AND RESERVOIR STIMULATION," and each of which is incorporated in its entirety herein by this reference.

BACKGROUND

Oil and gas wells are stimulated and re-stimulated in various ways to increase production of a flow of hydrocarbons from a completed well. With a newly completed well with a large reservoir and easily captured hydrocarbons, for example, the well may not require much or any stimulation techniques to produce an adequate flow of hydrocarbons from the well. Other wells, depending on composition or otherwise, may require more well stimulation to release the hydrocarbons from the subterranean formation containing the hydrocarbons.

In recent years, hydraulic fracturing has become a widely-used well stimulation technique to increase well production and access previously uncaptured hydrocarbons. Hydraulic fracturing involves hydraulically fracturing the subterranean formation with a pressurized liquid or fracturing liquid, containing water, proppant (e.g., sand or man-made alternative), and/or chemicals, that is injected into a wellbore. Upon pressurizing the wellbore with the fracturing liquid, the formation fractures or cracks and the fracturing liquid can leave behind proppant, propping open the formation which allows the hydrocarbons to flow more freely through the fractures and into the wellbore to be recovered. In some instances, an artificial lift system may pump hydrocarbons from the reservoir to overcome the hydrostatic head pressure of the hydrocarbons, or the hydrocarbons may flow freely up the wellbore without assistance.

SUMMARY

These and other needs are addressed by the present disclosure. Aspects of the present disclosure can have advantages over current practices. In contrast to current practices, the process(es) of the present disclosure can, in accordance with some embodiments, change the fracture gradient of a downhole formation. For example, the processes described herein can change one or more of the fracture gradients of the low and high stress downhole formations. More particularly, the process of the present disclosure in relation to the current practices can decrease the extent and/or degree of fracturing within the low stress downhole formations and increase the degree of fracturing within the high stress formations. Furthermore, the processes of the present disclosure can be conducted in the absence or substantial absence of solid particulates. It can be appreciated that solid particles can be detrimental to well health and productivity. Moreover, the process of the present disclosure can be used in any well bore orientation, whether horizontal, vertical or in between. It can be appreciated that the advantages of processes of the present disclosure can improve well economics and increase recoverable reserves. While not wanting to be bound by any theory, it is believed the processes described within this disclosure can change the fracture pressure gradient of a downhole formation by changing the stress profile and therefore easier to fracture with a fracturing liquid. It is further believed that injecting a gas and/or foam can increase the formation pore pressures of the high and low stress formations exposed by the well bore. Moreover, it is believed that injecting of the gas and/or foam can substantially equalize the pore pressures of the high and low stress formations. It can be appreciated that one or both of the increased pore pressures of the high and low stress formations and the substantially equalized pore pressures of the high and low stress formations can change the fracture gradients of one or both of the high and low stress formations compared to current practices.

In accordance with some aspects of the present disclosure is a process and/or method of treating a subterranean formation penetrated by a wellbore. The process and/or method can include introducing a gas-containing composition comprising one or more of gases, a foam, or a mixture of gas and foam into one or more features of the subterranean formation extending from the wellbore. The one or more features can comprise fractures, pore volumes or a combination of fractures and pore volumes. The method and/or process can further include introducing a diverting composition into the one or more features of the subterranean formation extending from the wellbore. Typically, the diverting composition is introduced into the subterranean formation after the introduction of the gas-containing composition into the subterranean formation. However, in some embodiments, the diverting composition can be introduced into the subterranean formation before the introduction of the gas-containing composition. Generally, the diverting composition contains one or more of a diverting fluid and a diverting agent. The diverting fluid can be a gas-phase fluid or a liquid-phase fluid. Commonly, the diverting fluid is a liquid-phase fluid. In accordance with some embodiments, the process and/or method can include introducing a fracturing liquid into the subterranean formation. The fracturing liquid can be introduced into the subterranean formation under sufficient pressure. It can be appreciated that the introducing of the fracturing liquid into the subterranean formation under sufficient pressure can fracture a portion of the subterranean formation. It can be further appreciated that the fracturing of a portion of the subterranean formation can release hydrocarbons from the subterranean formation. It is believed that the gas occupies the features at a sufficient pressure to cause the fracturing liquid to be diverted to additional features of the subterranean formation defined by the portion, the additional features including additional fractures or pore volumes.

Aspects of the present disclosure involve a method of treating a subterranean formation penetrated by a wellbore. The method includes introducing a composition comprising a gas (or foam) into features of the subterranean formation extending from the wellbore, the features including fractures or pore volumes. The method further includes introducing a diverting composition including a fluid and a diverting agent into the features of the subterranean formation extending from the wellbore. The method further includes introducing a fracturing liquid into the subterranean formation under sufficient pressure to fracture a portion of the subterranean formation and release hydrocarbons from the subterranean formation, wherein the gas occupies the features at a sufficient pressure to cause the fracturing liquid to be diverted to additional features of the subterranean formation defined by the portion and the additional features including additional fractures or pore volumes.

Aspects of the present disclosure may also involve a method of treating a subterranean formation penetrated by a wellbore. The method may include introducing a first diverting composition consisting of a gas (or foam) into a wellbore and into fractures or pore volumes of the subterranean formation extending from the wellbore. The method further includes introducing a second diverting composition including a fluid and a diverting agent into the subterranean formation. The method further includes introducing a fracturing liquid (e.g., liquid) into the subterranean formation, wherein the gas (or foam) is sufficiently pressurized within the fractures or pore volumes to cause the fracturing liquid to pressurize and fracture additional fractures or pore volumes within the subterranean formation.

Aspects of the present disclosure may also involve a method of treating a subterranean formation penetrated by a wellbore. The method may include introducing a first diverting composition comprising a foam mixture of gas and liquid into features of the subterranean formation extending from the wellbore, the features comprising fractures or pore volumes. The method may further include introducing a second diverting composition comprising a fluid and a diverting agent into the subterranean formation. The method may further include introducing a fracturing liquid into the subterranean formation under sufficient pressure to fracture a portion of the subterranean formation and release hydrocarbons from the subterranean formation, wherein the foam mixture occupies the features at a sufficient pressure to cause the fracturing liquid to be diverted to additional features of the subterranean formation defined by the portion, the additional features comprising additional fractures or pore volumes.

Aspects of the present disclosure may also involve a method of treating a subterranean formation penetrated by a wellbore. The method may include introducing a composition comprising a substantially compressible substance into features of the subterranean formation extending from the wellbore, the features comprising fractures or pore volumes. The method may further include introducing a substantially incompressible substance into the subterranean formation under sufficient pressure to fracture a portion of the subterranean formation and release hydrocarbons from the subterranean formation, wherein the substantially compressible substance occupies the features at a sufficient pressure to cause the substantially incompressible substance to be diverted to additional features of the subterranean formation defined by the portion, the additional features comprising additional fractures and pore volumes.

In accordance with some embodiments of this disclosure is a method that includes injecting a gas into a wellbore at a rate from about 30 to about 500,000 scf/min, where the injected gas occupies first and second portions of a subterranean formation and thereafter, introducing a fracturing liquid into the wellbore at a sufficient pressure to fracture the second portion of the subterranean formation to a greater extent than the first portion of the subterranean formation.

In accordance with some embodiments of this disclosure is a method that includes injecting a gas into a wellbore at a rate from about 30 to about 500,000 scf/min and thereafter, introducing a fracturing liquid into the wellbore at a sufficient pressure to fracture a subterranean formation, and where: (i) the subterranean formation has a first hydrocarbon production rate prior to the injecting of the gas; (ii) the injected gas occupies some of the subterranean formation; (iii) the fractured subterranean formation has a second hydrocarbon production rate; and (iv) the second hydrocarbon production rate is greater than the first hydrocarbon production rate.

In accordance with some embodiments of this disclosure is a method that includes injecting from about 1,000 scf to about 1,000,000,000 scf of a gas into a wellbore, where the injected gas occupies first and second portions of a subterranean formation, and thereafter, introducing a fracturing liquid into the wellbore at a sufficient pressure to fracture the second portion of the subterranean formation to a greater extent than the first portion of the subterranean formation.

In accordance with some embodiments of this disclosure is a method that includes injecting from about 1,000 to about 1,000,000,000 scf of a gas into a wellbore, and thereafter, introducing a fracturing liquid into the wellbore at a sufficient pressure, and where: (i) the subterranean formation has a first hydrocarbon production rate prior to the injecting of the gas; (ii) the injected gas occupies some of the subterranean formation; (iii) the injected gas is injected at a sufficient pressure to fracture the subterranean formation; (iv) the fractured subterranean formation has a second hydrocarbon production rate; and (iv) the second hydrocarbon production rate is greater than the first hydrocarbon production rate.

In accordance with some embodiments of this disclosure is a method that includes injecting a gas into a wellbore, where the injected gas occupies first and second portions of a subterranean formation and the gas injected in the first and second portions of the subterranean formation comprises at least about 500 scf/lfCA over a lfCA from about 1 foot to about 15 miles of the wellbore, and thereafter, introducing a fracturing liquid into the wellbore at a sufficient pressure to fracture the second portion of the subterranean formation to a greater extent than the first portion of the subterranean formation.

In accordance with some embodiments of this disclosure is a method of injecting a gas into a wellbore at a rate from about 30 to 500,000 scf/min, wherein the injected gas occupies a portion of a subterranean formation and, thereafter, introducing a fracturing liquid into the wellbore at a sufficient pressure to fracture the subterranean formation.

In accordance with some embodiments of this disclosure is a method of injecting a gas into a wellbore at a rate from about 30 to 500,000 scf/min, wherein the injected gas occupies first and second portions of a subterranean formation and, thereafter, introducing a fracturing liquid into the wellbore at a sufficient pressure to fracture the subterranean formation.

In accordance with some embodiments of this disclosure is a method of injecting from about 1,000 to 1,000,000,000 scf of gas into a wellbore, wherein the injected occupies a portion of the subterranean formation and, thereafter, introducing a fracturing liquid into the wellbore at a sufficient pressure to fracture the subterranean formation. In accordance with some embodiments of this disclosure is a method of injecting from about 1,000 to 1,000,000,000 scf of gas into a wellbore, wherein the injected occupies first and second portions of the subterranean formation and, thereafter, introducing a fracturing liquid into the wellbore at a sufficient pressure to fracture the subterranean formation.

In accordance with some embodiments of this disclosure is a method that includes injecting a gas into a wellbore and thereafter, introducing a fracturing liquid into the wellbore at a sufficient pressure to fracture at least some of a subterranean formation, where: (i) the injected gas occupies a subterranean formation comprises at least about 500 scf/lfCA over a lfCA from about 1 foot to about 15 miles of the wellbore; (ii) the subterranean formation has a first hydrocarbon production rate before the injecting of the gas; (iii) the fractured subterranean formation has a second hydrocarbon production rate; and (iv) the second hydrocarbon production rate is greater than the first hydrocarbon production rate.

In some embodiments of the disclosure, the first portion of the subterranean formation can contain first portion fractures. In some embodiments of the disclosure, the first portion of the subterranean formation can contain first portion pore volumes. Furthermore, in some embodiments, the first portion of the subterranean formation can contain first portion fractures and first portion pore volumes.

In some embodiments of the disclosure, the second portion of the subterranean formation can contain second portion fractures. In some embodiments of the disclosure, the second portion of the subterranean formation can contain second portion pore volumes. Furthermore, in some embodiments of the disclosure, the second portion of the subterranean formation can contain second portion fractures and second portion pore volumes.

In some embodiments of the disclosure, the first portion of the subterranean formation can be a low pressure stress zone. In some embodiments of the disclosure, the first portion of the subterranean formation can be a first pressure stress zone. In some embodiments of the disclosure, the first portion of the subterranean formation can be a previously hydraulic fractured zone. In some embodiments of the disclosure, the first portion of the subterranean formation can be a combination of a low pressure stress zone and previously hydraulic fractured zone. Moreover, in some embodiments of the disclosure, the first portion of the subterranean formation can be one of low pressure stress zone, a previously hydraulic fractured zone, a combination thereof.

In some embodiments of the disclosure, the second portion of the subterranean formation can be a high pressure stress zone. In some embodiments of the disclosure, the second portion of the subterranean formation can be a second pressure stress zone. In some embodiments of the disclosure, the second portion of the subterranean formation can be a non-previously hydraulic fractured zone. In some embodiments of the disclosure, the second portion of the subterranean formation can be a previously unstimulated zone. In some embodiments of the disclosure, the second portion of the subterranean formation can be a previously under stimulated zone. In some embodiments of the disclosure, the second portion of the subterranean formation can be one or more of a high pressure stress zone, a non-previously hydraulic fractured zone, a previously unstimulated zone, and a previously under stimulated zone. Furthermore, in some embodiment of the disclosure, the second portion of the subterranean formation can be one of a high pressure stress zone, a non-previously hydraulic fractured zone, a previously unstimulated zone, a previously under stimulated zone or a combination thereof.

In accordance with some embodiments of the disclosure, the gas can be an inert gas. In accordance with some embodiments of the disclosure, the gas can be nitrogen (N2). In accordance with some embodiments of the disclosure, the gas can be hydrogen (H2). In accordance with some embodiments of the disclosure, the gas can be methane (CH4). In accordance with some embodiments of the disclosure, the gas can be ethane (CH3-CH3). In accordance with some embodiments of the disclosure, the gas can be propane (C3H8). In accordance with some embodiments of the disclosure, the gas can be butane (C4H10). In accordance with some embodiments of the disclosure, the gas can be carbon dioxide (CO2). In accordance with some embodiments of the disclosure, the gas can be one or more of nitrogen (N2), hydrogen (H2), methane (CH4), ethane (CH3-CH3), propane (C3H8), butane (C4H10), carbon dioxide (CO2), and inert gas.

In accordance with some embodiments of the disclosure, the method can include the gas being in the gas phase during the injecting of the gas into the wellbore. In accordance with some embodiments of the disclosure, the method can include the gas being in the liquid phase during the injecting of the gas into the wellbore. In accordance with some embodiments of the disclosure, the method can include the gas being in the form of a foam during the injecting of the gas into the wellbore. Moreover, in accordance with some embodiments of the disclosure, the method can include the gas being in the form of one or more of gas phase, liquid phase, foam, or combination thereof. In some embodiments, the foam can be more gas by volume than liquid by volume. Moreover, in some embodiments the foam can have no more than about 50 volume % liquid. Furthermore, in accordance with some embodiments, the foam can have less gas by volume than liquid by volume.

In accordance with some embodiments of the disclosure, the method can include introducing, after the injecting of the gas but before the introducing of the fracturing liquid, a diverting agent into the wellbore. Furthermore, in some embodiments, the diverting agent can be injected at a sufficient pressure to occupy at least some of the first portion of the subterranean formation. Moreover, the first portion of the subterranean formation can contain one or more of first portion fractures and first portion pore volumes. In some embodiments, the diverting agent can occupy at least some of one or more of the first portion fractures and the first portion pore volumes. In some embodiments, the diverting agent occupies at least of most the first portion fractures and the first portion pore volumes. In accordance with some embodiments of the disclosure, the introducing of the diverting agent can begin immediately after terminating the injection of the gas into the wellbore. The diverting agent can be in some embodiments selected from the group consisting essentially of a chemical diverting agent, a mechanical diverting agent, a degradable fiber, benzoic acid, or a combination thereof. Moreover, the diverting agent can be a chemical diverting agent. The diverting agent can be, in some embodiments, a mechanical diverting agent. It can be appreciated that in some embodiments, the diverting agent can be a degradable diverting agent. Furthermore, the diverting agent can be benzoic acid or a benzoic acid derivative.

In accordance with some embodiments of the disclosure, the method can include maintaining a dwell period between the injecting of the gas in the wellbore and the introducing of the fracturing liquid into the well bore. In some embodiments, the dwell period can be less than one hour. In some embodiments, the dwell period can be less than 24 hours. In some embodiments, the dwell period can be more than 24 hours. In some embodiments, the dwell period can be one of less than one hour, less than 24 hours, and more than 24 hours.

In some embodiments of the disclosure, the gas can be injected into the wellbore at a rate of about 30 to about 500,000 scf/min.

In some embodiments of the disclosure, the gas injected into the wellbore can be from about 1,000 to about 1,000,000,000 scf. Moreover, in some embodiments, the gas injected into the wellbore can be from about 1,000 to about 100,000,000 scf. Furthermore, the gas injected into the wellbore can be, in some embodiments, more than about 1×109 scf.

In some embodiments of the disclosure, the gas injected in the first and second portions of the subterranean formation can be at least about 500 scf/lfCA over a lfCA from about 1 foot to about 15 miles of the wellbore. Moreover, in some embodiments, the gas injected in the first and second portions of the subterranean formation can be no more than about 5, scf/lfCA over a lfCA from about 1 foot to about 15 miles of the wellbore.

In accordance with some embodiments of the disclosure, the second portion of the subterranean formation can commonly have a pressure of at least about 5% more than the first portion of the subterranean formation. More commonly, the second portion of the subterranean formation can have a pressure of at least about 10% more, even more commonly a pressure of at least about 50% more, yet even more commonly a pressure of at least about 100% more, yet even more commonly a pressure of at least about 200% more, yet even more commonly a pressure of at least about 500% more, yet even more commonly a pressure of at least about 1,000% more, yet even more commonly a pressure of at least about 2,500% more, yet even more commonly a pressure of at least about 5,000% more, yet even more commonly a pressure of at least about 7,500% more, or even yet more commonly a pressure of at least about 10,000% more than the first portion of the subterranean formation.

Aspects of the present disclosure involve a method of treating a subterranean formation penetrated by a wellbore. The method includes introducing a composition comprising a gas (or foam) into features of the subterranean formation extending from the wellbore, the features including fractures or pore volumes. The method further includes introducing a diverting composition including a fluid and a diverting agent into the features of the subterranean formation extending from the wellbore. The method further includes introducing a carrier fluid into the subterranean formation under sufficient pressure to fracture a portion of the subterranean formation and release hydrocarbons from the subterranean formation, wherein the gas occupies the features at a sufficient pressure to cause the carrier fluid to be diverted to additional features of the subterranean formation defined by the portion, the additional features including additional fractures or pore volumes.

Aspects of the present disclosure may also involve a method of treating a subterranean formation penetrated by a wellbore. The method may include introducing a first diverting composition consisting of a gas (or foam) into a wellbore and into fractures or pore volumes of the subterranean formation extending from the wellbore. The method further includes introducing a second diverting composition including a fluid and a diverting agent into the subterranean formation. The method further includes introducing a carrier fluid (e.g., liquid) into the subterranean formation, wherein the gas (or foam) is sufficiently pressurized within the fractures or pore volumes to cause the carrier fluid to pressurize and fracture additional fractures or pore volumes within the subterranean formation.

Aspects of the present disclosure may also involve a method of treating a subterranean formation penetrated by a wellbore. The method may include introducing a first diverting composition comprising a foam mixture of gas and liquid into features of the subterranean formation extending from the wellbore, the features comprising fractures or pore volumes. The method may further include introducing a second diverting composition comprising a fluid and a diverting agent into the subterranean formation. The method may further include introducing a carrier fluid into the subterranean formation under sufficient pressure to fracture a portion of the subterranean formation and release hydrocarbons from the subterranean formation, wherein the foam mixture occupies the features at a sufficient pressure to cause the carrier fluid to be diverted to additional features of the subterranean formation defined by the portion, the additional features comprising additional fractures or pore volumes.

Aspects of the present disclosure may also involve a method of treating a subterranean formation penetrated by a wellbore. The method may include introducing a composition comprising a substantially compressible substance into features of the subterranean formation extending from the wellbore, the features comprising fractures or pore volumes. The method may further include introducing a substantially incompressible substance into the subterranean formation under sufficient pressure to fracture a portion of the subterranean formation and release hydrocarbons from the subterranean formation, wherein the substantially compressible substance occupies the features at a sufficient pressure to cause the substantially incompressible substance to be diverted to additional features of the subterranean formation defined by the portion, the additional features comprising additional fractures and pore volumes.

The present disclosure can have advantages over current practice. For example, it can divert effectively the carrier fluid from a selected area of the well bore (or formation), such as the low stress area, thereby improving well economics and increasing recoverable reserves. It can divert the carrier fluid in the absence or substantial absence of solid particulates, which can be detrimental to well health and productivity, and be used in any well bore orientation, whether horizontal or vertical. It can change the fracture pressure gradient of a down hole formation by making the formation more brittle and therefore easier to fracture by the carrier fluid. While not wishing to be bound by any theory, it is believed that the gas (or foam) increases the formation pore pressure and substantially equalizes the pore pressure across the various formations exposed by the well bore.

Aspects of the present disclosure involve a method of treating a subterranean formation penetrated by a wellbore. The method includes introducing a composition including a gas into features of the subterranean formation extending from the wellbore. The features including fractures or pore volumes. This step is followed by introducing a carrier fluid into the subterranean formation under sufficient pressure to fracture a portion of the subterranean formation and release hydrocarbons from the subterranean formation. The gas may occupy the features at a sufficient pressure to cause the carrier fluid to be diverted to additional features of the subterranean formation defined by the portion. The additional features may include additional fractures or pore volumes.

Aspects of the present disclosure may also involve a method of treating a subterranean formation penetrated by a wellbore. The method includes introducing a diverting composition consisting of a gas into a wellbore and into fractures or pore volumes of the subterranean formation extending from the wellbore and introducing a carrier fluid into the subterranean formation, the gas being sufficiently pressurized within the fractures or pore volumes to cause the carrier fluid to pressurize additional fractures or pore volumes within the subterranean formation.

Aspects of the present disclosure may also involve a method of treating a subterranean formation penetrated by a wellbore. The method includes introducing a diverting composition including a foam mixture of gas and liquid into features of the subterranean formation extending from the wellbore. The features may include fractures or pore volumes. The method may additionally include introducing a carrier fluid into the subterranean formation under sufficient pressure to fracture a portion of the subterranean formation and release hydrocarbons from the subterranean formation. The foam mixture may occupy the features at a sufficient pressure to cause the carrier fluid to be diverted to additional features of the subterranean formation defined by the portion. The additional features may include additional fractures or pore volumes.

Aspects of the present disclosure may also involve a method of treating a subterranean formation penetrated by a wellbore. The method may include introducing a composition including a substantially compressible substance into features of the subterranean formation extending from the wellbore. The features may include fractures or pore volumes. The method may additionally include introducing a substantially incompressible substance into the subterranean formation under sufficient pressure to fracture a portion of the subterranean formation and release hydrocarbons from the subterranean formation. The substantially compressible substance may occupy the features at a sufficient pressure to cause the substantially incompressible substance to be diverted to additional features of the subterranean formation defined by the portion. The additional features may include additional fractures and pore volumes.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings, which are incorporated in and constitute a part of the specification, illustrate embodiments of the disclosure and together with the general description of the disclosure given above and the detailed description given below, serve to explain the principles of the disclosure.

DETAILED DESCRIPTION

In recent years, hydraulic fracturing has become a widely-used well stimulation technique to increase well production and access previously uncaptured hydrocarbons. Hydraulic fracturing involves hydraulically fracturing the subterranean formation with a pressurized liquid or carrier, liquid, containing, water, proppant (e.g., sand or man-made alternative), and/or chemicals, that is injected into a wellbore. Upon pressurizing the wellbore with the carrier liquid, the formation fractures or cracks and the carrier fluid can leave behind proppant, which allows the hydrocarbons to flow more freely through the fractures and into the wellbore to be recovered. In some instances, a downhole electric submersible pump may pump the hydrocarbons from the reservoir to overcome the hydrostatic head pressure of the hydrocarbons, or the hydrocarbons may flow freely up the wellbore without assistance.

Figure 1:
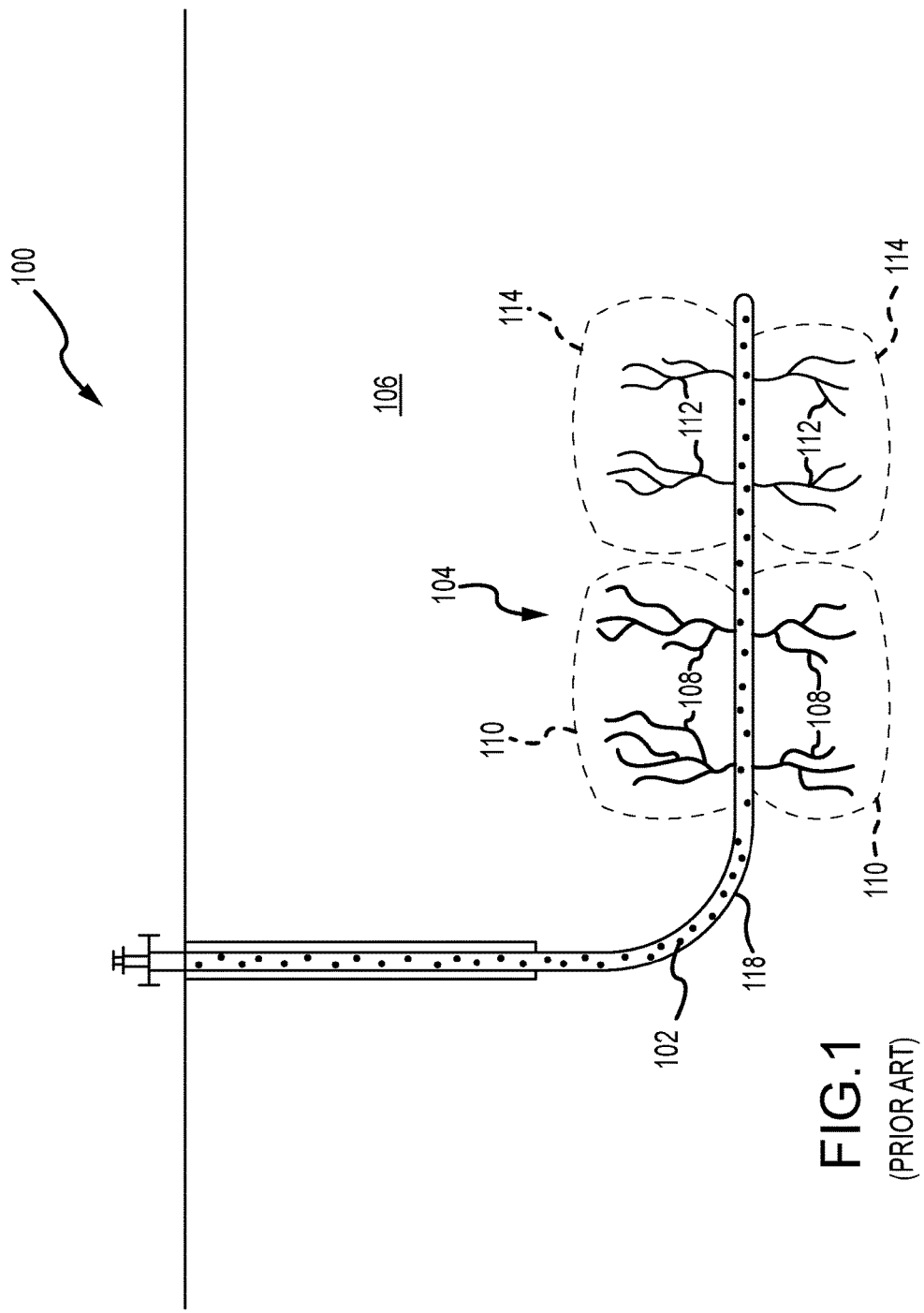
FIG. 1 depicts a well undergoing a stimulation treatment according to the prior art, and a side view of a hydraulic fracturing operation showing high and low stress zones.

As seen in FIG. 1, which is a side view of a horizontal drilling operation 100 utilizing hydraulic fracturing, a pressurized liquid 102 may cause multiple fractures 104 within the subterranean formation 106. Fractures 104 formed by the pressurized liquid 102 can be of varying sizes. Accordingly, larger fractures or pore volumes 108 may cause a lower stress zone 110 within the formation such that upon stimulation and re-stimulation of the well the carrier liquid 102 tends to concentrate in these lower stress zones 110. These lower stress zones 110 can be caused by hydrocarbon depletion, lower pore pressure, and/or higher permeability of the reservoir 106. Permeability of the reservoir can, in part, depend on the extensiveness of fractures and/or pores, and the interconnectivity of the fractures and/or pores that create pathways for hydrocarbons to flow. As a result of the lower stress zones, the hydrocarbons are more likely to flow through these larger fractures or pore volumes 108, and/or those with interconnectivity, until depletion. The fractures and/or pore volumes 104 of finer sizes 112 and/or those lacking interconnectivity tend to be concentrated in higher stress zones 114 such that the carrier liquid 102 is less likely to effectively hydraulically fracture those higher stress zones and thus influence the flow of hydrocarbons in these regions upon stimulation or re-stimulation. This is in part, because the pressure of the carrier liquid 102 is generally evenly distributed along the wellbore in the treated area such that the carrier liquid I 02 remains concentrated in the lower stress zones 110 rather than the higher stress zones 114. The higher stress zones 114, in contrast to the lower stress zones 110, can be caused by higher pore pressure, ineffective hydraulically fractured regions, lower permeability of the reservoir 106, or generally less depleted portions of the reservoir 106. As such, the carrier liquid 102 tends to not affect the higher stress zones 114, which may contain hydrocarbons, unless additional systems and methods are employed.

In subsequent well treatments or in initial well, treatments, diverter systems may be used to divert the carrier liquid 102 from the lower stress zones 110, which may be depleted from previous treatments, to the previously un-accessed, higher stress zones 114. Diverting the carrier liquid 102 into these higher stress zones 114 may be difficult over large areas of the wellbore and reservoir for a number of reasons. In new wells, the difficulty may be due to differences in stresses from different lithologies or from different reservoir characteristics along the well. Differences in stress can be due to natural in-situ stress conditions or man-made activities such as well stimulation or depletion of fluids. In previously stimulated wells, the difficulty may be due to adequately blocking the fractures and/or pore volume 108 in the lower stress zones 110 such that the carrier liquid 102 pressurizes the fractures 112 of the higher stress zones 114. Diverter systems include the use of particulates (e.g., polymers) and chemical diverters within the carrier liquid 102, among other methods, to block either the wellbore or the formation near the wellbore so that a portion of the carrier liquid 102 may be diverted to the fractures 112 in the higher stress zones 114 and also create new fractures in the higher stress zones.

Aspects of the presently disclosed technology involve a diversion technique for use in vertical, deviated, or horizontal wells undergoing a stimulation process (e.g., initial stimulation or re-stimulation) to divert a carrier liquid from treating previously stimulated areas (i.e., lower stress zones of the formation) and to force the carrier liquid to treat previously unstimulated areas (i.e., higher stress zones of the formation). The methods disclosed provide cost-effective means for improving the well production. After a wellbore is drilled and completed, stimulation operations are usually performed to enhance hydrocarbon (e.g. gas, oil, etc.) production into the wellbore and to enhance extraction of the hydrocarbons from the subterranean formation. Current diversion techniques use liquid or solid forms, such as chemical solutions (e.g., a borate solution) or, particulates (e.g., polymers spheres), which can be costly and potentially ineffective in diverting fluid to the higher stress regions/zones of the reservoir. Additionally, liquid- and solid-form diverters can be problematic as they leave residue that can damage the subterranean formation and can lead to inhibited production from the well. In contrast, the methods of the present disclosure are cost effective, operationally feasible based on current equipment available to the industry, and can enhance the rate of extraction of the hydrocarbons. In particular, the use of a gas as the diversion medium allows for greater filling of the reservoir in lower stress zones such that a carrier liquid can be more efficiently diverted to the higher stress zones of the reservoir. The use of a gas as the diversion medium also has advantages in that no residue remains and the gas can be recovered during flowback. In certain instances, the gas may be recovered during flowback can be reused, recycled, or marketed.

Further, FIG. 1 depicts a side view of a horizontal drilled well 100 treated according to a method of the prior art utilizing a fracturing liquid 102 to produce multiple fractures 104 within a subterranean formation 106. The multiple fractures 104 produced by the pressurized liquid 102 can vary in size. Typically, low stress zones 110 contain larger fractures and/or pore volumes 108 than high stress zones 114. During stimulation, re-stimulation or re-fracturing the fracturing liquid 102 typically tends to concentrate in the larger fractures and/or larger pore volumes 108 of low stress zones 110. These low stress zones 110 tend to be zones of hydrocarbon depletion, lower pore pressure, higher permeability, or a combination thereof. Permeability of the reservoir can, in part, depend on the extensiveness and interconnectivity of the fractures and/or pores. Moreover, hydrocarbon flow typically depends on the extensiveness and/or interconnectivity of the fractures and/or pores that create pathways for the hydrocarbon. The hydrocarbons are more likely to flow through these larger and/or more interconnected fractures and/or pore volumes 108. The high stress zones 114 tend to be zones having finer and/or less interconnected fractures and/or pore volumes 112 such that the fracturing liquid 102 is less likely to hydraulically fracture these high stress zones 114. These finer and/or less interconnected fractures and/or pore volumes 112 can influence the flow of hydrocarbons in these regions upon stimulation or re-stimulation. This is in part, because the pressure of the fracturing liquid 102 is generally distributed along the wellbore 118 in the treated area such that the pressurized fracturing liquid 102 can achieve the fracture gradient in the low stress zones 110 but not the high stress zones 114. The high stress zones 114, in contrast to the low stress zones 110, can have one or more of higher pore pressure, ineffective hydraulically fractured regions, lower permeability, or generally less depleted portions of the subterranean formation 106. As such, the fracturing liquid 102 is one or more of less likely to permeate these lower permeability and/or generally less depleted portions of the subterranean formation 106 and less likely to achieve the fracture gradient threshold in these higher pore pressure, high stress zones 114. Accordingly, unless additional systems and methods are employed the hydrocarbons in these high stress zones 114 are difficult to produce due to high pore pressures and/or low permeability of these zones.

In subsequent or initial well treatments diverter systems can be used to divert the fracturing liquid 102 from the low stress zones 110, which can be depleted from previous treatments, to the previously un-accessed, high stress zones 114. Diverting the fracturing liquid 102 into these high stress zones 114 can be difficult over large areas of the wellbore 118 and reservoir for a number of reasons. In new wells, the difficulty can be due to differences in stresses from different lithologies or from different reservoir characteristics along the wellbore 118. Differences in stress can be due to natural in-situ stress conditions or man-made activities such as well stimulation or depletion of fluids, such as hydrocarbons. In previously stimulated wells, the difficulty can be due to adequately blocking the fractures and/or pore volume 108 in the low stress zones 110 such that the fracturing liquid 102 pressurizes the high stress zones 114. Diverter systems can include the use of particulates (e.g., inorganic and/or organic polymeric particulates) and chemical diverters within the fracturing liquid 102, among other methods, to block either the wellbore 118 or the subterranean formation 106 near the wellbore 118 so that a portion of the fracturing liquid 102 can be diverted to the high stress zones 114 and create new fractures 112 in the high stress zones 114.

Aspects of the presently disclosed technology involve a diversion technique for use in vertical, deviated, or horizontal wells undergoing a stimulation process (e.g., initial stimulation or re-stimulation). The presently disclosed technology can divert a fracturing liquid from treating one or more previously stimulated areas (i.e., low stress zones of the formation) to one or more previously unstimulated zones (i.e., high stress zones of the formation). As used herein a previously unstimulated area can refer to one or more of a previously unstimulated high stress zone, a previously unstimulated low stress zone, a previously partially stimulated high stress zone, a previously partially stimulate low stress zone, or a combination thereof.

The methods disclosed herein can provide cost-effective means for improving hydrocarbon production from a well. After a wellbore is drilled and completed, stimulation operations are usually performed to enhance hydrocarbon (e.g. gas, oil, etc.) production into the wellbore and to enhance extraction of hydrocarbons from the subterranean formation 206. It can be appreciated that the above-described initial well treatments and/or subsequent well treatments can direct a fracturing liquid 202 to one or more previously unstimulated zones. The previously unstimulated zones can be high stress zones 214. Aspects of the present disclosure can involve a technique for use in vertical, deviated, or horizontal wells undergoing a stimulation process (e.g., initial stimulation or re-stimulation) to direct a fracturing liquid 202 to treat a previously unstimulated zone.

Current diversion techniques use liquid or solid forms, such as chemical solutions (e.g., a borate solution) or, particulates (e.g., polymers spheres). The methods of the present disclosure are cost effective, operationally feasible based on current equipment available to the industry, and can enhance the rate of extraction of the hydrocarbons. In particular, the use of a gas (or foam) as the diversion medium allows for greater filling of the reservoir in low stress zones such that a fracturing liquid can be more efficiently diverted to the higher stress zones of the reservoir. The use of a gas (or foam) as the diversion medium also has advantages in that the gas (or gas component of the foam) can be recovered during flowback. In certain instances, the gas (or gas component of the foam) can be recovered during flowback can be reused, recycled, or marketed.

Moreover, the methods of the present disclosure can use one of a gas as the medium for treating the previously unstimulated zones. As used herein the gas can generally refer to any chemical composition in the gaseous phase including but not limited to a single phase gaseous system, a foam (that is, a gas entrapped within a liquid), and a combination thereof (that is, a system having some gas entrapped within a liquid and some gas not entrapped within a liquid). It is believed that the gas can more effectively penetrate one or both of the fractures and pore volumes of the previously unstimulated zones than the fracturing liquid 202. That is, the gas can more easily fill and pressurize the one or both of the fractures and pore volumes of the previously unstimulated zones more easily than the fracturing liquid 202. Furthermore, it is believed that one or both of the fractures and pore volumes of the previously unstimulated zones filled and/or pressurized with a gas can be efficiently stressed and fractured.

In accordance with some embodiments of the disclosure, the method can include stimulating a well and reservoir by alternating or simultaneously introducing a gas diverter and a conventional diverter (e.g., chemical, biological, or mechanical diverter systems known and unknown). In certain instances, using a conventional diverter along with the gas diverter, described herein, could produce better economic results than either one could produce on their own. In some embodiments, the method includes introducing a gas and a conventional diverter system into a reservoir. The gas and conventional diverter system can be introduced simultaneously or one after the other in any order and/or combination. While not wanting to be bound by example: the gas can be introduced prior to the conventional diverter system; or a first portion of the gas can be introduced prior to the conventional diverter system and a second portion of gas can be introduce after the conventional diverter system; or the convention diverter system can be introduced prior to gas being introduced.

Figure 2A:
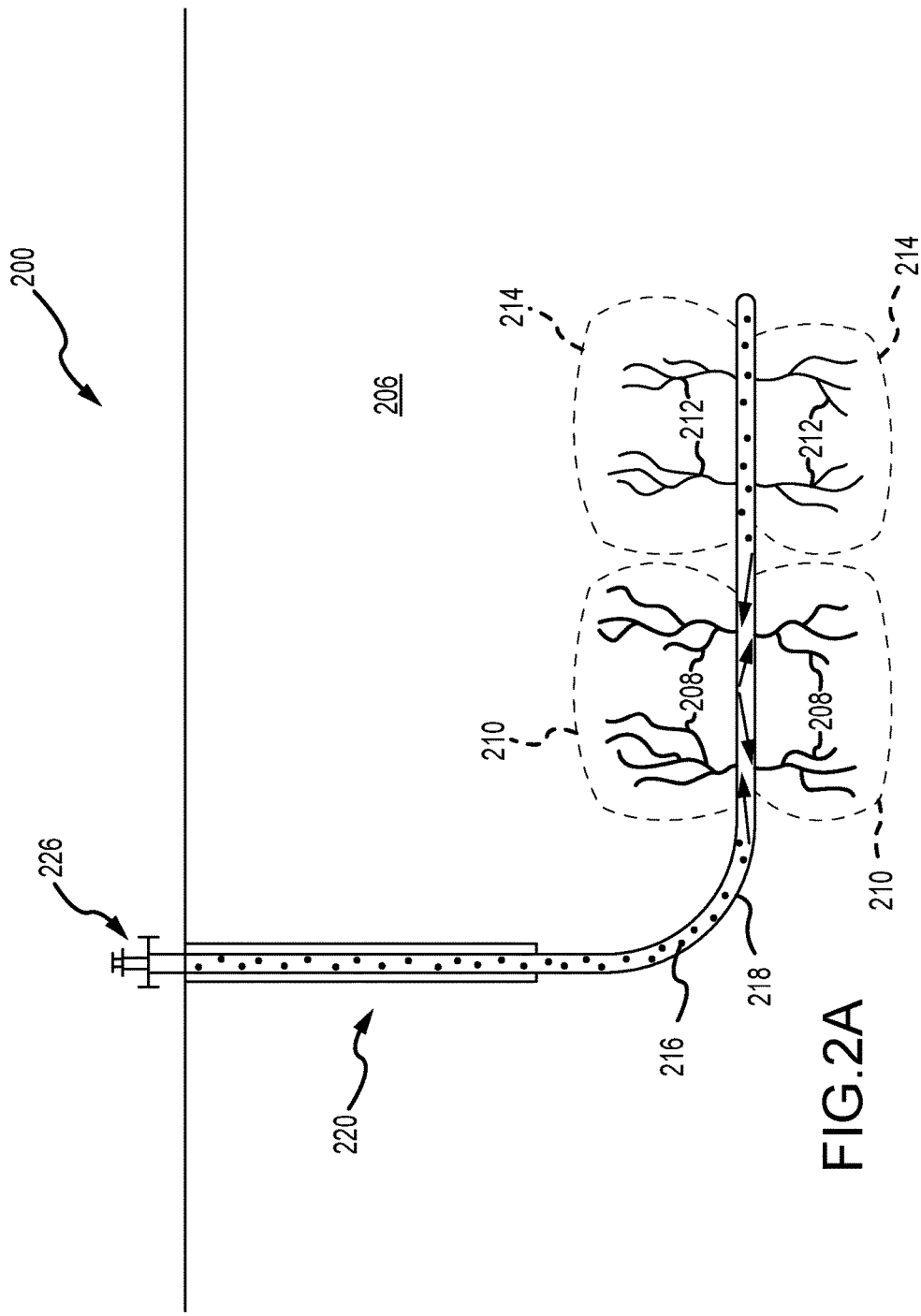
FIGS. 2A and 2B depict a well undergoing a stimulation treatment according to some embodiments of present disclosure.
Figure 2B:
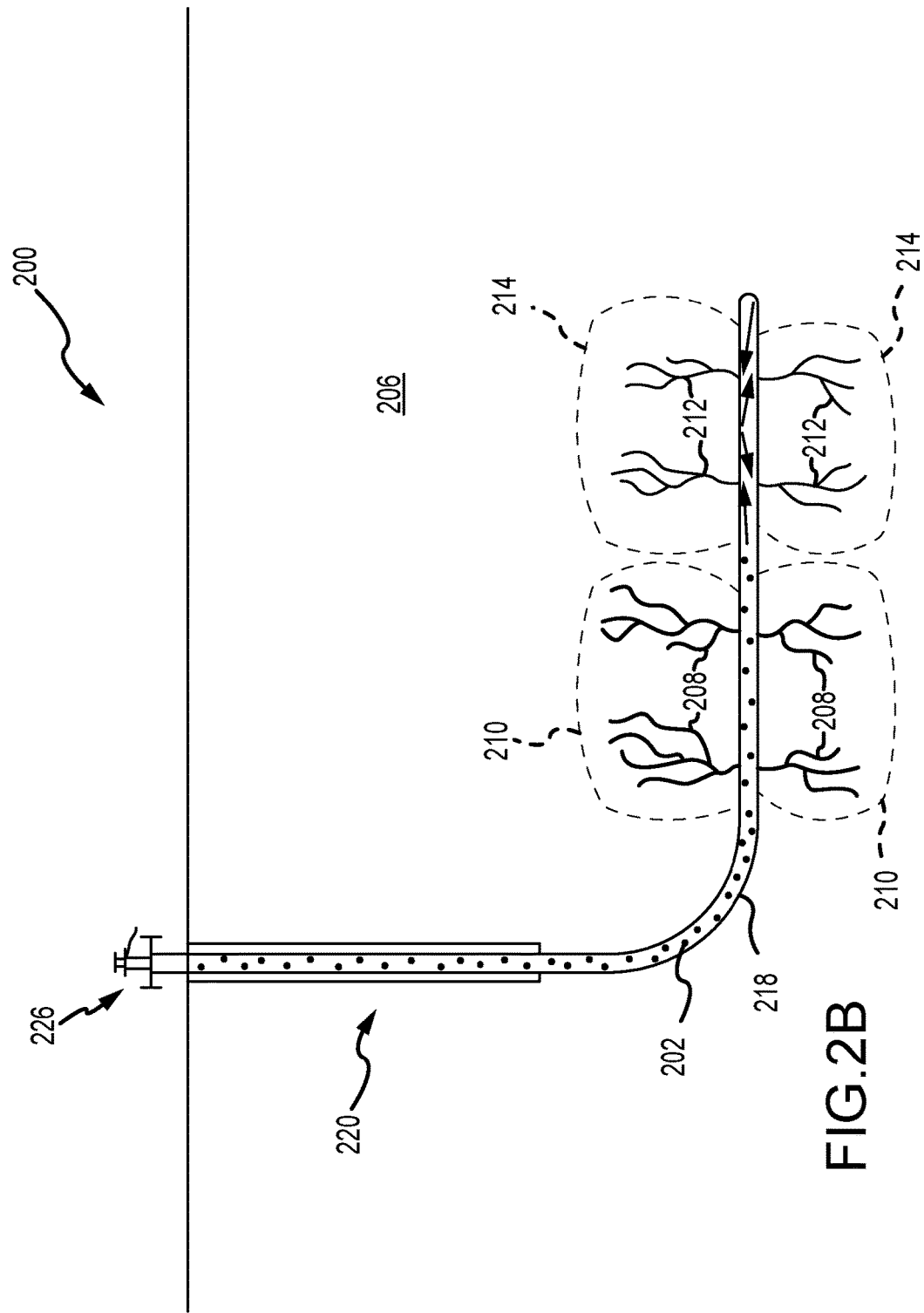
Figure 3:
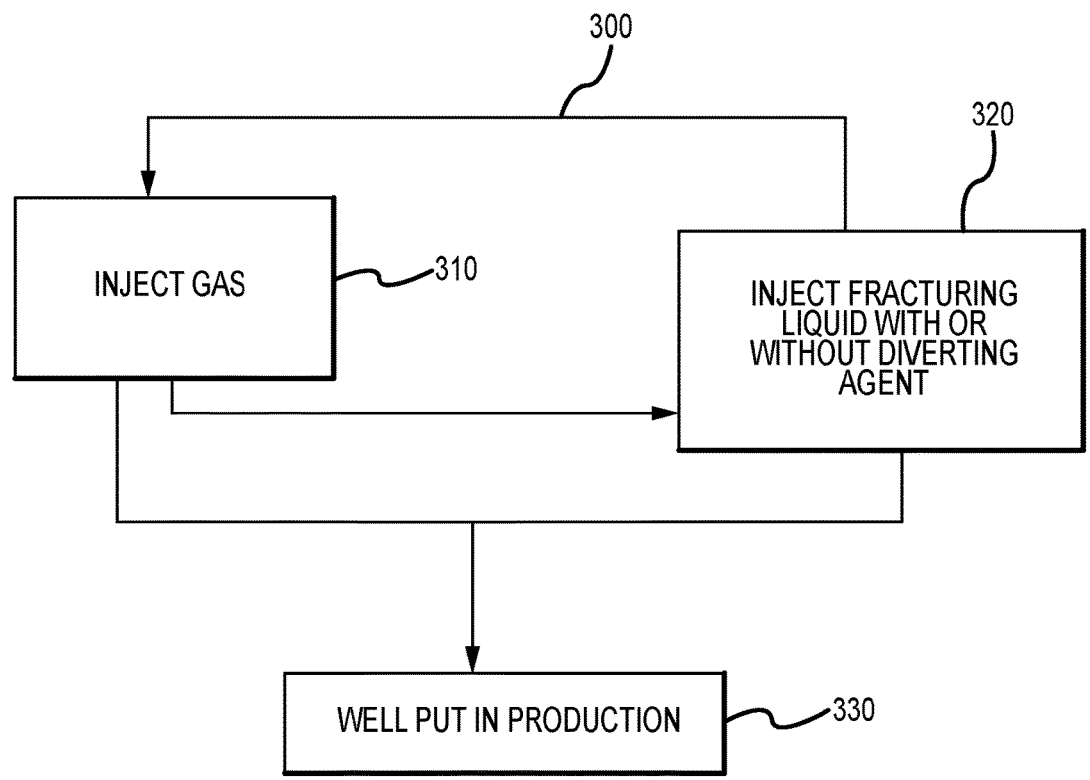
FIG. 3 depicts a process according to some embodiments of the present disclosure.

FIGS. 2A and 2B depict a side view of a well configuration 200 in accordance some embodiments of the present disclosure treated according to process 300 depicted in FIG. 3. In step 310, a gas (in any of the forms as described herein) 216 is introduced and/or injected into a well and reservoir 220 comprising subterranean formation 206. The subterranean formation 206 may include any type of rock and/or mineral or combination and/or mixture of any known rocks and minerals. The subterranean formation 206 can comprise one or more of sedimentary rocks, igneous rocks, and metamorphic rocks. Non-limiting examples of sedimentary rocks can include sandstone, limestone, and shale. Igneous rocks can include without limitation granite and andesite. Metamorphic rocks can include without limitation gneiss, slate, marble, schist, and quartzite. In some embodiments, the subterranean formation 206 can comprise a shale formation, a clay formation, a sandstone formation, a limestone formation, a carbonate formation, a granite formation, a marble formation, a coal bed, or a combination thereof.

The gas 216 is introduced and/or injected into the subterranean formation 206 at sufficient pressure to pressurize first portion fractures and pore volumes 208. In accordance with some embodiments the gas 216 can also infiltrate second portion fractures and pore volumes 212. Generally, the first portion fractures and pore volumes 208 are contained in first stress zone 210 and the second portion fractures and pore volumes 212 are contained in second stress zone. The first stress zone 210 is typically of lower stress than the second stress zone 214. Stated another way, the second stress zone 214 is usually of higher stress than the first stress zone 210.

The injection pressure of the gas 216 depends on the fracture gradient of the low stress zone 210. As will be appreciated, the fracture gradient is the pressure required to induce a fracture in the rock, such as the subterranean formation 206, at a given depth, as such the fracture gradient units are typically expressed in psi/ft or kPa/m. The fracture gradient can be a function of many factors including but not limited to overburden stress, Poisson's ratio of the formation (rock), pore pressure gradient, formation (rock) matrix stress coefficient, and matrix stress. There are many techniques for determining the fracture gradient of a subterranean formation 206, such as the pseudo-overburden stress method, effective stress method, leak-off tests, Hubbert & Willis technique, Matthews & Kelly technique, and Ben Eaton technique. Typically, the gas 216 is injected into the wellbore 218 at a pressure that is less than the fracture gradient (s) of the first 210 and/or second 214 stress zones (and/or other subsurface formations along the wellbore 218) to inhibit (further) fracturing of one or more of these zones. In accordance with some embodiments, the injection pressure of the gas 216 is generally maintained below the fracture gradient the subterranean formation 206. More generally, the injection pressure of the gas 216 is maintained below the fraction gradient of one or more the first 210 and second 214 stress zones. Even more generally the injection pressure of the gas 216 is maintained below the fracture gradient of subterranean formation 206 including the first 210 and second 214 stress zones during substantially the entire duration of injecting the gas 216. Typically, the injection pressure of the gas 216 is maintained below the fracture gradient of subterranean formation 206 including the first 210 and second 214 stress zones during substantially at least about 50% of the entire duration of injecting the gas 216. More typically, at least about 75%, even more typically at least about 90%, and yet even more typically at least about 95% of the entire duration of the injecting the gas 216.

In some embodiments of step 310, the injecting of gas 216 is continued until a desired pressure is reached within the well and/or reservoir 220. Typically, the injecting of the gas 216 is continued to a pressure of no more than the fracture gradient. More typically, the gas 216 is continued to a pressure of one of no more than about 99% of the fracture gradient, even more typically to a pressure of no more than about 98% of the fracture gradient, yet even more typically to a pressure of no more than about 97% of the fracture gradient, still yet even more typically to a pressure of no more than about 96% of the fracture gradient, still yet even more typically to a pressure of no more than about 95% of the fracture gradient, still yet even more typically to a pressure of no more than about 90% of the fracture gradient, still yet even more typically to a pressure of no more than about 85% of the fracture gradient, still yet even more typically to a pressure of no more than about 80% of the fracture gradient, still yet even more typically to a pressure of no more than about 75% of the fracture gradient, still yet even more typically to a pressure of no more than about 70% of the fracture gradient, still yet even more typically to a pressure of no more than about 65% of the fracture gradient, still yet even more typically to a pressure of no more than about 60% of the fracture gradient, still yet even more typically to a pressure of no more than about 55% of the fracture gradient, still yet even more typically to a pressure of no more than about 50% of the fracture gradient, still yet even more typically to a pressure of no more than about 45% of the fracture gradient, still yet even more typically to a pressure of no more than about 40% of the fracture gradient, still yet even more typically to a pressure of no more than about 35% of the fracture gradient, still yet even more typically to a pressure of no more than about 30% of the fracture gradient, still yet even more typically to a pressure of no more than about 25% of the fracture gradient, still yet even more typically to a pressure of no more than about 20% of the fracture gradient, still yet even more typically to a pressure of no more than about 15% of the fracture gradient, still yet even more typically to a pressure of no more than about 10% of the fracture gradient, still yet even more typically to a pressure of no more than about 9% of the fracture gradient, still yet even more typically to a pressure of no more than about 8% of the fracture gradient, still yet even more typically to a pressure of no more than about 7% of the fracture gradient, still yet even more typically to a pressure of no more than about 6% of the fracture gradient, still yet even more typically to a pressure of no more than about 5% of the fracture gradient, still yet even more typically to a pressure of no more than about 4% of the fracture gradient, still yet even more typically to a pressure of no more than about 3% of the fracture gradient, still yet even more typically to a pressure of no more than about 2% of the fracture gradient, or yet still even more typically to a pressure of no more than about 1% of the fracture gradient.

Factors that can affect the volume of gas 216 to be introduced in the wellbore 218 include the size (that is volume) of the subterranean formation 206 in fluid communication with wellbore 218, the size (volume) of the depleted regions of the subterranean formation 206, the size (volume) the pore volumes and fractures, leak off rate of the gas 216, and the reservoir pressure of the subterranean formation 206 prior to the injection of gas 216.

For instance, in some embodiments, the volume of the gas 216 injected into the subterranean formation 206 can range from about 1,000 standard cubic feet (scf) to about 100,000,000 scf. In some embodiments, the volume of gas 216 injected into the subterranean formation 206 can be greater than about 1×109 scf. Typically, the volume of gas injected into the subterranean formation 206 is typically at least about 50,000 scf, more typically at least about 100,000 scf, even more typically at least about 150,000 scf, yet even more typically at least about 200,000 scf, still yet even more typically at least about 250,000 scf, still yet even more typically at least about 300,000 scf, still yet even more typically at least about 350,000 scf, still yet even more typically at least about 400,000 scf, still yet even more typically at least about 450,000 scf, still yet even more typically at least about 550,000 scf, still yet even more typically at least about 600,000 scf, still yet even more typically at least about 650,000 scf, still yet even more typically at least about 700,000 scf, still yet even more typically at least about 750,000 scf, still yet even more typically at least about 800,000 scf, still yet even more typically at least about 850,000 scf, still yet even more typically at least about 900,000 scf, still yet even more typically at least about 950,000 scf, still yet even more typically at least about 1,000,000 scf, still yet even more typically at least about 2,000,000 scf, still yet even more typically at least about 3,000,000 scf, still yet even more typically at least about 4,000,000 scf, still yet even more typically at least about 5,000,000 scf, still yet even more typically at least about 6,000,000 scf, still yet even more typically at least about 7,000,000 scf, still yet even more typically at least about 8,000,000 scf, still yet even more typically at least about 9,000,000 scf, and yet still yet even more typically at least about 10,000,000 scf. Commonly, the volume of gas 216 is no more than about 200,000,000 scf, more commonly no more than about 300,000,000 scf, even more commonly no more than about 400,000,000 scf, yet even more commonly no more than about 500,000,000 scf, and still yet it is within the scope of some embodiments of this invention to inject up to about 1,000,000,000 scf.

Stated another way, the volume of gas 216 injected into the subterranean formation 206 can be expressed in terms of standard cubic feet of gas (scf) per net linear feet of the wellbore 218 in contact with and in fluid communication with the subterranean formation 206 ($lf_{CA}$). Typically, the volume of gas 216 injected into the subterranean formation 206 is at least about 500 scf/$lf_{CA}$, more typically at least about 525 scf/$lf_{CA}$, even more typically at least about 550 scf/$lf_{CA}$, yet even more typically at least about 575 scf/$lf_{CA}$, still yet even more typically at least about 600 scf/$lf_{CA}$, still yet even more typically at least about 625 scf/$lf_{CA}$, still yet even more typically at least about 650 scf/$lf_{CA}$, still yet even more typically at least about 675 scf/$lf_{CA}$, still yet even more typically at least about 700 scf/$lf_{CA}$, still yet even more typically at least about 725 scf/$lf_{CA}$, and yet still even more typically at least about 750 scf/$lf_{CA}$. Commonly, in some embodiments, the volume of gas 216 injected into the subterranean formation 206 is no more than about 5,000 scf/$lf_{CA}$, even more commonly no more than about 4,750 scf/$lf_{CA}$, yet even more commonly no more than about 4,500 scf/$lf_{CA}$, still yet even more commonly no more than about 4,250 scf/$lf_{CA}$, still yet even more commonly no more than about 4,000 scf/$lf_{CA}$, still yet even more commonly no more than about 3,750 scf/$lf_{CA}$, still yet even more commonly no more than about 3,500 scf/$lf_{CA}$, still yet even more commonly no more than about 3,250 scf/$lf_{CA}$, still yet even more commonly no more than about 3,000 scf/$lf_{CA}$, still yet even more commonly no more than about 2,900 scf/$lf_{CA}$, still yet even more commonly no more than about 2,800 scf/$lf_{CA}$, still yet even more commonly no more than about 2,700 scf/$lf_{CA}$, still yet even more commonly no more than about 2,600 scf/$lf_{CA}$, and yet still even more commonly no more than about 2,500 scf/$lf_{CA}$.

In accordance with some embodiments, the gas 216 can be injected at a rate of about 30 to about 500,000 scf/min. Generally, the gas 216 can be injected at a rate of about 10,000 to about 20,000 scf/min. Typically, the injection rate of the gas 216 is about 30 scf/min or more, more typically about 50 scf/min or more, even more typically about 100 scf/min or more, yet even more typically about 200 scf/min or more, still yet even more typically about 300 scf/min or more, still yet even more typically about 400 scf/min or greater, still yet even more typically about 500 scf/min or more, still yet even more typically about 600 scf/min or more, still yet even more typically about 700 scf/min or more, still yet even more typically about 800 scf/min or more, still yet even more typically about 900 scf/min or more, and yet still even more typically about 1,000 scf/min or more. Commonly, the gas 216 can be injected at a rate of no more than about 500,000 scf/min, more commonly at rate of no more than about 450,000 scf/min, even more commonly at rate of no more than about 400,000 scf/min, yet even more commonly at rate of no more than about 350,000 scf/min, still yet even more commonly at rate of no more than about 300,000 scf/min, still yet even more commonly at rate of no more than about 250,000 scf/min, still yet even more commonly at rate of no more than about 200,000 scf/min, still yet even more commonly at rate of no more than about 150,000 scf/min, and yet still even more commonly at rate of no more than about 100,000 scf/min.

The gas 216 can include any number of gasses. For example, the gas 216 can comprise nitrogen, hydrogen, methane, ethane, propane, butane, carbon dioxide, any inert gas, or any combination thereof. The gas 216 can be injected into the well and reservoir 220 in a number of ways. In some embodiments, the gas 216 can be delivered to wellhead 226 by one or more of a storage truck, a pipeline, a storage tank, a gas producing well, or other suitable gas supply sources. It can be appreciated that the one or more of the storage truck, pipeline, storage tank, gas producing well, or other suitable gas supply source are interconnect to and in fluid communication with the wellhead 226 and the wellbore 218. Moreover, it can be further appreciated that the wellbore 218 is in fluid communication with subterranean formation 206.

The gas 216 can be a gas in the gas phase, a gas in the liquid phase, or a combination thereof. In some embodiments, the gas 216 can be in the gas phase. In such embodiments, the gas 216 can be pumped directly into the wellbore 218 from wellhead 226. In some embodiments, the gas 216 can be in the liquid phase when introduced at the wellhead 226. In such embodiments, the liquid phase gas 216 can be directly injected into the wellbore 218 or it can be heated one or more during or after being injected into the wellbore 218. It can be appreciated that the liquid phase gas 216 is generally sufficiently heated during or after being injected into the wellbore 218 that it is substantially in gas phase when it infiltrates the pore volumes and/or fractures of subterranean formation 206. In some embodiments, when the gas 216 is in a liquid phase when introduced to the well and reservoir 220, the gas 216 can be allowed to remain in the well and reservoir 220 for a sufficient amount of time such that the reservoir temperature causes the liquid phase gas 216 to undergo a phase change from a liquid phase to a gas phase before and/or substantially simultaneously with infiltration of the fractures and pore volumes of the subterranean formation 206. For example, the well and reservoir 220 can have a reservoir temperature from about 120 degrees Fahrenheit to about 600 degrees Fahrenheit, or even greater than about 600 degrees Fahrenheit. A gas 216 in a liquid phase can have a temperature less than the reservoir temperature. Generally, a gas 216 in the liquid phase can have a temperature from about −69 degrees Fahrenheit to about 80 degrees Fahrenheit. It can be appreciated that the higher reservoir temperature of the well and reservoir 220 can provide sufficient heat to the liquid phase gas 216 to induce a phase transition from the liquid phase to the gas phase.

Typically, the gas 216 can infiltrate the subterranean formation 206 from about 1 to about 7,000 feet from one or more of the wellbore 218 or perforation tunnel. More typically, the gas 216 can infiltrate the subterranean formation 206 from about 10 to about 5,000 feet from one or more of the wellbore 218 or perforation tunnel. More typically, the gas 216 can infiltrate the subterranean formation 206 from about 100 to about 3,000 feet from one or more of the wellbore 218 or perforation tunnel. Commonly, the gas 216 can infiltrate the subterranean formation 206 no more than about 7,000 feet, more commonly no more than about 5,000 feet, or even more commonly no more than about 3,000 feet from one or more of the wellbore 218 or perforation tunnel. Usually, the gas 216 can infiltrate the subterranean formation 206 more than about 1 foot, more usually more than about 10 feet, or even more usually more than about 100 feet from one or more of the wellbore 218 or perforation tunnel.

The gas 216 is generally introduced into the well and/or reservoir 220 through wellhead 226. In some embodiments of step 200, the flow of the gas 216 can be one or more of monitored and controlled by a control system. The control system can include one or more of (a) pressure sensor(s), gauge(s) and switch(es) arrangement any manner or combination thereof.

Typically, the injecting of the gas 216 can be in a substantially uninterrupted continuous flow until the desired volume of the gas 216 has been injected. In some embodiments, the injecting the gas 216 can intermittently, where the flow of the gas 216 can be started and stopped in succession any number of times until the desired volume of gas 216 has been injected.

The gas 216 can be maintained in the well and/or reservoir 220 for a dwell period of time. The dwell period of time can comprise little, if any, time. However, in some embodiments, a dwell period of time exists between the halting and the starting of the injection of gas 216. In some embodiments, the dwell period of time can be long (such as hours or days) or short (such as minutes or hours). While not wanting to be limited by example, the gas 216 can be injected in the liquid phase where a dwell period of time can be needed for the liquid phase to undergo a phase transition to the gas phase. In some embodiments, the dwell period of time can be as short as about 5 minutes or as long as about 24 hours. In some embodiments, the dwell time can be less than one hour. In some embodiments, the dwell time can be less than thirty minutes. In other embodiments, the dwell time can be no more than twenty four hours. In other embodiments, the dwell time can be more than twenty four hours.

As can be appreciated in some embodiments, the gas 216 can be in the form of a foam. The foam can be injected into the well and reservoir 220. Foam quality is conventionally defined as the volume percent gas within the foam at a specified pressure and temperature. The volume % value generally refers to the volume % of gas in the foam. The balance of the volume % of the foam is usually liquid. Typically, the quality of the foam injected into the well and reservoir 220 is about 30 volume/0 or more. More typically, the quality of foam is about 40 volume % or more, even more typically 50 volume % or more, yet even more typically about 60 volume/0 or more, still yet even more typically about 70 volume % or more, still yet even more typically about 80 volume % or more, or yet still even more typically about 90 volume % or more. That is, in some embodiments, the quality of the foam can be greater than about 30 volume % gas in the foam with the balance being liquid. That is, in some embodiments, the quality of the foam can be greater than about 40 volume % gas in the foam with the balance being liquid. That is, in some embodiments, the quality of the foam can be greater than about 50 volume % gas with the balance being liquid. That is, in some embodiments, the quality of the foam can be greater than about 60 volume % gas in the foam with the balance being liquid. That is, in some embodiments, the quality of the foam can be greater than about 70 volume % gas in the foam with the balance being liquid. That is, in some embodiments, the quality of the foam can be greater than about 80 volume % gas in the foam with the balance being liquid. That is, in some embodiments, the quality of the foam can be greater than about 80 volume % gas in the foam with the balance being liquid. That is, in some embodiments, the quality of the foam can be greater than about 90 volume % gas in the foam with the balance being liquid. In accordance with some aspects of the present disclosure, the gas can be in the form of a foam. In accordance with some embodiments of the present disclosure the foam can contain more gas by volume than liquid by volume. It can be appreciated that in some embodiments the foam can contain less gas by volume than liquid by volume. Typically, the foam can have no more than about 50 volume % liquid, no more than about 45 volume % liquid, no more than about 40 volume % liquid, no more than about 35 volume % liquid, no more than about 30 volume % liquid, no more than about 25 volume % liquid, no more than about 20 volume % liquid, no more than about 15 volume % liquid, no more than about 10 volume % liquid, no more than about 5 volume % liquid, no more than about 2 volume % liquid, no more than 1 volume % liquid, or no more than about 0.1 volume %) liquid. In accordance with some embodiments, the foam can have at least about 1 volume % liquid, at least about 5 volume % liquid, more typically at least about 10 volume % liquid, or at least about 15 volume % liquid. The percent by volume of the liquid and/or gas is typically measured at the wellhead 226 prior to the injection of the foam into the wellbore 218. Moreover, it can be appreciated that volume % of liquid in foam can vary according to temperature and pressure. Hence, the volume % of liquid in the foam generally correspond without limitation to those measured at the temperature and pressure of the foam immediately prior to the injection of the foam at the wellhead 226.

The gas 216 may or may not be substantially free of particulates. The particles can comprise, a solid, semi-solid, a liquid diverting agent, or any combination thereof. Typically, the gas (as measured at the surface) has no more than about 5 volume % particulates, more typically no more than about 2.5 volume % particulates, more typically no more than about 1 volume % particulates, more typically no more than about 0.75 volume % particulates, more typically no more than about 0.5 volume %) particulates, more typically no more than about 0.25 volume % particulates, and even more typically no more than about 0.1 volume % particulates. Although particulates are beneficial in some applications, particulate diverting agents, in particular, can cause production problems downhole. They can one or more of restrain, impair, and damage porosity and permeability. It can be appreciated that the one or more of restrained, impaired, and damaged porosity and permeability can impede hydrocarbon flow from the fractures and exposed surfaces in the wellbore 218 contacted by any other diverting agent(s). The gas 216 is generally substantially free of particles.

It can be further appreciated that the gas 216 can be substantially compressible. Typically, the gas 216 is compressed within the wellbore 218 and the reservoir. It can be further appreciated that a fracturing liquid 202, which is injected in step 320 following the injection of the gas 216 in step 310. It can be appreciated that the fracturing liquid 202 is generally substantially incompressible. Compared with the fracturing liquid 202, the gas 216 more easily fills the fractures and/or pore volumes of the subterranean formation 206. Ability of the gas 216 to more easily fill the fractures and/or pore volumes of subterranean formation 206 than the fracturing liquid 202 can be due one or more of the following: (a) the higher surface tension of the fracturing liquid 202, compared to the gas 216; (b) the lower density of the gas 216 compared to the fracturing liquid 202; (c) the inability of the fracturing liquid 202 to wet the subterranean formation 206; and (d) the ability of the gas 216 to diffuse into the subterranean formation 206 compared to the impermeability of fracturing liquid 202 to subterranean formation 206. While not wishing to be bound by any theory, it is believed that the gas 216 (in any of the forms as described herein) will fill or occupy fractures in the formations along the wellbore 218 (e.g., the first portion fractures and pore volumes 208 which is often already fractured and/or has a low pore pressure) and, when contacted with the fracturing liquid 202, will compress until a fracture gradient is reached, thereby causing fracture initiation and propagation in a previously unstimulated zone.

Typically, the one or more of fractures and pore volumes 208 are in first stress zone 210 of subterranean formation 206. The injected gas can infiltrate and pressurize the subterranean formation 206 and the reservoir holding the hydrocarbons. The gas can travel through a network of the first portion fractures and pore volumes 208. The first portion fractures and pore volumes 208 can be man-made, naturally occurring or a combination of naturally occurring and man-made. That is, the first portion fractures and/or pore volumes 208 can be preexisting within the natural formation and/or regions of hydrocarbon depletion. Upon infiltration, the gas 216 will occupy the first portion fractures and pore volumes 208 in the subterranean formation 206. This gas infiltration into the first portion fractures and pore volumes 208 can create a sufficient pressure in the first stress zone 210 and the first fractures and pore volumes 208 to allow a fracturing liquid 202 to fracture previously unstimulated zones. These previously unstimulated zones fractured by the fracturing liquid 202 can be portions of the subterranean formation 206 that are a significant distance from wellbore 218 (i.e., far-field) compared any previous stimulated areas. Moreover, these previously unstimulated areas fractured by the fracturing liquid 202 can be portions of the subterranean formation 206 previously having little, if any, of one or both hydrocarbon permeability and production prior to being fractured by the fracturing liquid 202. While not wanting to be limited by theory, it is believed that the infiltration of the gas 216 into the first portion fractures and pore volumes 208 can create a barrier for the fracturing liquid 202 that is subsequently delivered into the wellbore 218 and diverted to the second stress zone 214. The gas 216 in the stimulation network can build a sufficient pressure in the network allowing subsequently delivered fracturing liquid 202 to be diverted into previously untreated areas of the subterranean formation 206. In some instances, this method will allow for the diversion of the fracturing liquid 202 to a portion of the subterranean formation 206 that is a significant distance from the wellbore 218 (i.e. far-field). While not wanting to be limited by theory, it is believed that the fractures generated in the previously unstimulated zones can be in some embodiments the second portion fractures and pore volumes 212. It is also believed that that the fractures generated in the previously unstimulated zones can be in some embodiments new fractures and pore volumes in the first stress zone 210 that are not part of the first portion fractures and pore volumes 208. Moreover, it is believed that in some embodiments the fractures generated in the previously unstimulated zones can be a combination of the second portion fractures and pore volumes 212 and the new fractures and pore volumes in the first stress zone 210 that are not part of the first portion fractures and pore volumes 208.

The fracturing liquid 202 can be without limitation one or more of slick-water, a gel, and a fracturing foam. Commonly, the slick water comprises a low viscosity water-based fluid. More commonly, the slick water comprises a low viscosity water-based fluid with a proppant. The gel can comprise one or more of a borate, hydroxypropyl guar (HPG), carboxymethyl hydroxypropyl guar (CMHPG), and carboxymethyl cellulose (CMC). The fracturing foam can comprise one or more of nitrogen and water with gel, carbon dioxide, propane, and combinations thereof. In some embodiments, the fracturing liquid 202 or an amount of water used in the fracturing liquid 202 can be supplied by storage tanks, naturally formed features (e.g., spring), a pipeline, etc.

The fracturing liquid 202 can be continuously injected or it can be intermittently injected into the wellbore 218 and reservoir. In the case of intermittent injection, the injecting of the fracturing liquid 202 can be halted for a period of time before continuing with injecting process. The period of time between injections can be a period of minutes, hours, or days. For example, the period of time between injections can be at least about 1 minute, at least about 5 minutes, at least about 10 minutes, at least about 20 minutes, at least about 30 minutes, at least about 45 minutes, at least about 1 hour, at least about 2 hours, or at least about 3 hours, among other time periods.

The initial gas 216 injection typically goes into the low stressed pore areas and increases the stress of the pore areas. It is believed that the leak-off rate of the injected fracturing liquid 202 into the pores is slowed by the gas 216. Fractures are generally larger than pores. With respect to fractures, the fracturing liquid 202 is not believed to force the gas 216 out of the fractures in the low stress zones due to the effects of frictional resistance to multi-phase flow (including both liquid and gas). When the injection pressure is more than the frictional resistance, the fracturing liquid 202 is believed to displace the gas 216 from the fractures. However, as the fracture decreases in size (e.g., width and/or height) it is believed that the resistance to flow will increase above the injection pressure, thereby preventing the fracturing liquid 202 from displacing the gas 216 from the fracture. When the fracture gradient is reached, fracture initiation and propagation commence, such as in the high stress zones. The gas 216 is thus believed to block the fracturing liquid 202 from propagating the fracture in the low stress zone. When injections of gas 216 and fracturing liquid 202 are alternated, it is believed that the gas 216 will enter the subterranean formation 206 having the next lowest fracture gradient.

It is further believed that the gas 216 (in any of the forms as described herein) can fill and/or occupy the fractures and pore volumes in the subterranean formation 206 along the wellbore 218. Typically, the gas 216 can fill and/or occupy the fractures and pore volumes in one or more of the first 210 and second 214 stress zones. Moreover, when the gas 216 in the one or more of the first 210 and second 214 stress zones is contacted with the pressurized fracturing liquid 202, the gas 216 can be compressed. That is, the gas 216 can be pressurized within the one or more of the first 210 and second 214 stress zones. While not wanting to be limited by theory, it is believed that the gas 216 compressed in the one or more of the first stress zones 210 and second stress zones 214 can be pressurized until the fracture gradient of one or both of first 210 and second 214 stress zones is reached, thereby causing one or more fractures to initiate and propagation within the one or both of the first 210 and second 214 stress zones. It is further believed that at least some, if not most, of the one or more fractures initiated and propagated by the compressed gas can be in previously unstimulated zones. Moreover, it is further believed that at least some, if not most, of the one or more fractures initiated and propagated by the compressed gas can occur in portions of the first 210 and/or second 214 stress zones previously unstimulated by a pressured fracturing fluid. In other words, the gas 216 can fill, occupy and pressurize the portions off the first 210 and/or second 214 stress zones that the previous pressurized fracturing fluid could not and thereby fracture the previously unstimulated portions of the first 210 and/or second 214 stress zones.

It can be further appreciated that the fracturing liquid 202 can or cannot include a diverting agent. The diverting agent can be a chemical, a mechanical device, or a biological material. For example, the diverting agent can be a particulate material. The diverting agent can be any diverting agent commonly used in diverting systems and any of the others not commonly used. The particulate materials can be blended with the fracturing liquid 202 to form the diverting composition and then injected into the wellbore 218. Examples of diverting agents that can be mixed with the fracturing liquid 202 include, but are not limited to, sand, ceramic proppant, resin coated proppant (ceramic, sand or other), salts, water soluble balls of polyesters/polylactide copolymer compounded with plasticizers, degradable fibers, starches (e.g., corn starch), gels, guar, ceramic beads, bauxite, glass microspheres, synthetic organic beads, sintered materials and combinations thereof, polymer materials, fluoro-polymer particulates (such as, but not limited to TEFLON™ fluoro-polymer particulates), nut shell pieces, seed shell pieces, cured resinous particulates comprising nut shell pieces, cured resinous particulates including seed shell pieces, fruit pit pieces, cured resinous particulates including fruit pit pieces, wood, composite particulates and any combinations thereof. The diverting agent can be degradable and can include but not be limited to degradable polymers, dehydrated compounds, and mixtures thereof. Examples of degradable polymers that can be used as a diverting agent can include, but not be limited to homopolymers, and random, block, graft, and star- or hyper-branched polymers. Examples of suitable polymers include polysaccharides such as dextran or cellulose, chitin, chitosan, proteins, aliphatic polyesters, poly(lactide), poly(glycolide), poly(ε-caprolactone), poly(hydroxybutyrate), poly(anhydrides), aliphatic polycarbonates, poly(ortho esters), poly(amino acids), poly(ethylene oxide), and polyphosphazenes. Polyanhydrides are another type of suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride). These and other diverting agents can be used in the embodiments described herein.

In some embodiments, the fracturing liquid 202 can contain a diverting agent. In such instances, those of skill in the art generally refer to such a composition (that is, a composition containing fracturing liquid and a diverting agent), a diverting composition. It can be appreciated that step 320 can include injecting the fracturing liquid 202 with or without a diverting agent mixed with the fracturing liquid 202 into the wellbore 218 such that the fracturing liquid 202, with or without the diverting agent, pressurizes the subterranean formation 206 and initiates and propagates one or more fractures in previously unstimulated zones of the subterranean formation 206. Without injecting the gas 216 into the wellbore 218, the fracturing liquid 202, with or with the diverting agent, would not be diverted to the previously unstimulated zones and would otherwise infiltrate the previously stimulated fractures. In other words, sufficiently pressurizing the previously stimulated fractures can cause the subsequently injected fracturing liquid 202, with or without diverting agent, to bypass the pressurized, gas-filled previously stimulated fractures and infiltrate the previously unstimulated zones of the subterranean formation 206. It can be appreciated that the infiltration of the previously unstimulated zones by the fracturing liquid 202 can fracture at least some of the previously unstimulated zones of the subterranean formation 206.

It can be further appreciated that injecting the fracturing liquid 202 with or without a diverting agent mixed with the fracturing liquid 202 into the wellbore 218 such that the fracturing liquid 202, with or without the diverting agent, pressurizes the first portion of the subterranean formation 206 and initiates and propagates one or more fractures in the second portion of the subterranean formation 206. In other words, without the injection of the gas 216 into the wellbore 218, the fracturing liquid 202, with or with the diverting agent, would not be diverted to the second portion of the subterranean formation 206 and would otherwise infiltrate the first portion of the subterranean formation 206. Moreover, sufficiently pressurizing the first portion of the subterranean can cause the subsequently injected fracturing liquid 202, with or without diverting agent, to bypass the pressurized, gas-filled first portion of the subterranean formation 206 and infiltrate the second portion of the subterranean formation 206. It can be appreciated that the infiltration of the second portion of the subterranean formation 206 by the fracturing liquid 202 can fracture at least some of the second portion of the subterranean formation 206.

Generally, it is believed that injecting the fracturing liquid 202 with or without a diverting agent mixed with the fracturing liquid 202 into the wellbore 218 such that the fracturing liquid 202, with or without the diverting agent, pressurizes the first stress zone 210 of the subterranean formation 206 and initiates and propagates one or more fractures in the second stress zone 214 of the subterranean formation 206. More generally, the first stress zone 210 has a lower stress than the second stress zone 214. Even more generally, the first stress zone 210 contains previously stimulated, first portion fractures and pores volumes 208. In other words, without the injection of the gas 216 into the wellbore 218, the fracturing liquid 202, with or with the diverting agent, would not be diverted to the second stress zone 214 of the subterranean formation 206 and would otherwise infiltrate the first portion fractures and pore volumes 208. Moreover, sufficiently pressurizing the first portion fractures and pore volumes 208 can cause the subsequently injected fracturing liquid 202, with or without diverting agent, to bypass the pressurized, gas-filled first portion of the fractures and pore volumes 208 and infiltrate the second stress zone of the subterranean formation 206. It can be appreciated that the infiltration of the second stress zone of the subterranean formation 206 by the fracturing liquid 202 can fracture at least some of the second stress zone of the subterranean formation 206.

Moreover, in accordance with some embodiments, it believed that the gas 216 can infiltrate and pressurize the fractures and/or pore volumes in one or both of the first and second portions of the subterranean formation 206 prior to the introduction of the fracturing liquid 202 to one or both of the first and second portions of the subterranean formation 206. Furthermore, it is believed that the gas 216 can infiltrate and pressure fractures and/or pore volumes that the fracturing liquid 202 is substantially unable to infiltrate and pressurize. More specifically, it is believed that the gas 216 can infiltrate and pressure fractures and/or pore volumes that the fracturing liquid 202 is substantially unable to infiltrate and pressurize under the pressure that the fracturing liquid 202 is introduced into the subterranean formation 206. In other words, the gas 216 within the fractures and/or pore volumes of subterranean formation 206 is further pressurized by the fracturing liquid 202. This further pressurization of the gas 216 within the fractures and/or pore volumes one or both of: (a) forms barrier between fracturing liquid 202 and the gas filled fractures and pore volumes and (b) achieves a sufficient pressure within the gas filled fractures and pore volumes to fracture one or more of the gas filled fractures and/or pore volumes. It can be appreciated that the fractures that develop in the one or more of the gas filled fractures and/or pore volumes can be in one or more of the first 210 and second 214 stress zones are new fractures and were not previous manmade and/or naturally occurring fractures. Typically, the second stress zone 214 has a greater stress than the first stress zone 210. In some embodiments, the first stress zone 210 has a greater stress than the second stress zone 214.

In accordance with some embodiments, the injecting of the gas 216 is maintained for a period of time. It can be appreciated that period of injecting the gas 216 generally refers to the period starting with the injection of the gas 216 and ending with the starting of the injecting of the fracturing liquid 202. Typically, the period of injecting the gas 216 is about 0.1 hours or more. More typically, the period of injecting the gas is about 0.2 hours or more, even more typically about 0.3 hours or more, yet even more typically about 0.4 hours or more, still yet even more typically about 0.5 hours or more, still yet even more typically about 0.6 hours or more, still yet even more typically about 0.7 hours or more, still yet even more typically about 0.8 hours or more, still yet even more typically about 0.9 hours or more, still yet even more typically about 1.0 hour or more, still yet even more typically about 1.5 hours or more, and yet still even more typically at least about 2.0 hours or more. In accordance with some embodiments, the period of injecting the gas 216 can commonly be no more than about 30 days, even more commonly no more than about 25 days, even more commonly no more than about 20 days, yet even more commonly no more than about 19 days, still yet even more commonly no more than about 18 days, still yet even more commonly no more than about 17 days, still yet even more commonly no more than about 16 days, still yet even more commonly no more than about 15 days, still yet even more commonly no more than about 14 days, still yet even more commonly no more than about 13 days, still yet even more commonly no more than about 12 days, still yet even more commonly no more than about 11 days, and yet sill even more commonly no more than about 10 days.

In some embodiments, the gas 216 can be injected into the wellbore 218 over an extended period of time. For example, the gas 216 can be injected over a period of time that can be minutes, hours, days, or months, depending on a number of factors. In some embodiments, the gas 216 can be injected over a period of time of more than about 2 hrs. In other embodiments, the gas 216 can be injected over a period of time of more than a day. For example, in some embodiments, the gas 216 can be injected into the wellbore 218 from a neighboring natural gas well. The pressure at wellbore 218 can be checked during and/or any time period after the injection of the gas 216 to determine if the pressure is sufficient for the introduction of the fracturing liquid 202. If the pressure is not sufficient, additional gas 216 needs to be injected into the wellbore 218 directly or through the neighboring natural gas well. It can be appreciated that it is possible for weeks to go by with intermittent addition of gas 216 into the wellbore 218 before a sufficient pressure is reached to begin introduction of the fracturing liquid 202.

Furthermore, it is believed that sufficiently pressurizing the first 210 and second 214 portions of the subterranean formation 206 with the gas 216 prior to the injecting of the fracturing liquid 202, with or without the diverting agent, causes the injected fracturing liquid 202 to one or more of permeate, fill, occupy, and pressurize one or more of the fractures and pore volumes of previously unstimulated and/or under stimulated zones. In particular, sufficiently pressurizing the first 210 and second 214 portions of the subterranean formation 206 with gas 216 prior to the injecting and the fracturing liquid 202, with or without a diverting agent, causes the injected fracturing liquid 202 to one or more of permeate, fill, occupy, and pressurize one or more of the fractures and pore volumes of previously unstimulated and/or under stimulated zones of one or more of the first 210 and second 214 portions of the subterranean formation 206.

In some embodiments, step 320 can include introducing the fracturing liquid 202, with or without a diverting agent, into the wellbore 218 and reservoir 220 after step 310 to pressurize the subterranean formation 206. The pressurization of the subterranean formation 206 by the fracturing liquid 202 is sufficient to fracture a portion of the subterranean formation 206. It can be appreciated the introduction of the fracturing liquid 202 into the subterranean formation 206 can pressurize one or more of the first and second portions of the subterranean formation 206. It can be further appreciated that introduction of the fracturing liquid 202 into the subterranean formation can pressurize one or both of the first stress zone 210 and the second stress zone 214. Generally, the second stress zone 214 has a higher stress than the first stress zone 210. Typically, one of first 210 and second 214 stress is pressurized more than the other. In some embodiments, the first stress zone 210 is pressurized more than the second stress zone 214. In some embodiments, the second stress zone 214 is pressurized more than the first stress zone 210. Typically, the fracturing liquid 202 pressurizes the second stress zone 214 more than the first stress zones 210, thereby fracturing the second stress zone 214 to a greater extent than the first stress zone 210. While not wanting to be limited by theory, it is believed that one or both of the gas 216 and diverting agent (when the fracturing liquid 202 contains a diverting agent) substantially impedes and/or diverts pressurization of the first stress zone 210 by the fracturing liquid 202 to substantially fracture first stress zones 210. However, the fracturing liquid 202 can typically sufficiently pressurize the second stress zone 214 to substantially fracture the second stress zone 214. Moreover, the second fractures and pore volumes 212 are usually formed in the second stress zone 214 by the pressurized fracturing liquid 202.

The fracturing liquid 202 can be injected into the well and/or reservoir 220. Step 320 can include injecting the fracturing liquid 202 into the well and/or reservoir 220 through wellhead 226. In some embodiments, step 320 can include the sub-steps of starting and halting of the injecting of the fracturing liquid 202 into the well and/or reservoir 220. Step 320 can also include the sub-step of providing the fracturing liquid 202. Typically, the fracturing liquid 202 can be provided by one or more of a storage truck, a storage tank or other supply source. In some embodiments, step 320 can include injecting the fracturing liquid 202 at an injection rate. Commonly, the injection rate of the fracturing liquid 202 can be from about 2 barrels/minute (bbl/min.) (about 84 gallons/min.) to about 200 bbl/min. (about 8,400 gallons/min). More commonly, the injection rate of the fracturing liquid 202 can be more than about 200 bbl/min (more than about 8,400 gallons/min).

It can be appreciated that in some embodiments, a first portion of the fracturing liquid 202 can contain a diverting agent and a second portion of the fracturing liquid 202 can be substantially devoid of any diverting agent. While not wanting to be limited by example, a first portion of the fracturing liquid 202 containing a diverting agent can be injected into the wellbore and reservoir 220 before a second portion of the fracturing liquid 202 substantially devoid of any diverting agent. It can be appreciated that the introduction of the first portion of the fracturing liquid 202 containing a diverting agent into the subterranean formation 206 can occupy one or more of the first and second portions of the subterranean formation 206. While not wanting to be limited by theory, it is believed that the first portion of the fracturing liquid 202 fracturing liquid containing the diverting agent occupies the first portion of the subterranean formation 206. It is further believed that the first portion of the fracturing liquid 202 containing the diverting agent occupying the fractures and pore volumes of the first portion of the subterranean formation 206 substantially impedes and/or diverts the second portion of the fracturing liquid 202 devoid of a diverting agent from first portion of subterranean formation 206 to the second portion of subterranean formation 206. Hence, it is believed that the second portion of the fracturing liquid 202 devoid of the diverting agent can therefore pressurize the second portion of subterranean formation 206 to a sufficient pressure to fracture some of the second portion of the subterranean formation 206. It can be further appreciated that in some embodiments the introduction of the first portion of the fracturing liquid 202 containing a diverting agent into the subterranean formation 206 can occupy one or more of the first stress zone 210 and second stress zone 214. While not wanting to be limited by theory, it is believed that the first portion of the fracturing liquid 202 fracturing liquid containing the diverting agent occupies the first stress zone 210. It is further believed that the first portion of the fracturing liquid 202 containing the diverting agent occupying the fractures and pore volumes of the first stress zone 210 substantially impedes and/or diverts the second portion of the fracturing liquid 202 devoid of a diverting agent from the first stress zone 210 to the second stress zone 214. Hence, it is believed that the second portion of the fracturing liquid 202 devoid of the diverting agent can therefore pressurize the second stress zone 214 to a sufficient pressure to fracture some of the second stress zone 214.

In some embodiments, the diverting agent can one or more of block and pressurize the first portion of subterranean formation 206 such that the fracturing liquid 202 can bypass the gas-filled and/or diverting agent filled first portion of the subterranean formation 206. Thus, the fracturing liquid 202 can infiltrate and fracture the second portion of the subterranean formation 206. Consequently, when the diverting agent is combined with the fracturing liquid 202, two different diverting techniques (e.g., gas and the diverting agent) are utilized to divert the fracturing liquid 202 to the second portion of the subterranean formation 206 and fracture the second portion of the subterranean formation 206. It can be appreciated that in some embodiments the first portion of the subterranean formation 206 can comprise a first stress zone 210. Furthermore, the second portion of the subterranean formation 206 can comprise a second stress zone 214. Generally, the first stress zone 210 has a lower stress than the second stress zone 214. Moreover, the first stress zone 210 contains first fractures and a pore volumes 208. Furthermore, the fractures formed in the second stress zone 214 can comprise the fractures and pore volumes 212.

In accordance with some embodiments, the gas 216 can infiltrate the subterranean formation 206 beyond the wellbore 218 to a distance that is substantially far-field from the wellbore 218. More specifically, the gas 216 can infiltrate the fractures and/or pore volumes of the subterranean formation 206 beyond the wellbore 218 to a distance that is substantial or far-field from the wellbore 218. Furthermore, the gas 216 can infiltrate the subterranean formation 206 outside of a perforation tunnel, or outside of a formation face in open hole. Typically, the gas 216 can infiltrate the fractures and/or pore volumes extending throughout the reservoir 220, including far-field areas along less than half of the entire length of the wellbore 218. More typically, the gas 216 can infiltrate the fractures and/or pore volumes extending throughout the reservoir 220, including far-field areas along more than half of the entire length of the wellbore 218. Even more typically, the gas 216 can infiltrate the fractures and/or pore volumes extending throughout the reservoir 220, including far-field areas along the entire length of the wellbore 218. This is at least one advantage of infiltrating the gas 216 with the subterranean formation 206 compared to typical chemical and particulate diverter systems.

It accordance with some embodiments, steps 310 and 320 can repeated any number of times. Moreover, in some embodiments, one or more of the sub-steps of step 320 can be repeated in any order and any number of times within step 320. While not wanting to be limited by example, steps 310 and 320 can be repeated one of 2, 3, 4, 5, 6, 7, 8, 9, 10, 11, or 12 times. Moreover, steps 310 and 320 can be repeated sequentially one after the other in any order. In accordance with some embodiments, when step 310 is repeated the gas 216 can be: in some, or all, of steps 310 in the gaseous phase; in some, or all, of steps 310 in the liquid phase; in some, or all, of steps 310 in the form of foam; or a combination or mixture thereof. In some embodiments, step 310 is conducted sequentially any number of times before step 320. While not wanting to be limited by example, step 310 can be conducted one of 1, 2, 3, 4, 5, 6, 7, 8, 9 10, 11, or 12 times before conducting step 320. In some embodiments, step 320 is conducted sequentially any number of time after step 310. While not wanting to be limited by example, step 320 can be conducted one of 1, 2, 3, 4, 5, 6, 7, 8, 9, 10, 11, or 12 times after conducting step 310. It can be appreciated that step 320 can include the recitation of any of the sub-steps of 320. Any of the sub-steps of 320 can be repeated one of 1, 2, 3, 4, 5, 6, 7, 8, 9, 10, 11, or 12 times when conducting an iteration of step 320.

In some embodiments, steps 310 and 320 can be conducted concurrently and/or at about the same time. Step 320 may be conducted with a diverting agent, without a diverting agent, or with combination of fracturing liquids with and without diverting agents. In some embodiments, steps 310 and 320 are conducted simultaneously without any previous injection of gas 216 into the well 220.

In accordance with some embodiments, one of step 320 with a composition containing a diverting agent or step 310 is conducted prior to injecting a fracturing liquid devoid of a diverting agent. It can be appreciated that any one of the steps 320 with a composition containing a diverting agent and 310 can be repeated any number of times before the injecting of the fracturing liquid devoid of any diverting agent.

In accordance with some embodiments, one of step 320 with a composition containing a diverting agent or step 310 follows the injecting a fracturing liquid devoid of a diverting agent. It can be appreciated that any one of the steps 320 with a composition containing a diverting agent and 310 can be repeated any number of times following the injecting of the fracturing liquid devoid of any diverting agent.

While not wanting to be limited by example, the methods disclosed herein can include: a first diverting composition is injected; a second diverting composition is injected; and the fracturing liquid is injected. Another example order of injections into the well and reservoir can be as follows: a first diverting composition is injected; the fracturing liquid is injected; a second diverting composition is injected. In each of these examples, the first and second diverting compositions can be the gas or foam 216 or the diverting composition including a diverting agent mixed with the fracturing liquid 202. Consequently, and more specifically, the examples above can be as follows: a gas or foam is injected; a diverting composition including the diverting agent mixed with a fracturing liquid is injected; the fracturing liquid is injected. The second example may, more specifically, be as follows: a gas or foam is injected; the fracturing liquid is injected; a diverting composition including the diverting agent mixed with a fracturing liquid is injected. These are merely examples and other sequences are possible and contemplated herein.

The entire cycle of steps 310 and 320 repeated if the well and/or reservoir 220 require additional treatment, for example, to divert the flow of fracturing liquid 202 from one of the first and second portions of the subterranean formation 206 to the other of the first and second portions of the subterranean formation 206. Moreover, the flow of fracturing liquid 202 from one of the first and second portions of the subterranean formation 206 to the other of the first and second portions of the subterranean formation 206 for additional fracturing of the one of the first and second portions of the subterranean formation 206 that were formed from the previous operations to fracturing of previously unstimulated and/or under stimulated zones of the other of the first and second portions of subterranean formation 206.

Typically, the entire cycle of steps 310 and 320 repeated if the well and/or reservoir 220 require additional treatment, for example, to divert the flow of fracturing liquid 202 from the first portion of the subterranean formation 206 to the second portion of the subterranean formation 206 for fracturing. Furthermore, the flow of fracturing liquid 202 from the first portion of the subterranean formation 206 to the second portion of the subterranean formation 206 for additional fracturing of the first portion of the subterranean formation 206 that were formed from the previous operations to fracturing of previously unstimulated and/or under stimulated zones of the second portion of subterranean formation 206.

More typically, the entire cycle of steps 310 and 320 repeated if the well and/or reservoir 220 require additional treatment, for example, to divert the flow of fracturing liquid 202 from the first stress zone 210 of the subterranean formation 206 to the second stress zone 214 of the subterranean formation 206 for fracturing. Furthermore, the flow of fracturing liquid 202 from the first stress zone 210 of the subterranean formation 206 to the second stress zone 214 of the subterranean formation 206 for additional fracturing of the first stress zone 210 of the subterranean formation 206 that were formed from the previous operations to fracturing of previously unstimulated and/or under stimulated zones of the second stress zone 214 of subterranean formation 206.

Typically, the criteria indicating the need for cycling of steps 310 and 320 can be if the fracturing liquid 202 experiences a high pressure, which may indicate the presence of a zone that can potentially fracture. On the other hand, lower pressure in the well and/or reservoir 220 can indicate the fracturing liquid 202 is infiltrating previously fractured and/or hydrocarbon depleted zones.

In step 330, the well is put in production. Step 330 can include the sub-step of back-flushing the fracturing liquid 202 and gas 216. It can be appreciated that the fracturing liquid 202 and the gas can be back-flushed from the well and/or reservoir 220.

In accordance with some embodiments of this disclosure, the methods and/or processes can energize the reservoir allowing more effective flowback. Moreover, the methods and/or process can allow for higher fluid recovery. Furthermore, the methods and/or process can produce less clay swelling with the subterranean formation.

In accordance with some embodiments of this disclosure, the methods and/or processes can allow for fracturing and/or re-fracturing along the entire of the wellbore. Furthermore, the methods and/or processes can allow for fracturing and/or re-fracturing of the toe region of the wellbore. Moreover, the methods as described herein can be used to stimulate or treat vertical, deviated, or horizontal wells. Furthermore, the methods and/or process of this disclosure can be applied to wells completed with older techniques. In accordance with some embodiments, the methods and/or processes can create a more complex fracture network than methods and/or process of the prior art. In some embodiments of this disclosure, the methods and/or process can have the gas injected in the wellbore does not leave behind any residue within the wellbore and/or subterranean formation.

Aspects of the presently disclosed technology involve a diversion technique for use in vertical, deviated, or horizontal wells undergoing a stimulation process (e.g., initial stimulation or re-stimulation) to divert a carrier liquid from treating previously stimulated areas (i.e., lower stress zones of the formation) and to force the carrier liquid to treat previously unstimulated areas (i.e., higher stress zones of the formation). The methods disclosed provide cost-effective means for improving the well production. After a wellbore is drilled and completed, stimulation operations are usually performed to enhance hydrocarbon (e.g. gas, oil, etc.) production into the wellbore and to enhance extraction of the hydrocarbons from the subterranean formation.

Current diversion techniques use liquid or solid forms, such as chemical solutions (e.g., a borate solution) or, particulates (e.g., polymers spheres). The methods of the present disclosure are cost effective, operationally feasible based on current equipment available to the industry, and can enhance the rate of extraction of the hydrocarbons. In particular, the use of a gas (or foam) as the diversion medium allows for greater filling of the reservoir in lower stress zones such that a carrier liquid can be more efficiently diverted to the higher stress zones of the reservoir. The use of a gas (or foam) as the diversion medium also has advantages in that the gas (or gas component of the foam) can be recovered during flowback. In certain instances, the gas (or gas component of the foam) may be recovered during flowback can be reused, recycled, or marketed.

The gas can be in the form of a foam. While the foam can have more liquid (e.g., water) than gas by volume, the foam typically can have no more than about 50 vol. % liquid, no more than about 45 vol. % liquid, no more than about 40 vol. % liquid, no more than about 35 vol. % liquid, no more than about 30 vol. % liquid, no more than about 25 vol. % liquid, no more than about 20 vol. % liquid, no more than about 15 vol. % liquid, no more than about 10 vol. % liquid, or no more than about 5 vol. % liquid. The foam can have at least about 1 vol. %, liquid, at least about 5 vol. % liquid, more typically at least about 10 vol. % liquid, or at least about 15 vol. % liquid. The percent by volume is typically measured at the well head and prior to injection of the foam into the well bore.

Additional methods described herein include stimulating a well and reservoir by alternating or simultaneously introducing a gas diverter and a conventional diverter or isolation device (e.g., chemical, biological, or mechanical diverter systems known and unknown (including but not limited to Sergifrac™ and packers). In certain instances, using a conventional diverter along with the gas diverter, described herein, could produce better economic results than either one could produce on their own.

Figure 4:
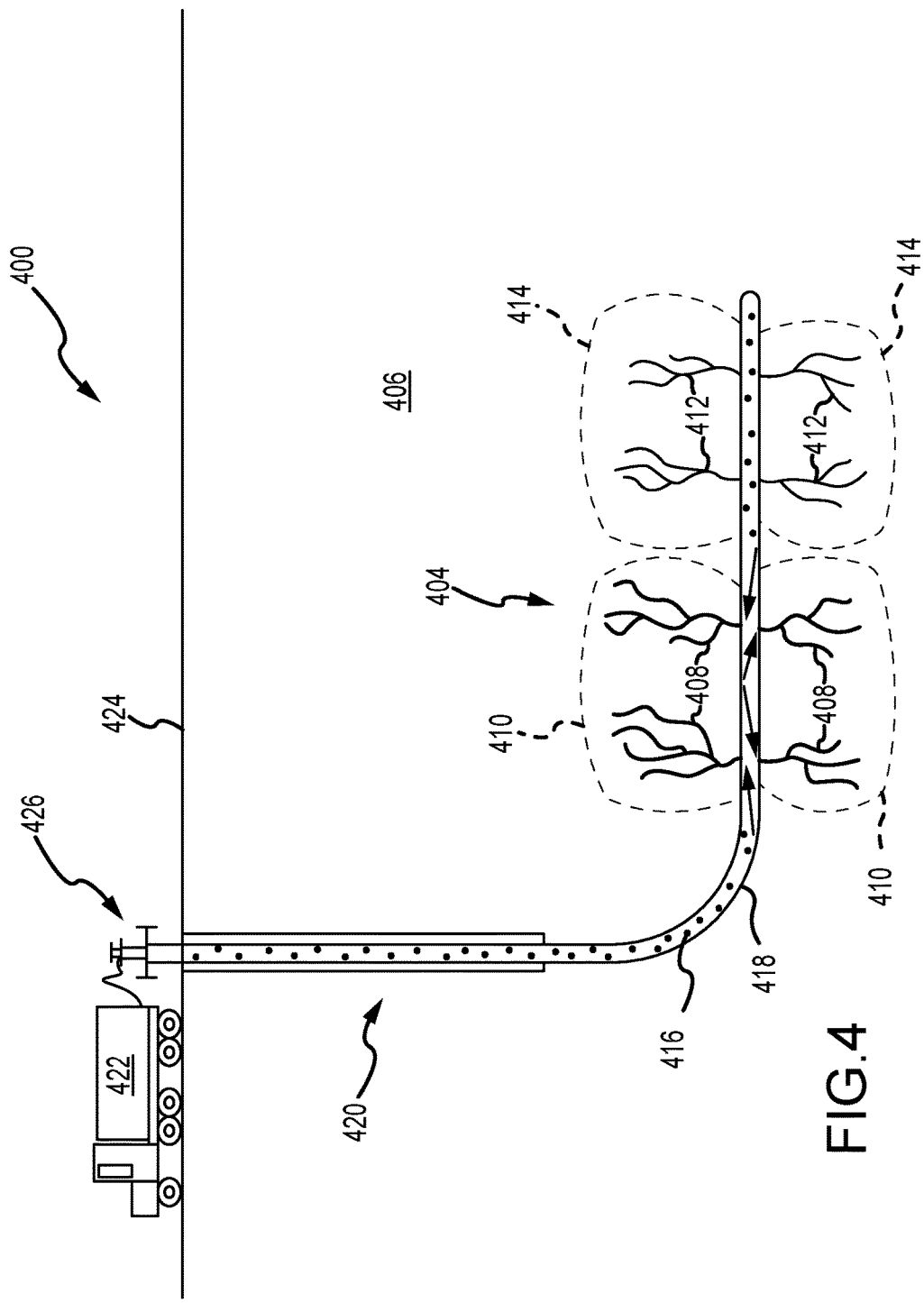
FIG. 4 is a side view of a horizontal drilling operation utilizing the diversion technique described herein where a gas (or foam) is introduced into the well.

More particularly, and as seen in FIG. 4, which is a side view of a horizontal drilling operation 400 utilizing the diversion technique described herein, a first step in the diversion technique includes injecting a gas (or foam) 416 into a wellbore 418 of a well 420 to pressurize the fractures 408 in the lower stress zones 410 of the subterranean formation 406 and the reservoir. In certain implementations, the gas 416 may be in a liquid, phase, a gas phase, or a foam mixture of gas and a liquid. The gas (or foam) is introduced to infiltrate the formation 406 and the reservoir holding the hydrocarbons. The gas (or gas component of the foam) can travel through a stimulation network of fractures and/or pore volumes (i.e., man-made or naturally occurring). Upon infiltration, the gas (or gas component of the foam) will occupy pore volumes and existing fractures in the formation 406. In some instances, the pore volume can be preexisting from the natural formation or areas/regions of hydrocarbon depletion. This gas infiltration creates a barrier for a carrier liquid 102 that is subsequently delivered into the wellbore and diverted to the higher stress zones 414. The gas in the stimulation network can build a sufficient pressure in the network allowing subsequently delivered carrier fluid or liquid to be diverted into previously untreated areas of the formation. In some instances, this method will allow for the diversion of a fluid or liquid to a portion of the formation that is a significant distance from the wellbore (i.e. far-field).

The subterranean formation may include one or more of any type of rocks, such as sedimentary rocks like sandstone, limestone, and shale; igneous rocks like granite and andesite; or metamorphic rocks like gneiss, slate, marble, schist, and quartzite. In certain implementations, the subterranean formation may be a shale formation, a clay formation, a sandstone formation, a limestone formation, a carbonate formation, a granite formation, a marble formation, a coal bed, or combinations thereof.

While not wishing to be bound by any theory, it is believed that the gas 416 (or gas component of the foam) will fill or occupy fractures in the formations along the well bore (e.g., the low stress area which is often already fractured and/or has a lower pore pressure) and, when contacted with the carrier fluid, will compress until a fracture gradient of one or more formations is reached, thereby causing fracture initiation and propagation in the high stress area. The carrier fluid is not believed to force the gas (or gas component of the foam) out of the fractures in the low stress area due to the effects of frictional resistance to liquid flow. It is believed that the exposed formation surfaces will frictionally resist the flow of the carrier fluid. When the injection pressure is more than the frictional resistance, the carrier fluid is believed to displace the gas from the fractures. However, as the fracture decreases in size (e.g., width and/or height) it is believed that the resistance to flow will increase above the injection pressure, thereby preventing the carrier fluid from displacing the gas (or gas component of the foam) from the fracture. When the fracture gradient is reached, fracture initiation and propagation commence, such as in the high stress area. The gas is thus believed to block the carrier fluid from propagating the fracture in the low stress area. When injections of gas (or foam) and carrier fluid are alternated, it is believed that the gas (or gas component of the foam) will enter the formation having the next lowest fracture gradient.

Figure 5:
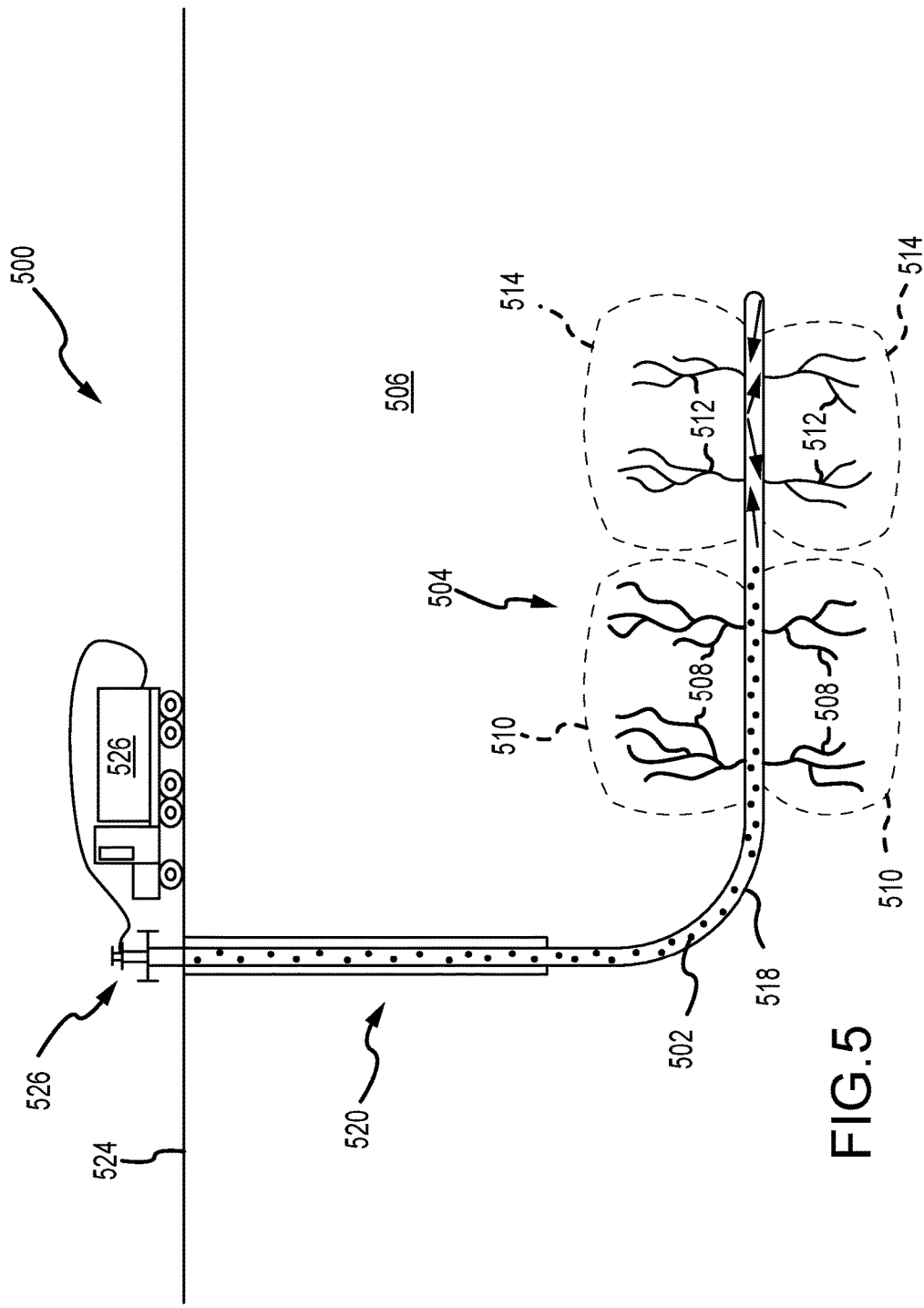
FIG. 5 is a side view of the horizontal drilling operation utilizing the diversion technique described herein where a carrier liquid is introduced into the well.

As seen in FIG. 5, which is a side view of the horizontal drilling operation 500 utilizing the diversion techniques described herein, a second step in the diversion technique includes injecting the carrier liquid 102, or a diverting composition of a diverting agent mixed with the carrier liquid 102, into the wellbore 518 such that the carrier liquid 102 or diverting composition pressurizes and fractures additional fractures 512 of the formation 506 that were previously not stimulated. Without injecting the gas (or foam) 416 into the wellbore, the carrier liquid 102 or diverting composition would not be diverted to untreated areas and would otherwise infiltrate the fractures 508 of the lower stress zone 510. Sufficiently pressurizing the fractures 508 in the lower stress zone 510 causes the subsequently injected carrier liquid 102 or diverting composition to bypass the gas-filled, pressurized fractures 508 in the lower stress zones 510 and can be directed to infiltrating the fractures 512 of the high stress zone 514 or create new fractures.

The gas (or foam) can be substantially free of particulates or other solid, semi-solid, or liquid diverting agents. Typically, the gas (or foam) (as measured at the surface) has no more than about 5 vol. % particulates (or other diverting agents), more typically no more than about 2.5 vol. % particulates (or other diverting agents), more typically no more than about 1 vol. % particulates (or other diverting agents), more typically no more than about 0.75 vol. % particulates (or other diverting agents), more typically no more than about 0.5 vol. % particulates (or other diverting agents), more typically no more than about 0.25 vol. % particulates (or other diverting agents), and even more typically no more than about 0.1 vol. % particulates (or other diverting agents). Although particulate or other diverting agents are beneficial in some applications, particulate (or solid) diverting agents, in particular, can cause production problems down hole. They can restrain porosity and permeability and therefore hydrocarbon flow from the fractures and exposed surfaces in the well bore contacted by the diverting agent(s).

As mentioned above and in certain instances, a diverting agent may be mixed with the carrier liquid 102 to form a diverting composition. That is, the diverting composition of a diverting agent and a carrier liquid 102 may be used to further stimulate the well and reservoir because the diverting agent may block or pressurize fractures 508 in the lower stress zone 510 such that the carrier liquid 102 bypasses the gas-filled and/or diverter agent filled fractures 508 and, thus, infiltrates the fractures 512 of the high stress zone 514. Consequently, when a diverting composition of a diverting agent is combined with the carrier liquid or fluid 102, two different diverting techniques (e.g., gas and the diverting composition) are utilized to more effectively divert the carrier liquid 102 to the fractures 512 in the high stress zone 514.

The diverting agent of the diverting composition may be chemical, mechanical, or biological in nature. For example, the diverting agent may include particulate materials that are commonly used in diverting systems and others not commonly used. The particulate materials may be blended with the carrier liquid 102 to form the diverting composition and then injected into the well. Examples of diverting agents that may be mixed with the carrier liquid 102 include, but are not limited to, sand, ceramic proppant, resin coated proppant (ceramic, sand or other), salts, water soluble balls of polyesters/polylactide copolymer compounded with plasticizers, degradable fibers, starches (e.g., corn starch), gels, guar, ceramic beads, bauxite, glass microspheres, synthetic organic beads, sintered materials and combinations thereof, polymer materials, TEFLON™ particulates, nut shell pieces, seed shell pieces, cured resinous particulates comprising nut shell pieces, cured resinous particulates including seed shell pieces, fruit pit pieces, cured resinous particulates including fruit pit pieces, wood, composite particulates and any combinations thereof.

The diverting agents may be degradable and may include but are not limited to degradable polymers, dehydrated compounds, and mixtures thereof. Examples of degradable polymers that may be used include, but are not limited to, homopolymers, and random, block, graft, and star- or hyper-branched polymers. Examples of suitable polymers include polysaccharides such as dextran or cellulose, chitin, chitosan, proteins, aliphatic polyesters, poly(lactide), poly(glycolide), poly(ε-caprolactone), poly(hydroxybutyrate), poly (anhydrides), aliphatic polycarbonates, poly(ortho esters), poly(amino acids), poly(ethylene oxide), and polyphosphazenes. Polyanhydrides are another type of suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly (maleic anhydride) and poly(benzoic anhydride). These and other diverters may be used in the methods described herein.

Still referring to FIG. 5, both the diverting composition including a diverting agent mixed with the carrier fluid 102 and the carrier fluid 102 by itself may be injected into the well and reservoir. In certain embodiments, the diverting composition including the diverting agent mixed with the carrier fluid 102 may be initially introduced into the well and reservoir, followed by the introduction of the carrier fluid 102, by itself, into the well and reservoir to pressurize the fractures and pores. In certain embodiments, the carrier fluid 102, by itself, may be initially introduced into the well and reservoir, followed by the introduction of the diverting composition including a diverting agent mixed with the carrier fluid 102.

When the carrier fluid 102, by itself, is injected into the well and reservoir, the fluid may be continuously injected, or the fluid may be intermittently injected in a hesitation-type manner. In the case of intermittent injection of the carrier fluid 102, the injection of the fluid may be halted for a period of time and then re-injected. The period of time may be a period of minutes, hours, or days. For example, the period of time may be at least about 1 minute, at least about 5 minutes, at least about 10 minutes, at least about 20 minutes, at least about 30 minutes, 45 minutes, 1 hour, 2 hours, or three hours, among other time periods.

Turning back to FIG. 4, the gas 416 (or foam) may be delivered through a wellhead 426 of the well 420. In some embodiments, the gas 416 (or foam) may be delivered via a storage truck 422 positioned on the ground 424 near the wellhead 426. In other embodiments, the gas 416 (or foam) may be delivered via pipeline, a storage tank, other gas producing wells, or other suitable supply sources.

The injection pressure of the gas 416 (or foam) depends on the fracture gradient of the low stress area. As will be appreciated, the fracture gradient is the hydrostatic value, typically expressed in psi/ft, that is required to initiate a fracture in a subsurface formation (geologic strata). It can be a function of many factors including overburden stress, Poisson's ratio of the formation (rock), pore pressure gradient, formation (rock) matrix stress coefficient, and matrix stress. There are many techniques for determining fracture gradient of a formation, such as the pseudo-overburden stress method, effective stress method, leak-off tests, Hubbert & Willis technique, Matthews & Kelly technique, and Ben Eaton technique. Typically, the gas 416 (or foam) is injected into the well bore at a pressure that is less than the fracture gradient(s) of the low and/or high stress areas (and/or other subsurface formations along the well bore) to inhibit (further) fracturing of one or more of these areas. The injection pressure of the gas 416 (or foam) is generally maintained below the fracture gradient of one or more (or all) of these areas during substantially (e.g., typically at least about 50%, more typically at least about 75%, more typically at least about 90%, and more typically at least about 95% of) the entire duration of gas 416 (or foam) injection.

Factors effecting the volume of gas 416 (or foam) to be introduced in the well 420 include the size of the depleted regions of the reservoir (including pore volume and fractures), leak off rate of the gas 416, and the extent of existing fracture and reservoir conditions (e.g. reservoir pressure—if the pressure is high it will compress the gas or foam requiring more volume to occupy the fractures/pore volumes).

For instance, in some embodiments, the volume of the gas (or foam) can range from about 1000 standard cubic feet (scf) to about 100,000,000 scf or greater. In various embodiments, the gas (or foam) can be injected at rates within a range of about 30 scf/min to about 500,000 scf/min. In some embodiments, the gas (or foam) can be injected at a rate of about 10,000 to about 20,000 scf/min.

In some embodiments, the volume of gas (or foam) (as measured at the surface) is typically at least about 50,000 scf, more typically at least about 100,000 scf, more typically at least about 150,000 scf, more typically at least about 200,000 scf, more typically at least about 250,000 scf, more typically at least about 300,000 scf, more typically at least about 350,000 scf, more typically at least about 400,000 scf, more typically at least about 450,000 scf, more typically at least about 550,000 scf, more typically at least about 600,000 scf, more typically at least about 650,000 scf, more typically at least about 700,000 scf, more typically at least about 750,000 scf, more typically at least about 800,000 scf, more typically at least about 850,000 scf, more typically at least about 900,000 scf, more typically at least about 950,000 scf, more typically at least about 1,000,000 scf, more typically at least about 2,000,000 scf, more typically at least about 3,000,000 scf, more typically at least about 4,000,000 scf, more typically at least about 5,000,000 scf, more typically at least about 6,000,000 scf, more typically at least about 7,000,000 scf, more typically at least about 8,000,000 scf, more typically at least about 9,000,000 scf, and more typically at least about 10,000,000 scf. The volume of gas (or foam) is typically no more than about 500,000,000 scf, more typically no more than about 400,000,000 scf, more typically no more than about 300,000,000 scf, more typically no more than about 200,000,000 scf, more typically no more than about 100,000,000 scf, and more typically no more than about 90,000,000 scf.

Stated another way, the volume of gas (or foam) (as measured at the surface) per linear foot of net reservoir contact area (by the well bore) ("lfCA") is typically at least about 500 scf/lfCA, more typically at least about 525 scf/lfCA, more typically at least about 550 scf/lfCA, more typically at least about 575 scf/lfCA, more typically at least about 600 scf/lfCA, more typically at least about 625 scf/lfCA, more typically at least about 650 scf/lfCA, more typically at least about 675 scf/lfCA, more typically at least about 700 scf/lfCA, more typically at least about 725 scf/lfCA, and more typically at least about 750 scf/lfCA—The volume of gas (or foam) (as measured at the surface) per linear foot of net reservoir contact area (by the well bore) ("lfCA") is typically no more than about 5,000 scf/lfCA, more typically no more than about 4,750 scf/lfCA, more typically no more than about 4,500 scf/lfCA, more typically no more than about 4,250 scf/lfCA, more typically no more than about 4,000 scf/lfCA, more typically no more than about 3,750 scf/lfCA, more typically no more than about 3,500 scf/lfCA, more typically no more than about 3,250 scf/lfCA, more typically no more than about 3,000 scf/lfCA, more typically no more than about 2,900 scf/lfCA, more typically no more than about 2,800 scf/lfCA, more typically no more than about 2,700 scf/lfCA, more typically no more than about 2,600 scf/lfCA, and more typically no more than about 2,500 scf/lfCA.

The injection rate of the gas (or foam) (as measured at the surface) is typically at least about 30 scf/min, more typically at least about 50 scf/min, more typically at least about 100 scf/min, more typically at least about 200 scf/min, more typically at least about 300 scf/min, more typically at least about 400 scf/min, more typically at least about 500 scf/min, more typically at least about 600 scf/min, more typically at least about 700 scf/min, more typically at least about 800 scf/min, more typically at least about 900 scf/min, and more typically at least about 1,000 scf/min. The injection rate of the gas (or foam) (as measured at the surface) is typically no more than about 500,000 scf/min, more typically no more than about 450,000 scf/min, more typically no more than about 400,000 scf/min, more typically no more than about 350,000 scf/min, more typically no more than about 300,000 scf/min, more typically no more than about 250,000 scf/min, more typically no more than about 200,000 scf/min, more typically no more than about 150,000 scf/min, and more typically no more than about 100,000 scf/min.

The duration of injection of the gas (or foam) (as measured immediately before or at the start of injection of the carrier fluid) is typically at least about 0.1 hours, more typically at least about 0.2 hours, more typically at least about 0.3 hours, more typically at least about 0.4 hours, more typically at least about 0.5 hours, more typically at least about 0.6 hours, more typically at least about 0.7 hours, more typically at least about 0.8 hours, more typically at least about 0.9 hours, more typically at least about 1.0 hours, more typically at least about 1.5 hours, and even more typically at least about 2.0 hours. The duration of injection of the gas (or foam) (as measured immediately before or at the start of injection of the carrier fluid) is typically no more than about 30 days, more typically no more than about 25 days, more typically no more than about 20 days, more typically no more than about 19 days, more typically no more than about 18 days, more typically no more than about 17 days, more typically no more than about 16 days, more typically no more than about 15 days, more typically no more than about 14 days, more typically no more than about 13 days, more typically no more than about 12 days, more typically no more than about 11 days, and even more typically no more than about 10 days.

In certain instances, the gas 416 may be injected into the well over an extended period of time. For example, the gas 416 may be injected over a period of time that can be minutes, hours, days, or months, depending on a number of factors. In some embodiments, the gas 416 may be injected over a period of time of at least 2 hrs. In other embodiments, the gas 416 may be injected over a period of time of at least a day. For example, in certain instances, the gas 416 may be injected into the well from a neighboring natural gas well, for example. A worker may check the pressure at a subsequent time (e.g., days later) and determine that, in order to meet a desired pressure within the wellbore, additional gas 416 may need to be injected into the wellbore and continue the injection of the gas. A subsequent check of the pressure (e.g., days later), may indicate that the pressure is sufficient for the introduction of the carrier liquid 102. Thus, in this example, it is possible for weeks to go by with intermittent addition of gas 416 into the well before a sufficient pressure is reached to begin introduction of the carrier liquid 102.

The gas 416 may include any number of gasses and may include nitrogen, hydrogen, methane, ethane, propane, butane, carbon dioxide, any inert gas, or any combinations thereof. The gas 416 may be deployed into the well 420 in a number of ways and in various phases. In certain implementations, the gas 416 may be in a gas phase and pumped directly into the wellbore 418 from the wellhead 426. In other implementations, the gas 416 may be in a liquid phase above ground 424, and the gas 416 is heated sufficiently at the surface for the gas 416 to enter the gas phase as it is being introduced into the wellbore 418, thereby being in the gas phase when it infiltrates the pore volumes and/or fractures. Liquid carbon dioxide and nitrogen are examples of fluids in the liquid phase at the surface and gas phase down hole. In yet other implementations, the gas may be in a liquid phase when it is introduced to the wellbore. The gas in the liquid phase may be pumped into the well and allowed to remain in the well 420 for a sufficient amount of time such that the reservoir temperature causes the liquid phase gas 416 to change phases from a liquid to a gas and infiltrate the fractures and pore volumes 108. For example, the reservoir temperature may range from 120 degrees Fahrenheit (F) to greater than 600 degrees F. The gas 416 in a liquid phase may be pumped into the well at a lower temperature (e.g., −69° F. to 80° F.), and through heat exchange from the higher temperature of the well, can transition from the liquid phase to a gas phase.

In certain implementations, a foam mixture of liquid and gas may be pumped into the well 420, instead of gas 416. The foam may be delivered through a wellhead of the well. In some embodiments, the foam may be delivered via a storage truck 422 positioned on the ground 424 near the wellhead 426. In other embodiments, the gas 416 may be delivered via pipeline, a storage tank, or other suitable supply sources.

Foam quality is conventionally defined as the volume percent gas within foam at a specified pressure and temperature. In certain instances, the quality of the foam may be at least 30. That is, there is at least 30% gas in the foam and the balance is liquid. In certain instances, the quality of the foam may be at least 40. That is, there is at least 40% gas in the foam and the balance is liquid. In certain instances, the quality of the foam may be at least 50. That is, there is at least 50% gas in the foam and the balance is liquid. In certain instances, the quality of the foam may be at least 60. That is, there is at least 60% gas in the foam and the balance is liquid. In certain instances, the quality of the foam may be greater than 70. In certain instances, the quality of the foam may be greater than 80. In certain instances, the quality of the foam may be greater than 90.

A first step in the diversion technique includes injecting a gas 416 into a wellbore 418 of a well 420 to pressurize the fractures and/or pore volumes 108 in the lower stress zones 410 of the subterranean formation 406 and the reservoir. The gas 416 is introduced to infiltrate the formation 406 and the reservoir holding the hydrocarbons. The gas 416 can travel through a stimulation network of fractures and/or pore volume (manmade or naturally occurring) extending from the wellbore 418. Upon infiltration, the gas 416 will occupy pore volumes and existing fractures in the formation 406. In some instances, the pore volume and fractures 408 can be preexisting from the natural formation or areas/regions of hydrocarbon depletion. This gas 416 infiltration creates a barrier for a carrier liquid 102 that is subsequently delivered into the wellbore 418 and diverted to the higher stress zones 414. The gas 416 in the stimulation network will build a sufficient pressure, allowing subsequently delivered carrier fluid or liquid 102 to be diverted into previously untreated areas of the formation.

In all implementations, the gas 416 or foam may infiltrate the fractures and pore volumes of the formation beyond the wellbore of the well 420 to a distance that is substantial or far-field from the wellbore, outside of a perforation tunnel, or outside of a formation face in open hole. The gas or foam 416 can infiltrate the fractures and/or pore volumes extending through the length of the well and throughout the reservoir, including far-field areas. This is an advantage of the gas and foam 416 that typical chemical and particulate diverter systems do not have. As an example, in certain implementations, far-field areas of the formation may be about 10 feet to about 3000 feet from a wellbore or perforation tunnel. In other implementations, far-field areas of the formation may be about 100 feet to about 5,000 feet from a wellbore or perforation tunnel.

As illustrated in FIG. 5, the carrier liquid 102 may be delivered through the wellhead 526. In some embodiments, the carrier liquid 102 may be delivered to the well 520 via a storage truck 526 positioned on the ground 524 near the well head 526. In certain implementations, the carrier liquid 102 or an amount of water used in the carrier liquid 102 may be supplied by storage tanks, naturally formed features (e.g., spring), a pipeline, etc.

The carrier liquid 102 may be: slick-water, which is a water-based fluid and proppant combination of a low viscosity; a gel (e.g., borate, HPG, CMHPG, CMC); or a foam (e.g., nitrogen and water with gel, carbon dioxide, propane, and combinations thereof), among other carrier liquids. And, as discussed previously, the carrier liquid 102 may be combined with a diverting agent to form a diverting composition that may be injected into the well.

In the implementations described herein, the gas 416 may be substantially compressible within the wellbore and the reservoir, whereas the carrier liquid 102 may be substantially incompressible. The gas 416, as compared with the carrier liquid 102, tends to more easily fill the fractures and pore volumes because of its compressible nature, has a high relative permeability to the reservoir, and has a lower coefficient of friction, which allows it to fill the fractures and pore volumes that may not otherwise be penetrated by the carrier liquid 102. The carrier liquid 102, on the other hand, can more readily, as compared with the gas 416, fracture the formation of the reservoir, in part, because it is substantially incompressible.

Figure 6:
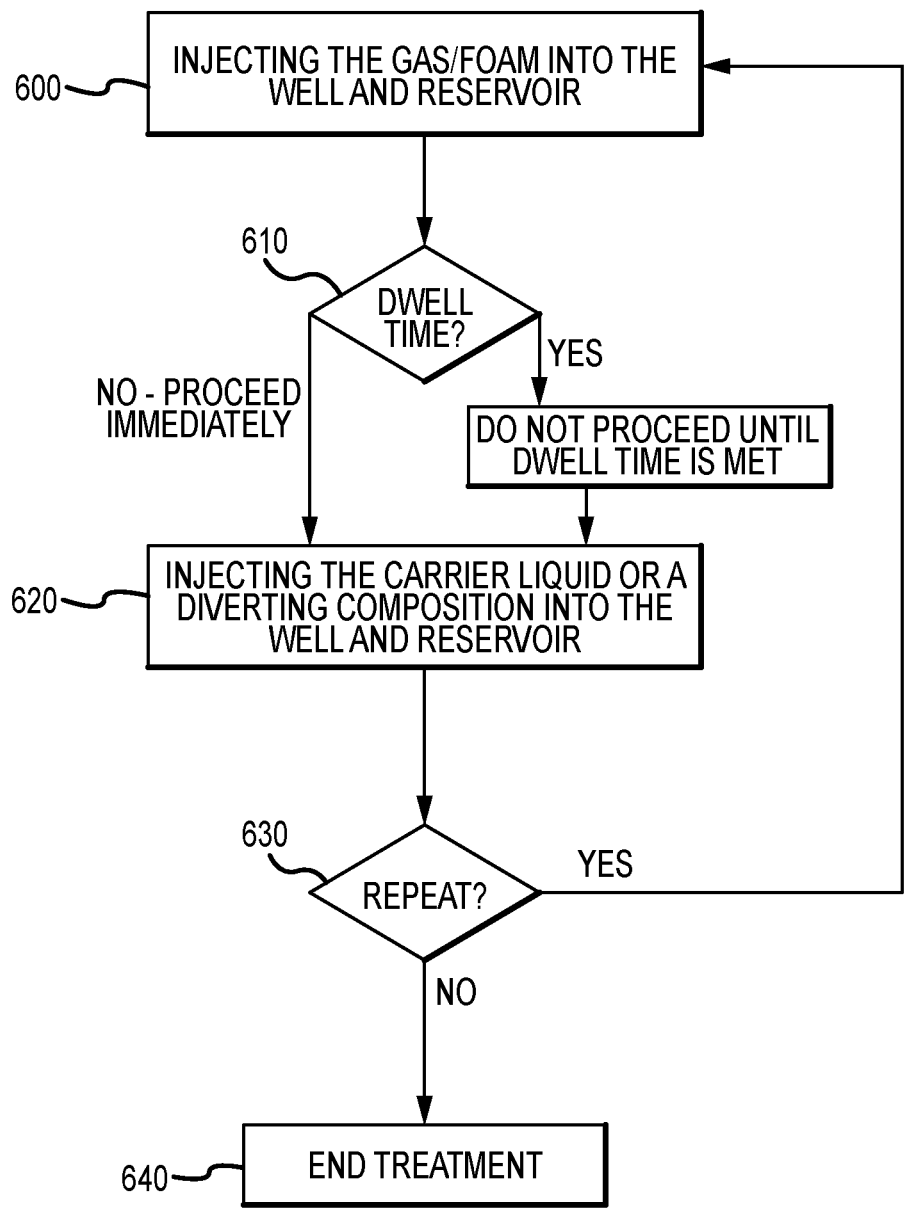
FIG. 6 is a flowchart illustrating the steps in utilizing the diversion technique described herein.

In operation, as seen in the flow chart of FIG. 6, a first step 600 in the method is injecting the gas or foam 416 into the well 420 and reservoir. As stated previously, the gas or foam 416 is configured to pressurize the fractures and pore volumes 108 in the low stress zone 410. This step 600 may include initially introducing the gas 416 into the well 420 by, for example, signaling the storage truck, tanker, or pipeline, among supply sources, 422 containing the gas 416 to begin pumping the gas 416 into the well 420 via the wellhead 426. Also included in this step 600 may be the halting the flow of gas 416 into the well 420 by, for example, signaling the storage truck 422 to stop the flow of gas 416. In other embodiments, the flow of the gas 416 can be monitored and controlled via a control system that may include pressure, sensors, gauges or switches.

In some embodiments, step 600 can comprise injection of gas using a continuous flow until the desired volume has been injected. In other embodiments, step 600 can comprise injecting the gas intermittently, in which the flow of the gas can be started, stopped, and started again, and stopped again in succession. In such embodiments, the flow of gas can be started and stopped any number of times until the desired volume has been injected.

As stated previously, this step 600 may take place over a period of minutes, hours, days, or weeks depending on the well and the type and availability of the diverting agent. In certain instances, the step 600 of injecting the well 420 with gas or foam 416 may take a period of hours until a desired pressure is reached within the well 420. Alternatively, in other implementations, gas or foam 416 may be injected into the well 420 and it may take a period of weeks for sufficient pressure to be reached in the well 420 to begin injecting the carrier liquid 102. And, over the period of weeks, gas or foam 416 may be added continuously, intermittently, or otherwise.

Next, step 610 includes allowing the gas or foam 416 to remain in the well 420 and reservoir for a chosen dwell time, if appropriate, given the chosen deployment method. For example, with certain deployment methods, the gas or foam 416 may be required to remain in the well 420 and reservoir for a period of time before the carrier liquid 102 can be injected into the well 420. For example, if the gas 416 is in a gas phase, there may not be a dwell time. That is, the carrier liquid 102 may be injected immediately upon halting of the flow of gas 416 into the well 420. If the gas 416 is in the liquid phase and the gas will be heated into the gas phase by the heat/energy from the well 420 and reservoir, for example, the gas or foam 416 may need to remain in the well 420 for a dwell time of about 5 minutes to about 24 hours. In certain instances, the dwell time may be longer or shorter. In some embodiments, the dwell time can be less than twenty-four hours. In some embodiments, the dwell time can be less than one hour. In some embodiments, the dwell time can be less than thirty minutes. In other embodiments, the dwell time can be more than twenty-four hours.

Continuing on, the next step 620 in the method is injecting the carrier liquid 102 into the well 420 and reservoir. This step 620 may include initially introducing the carrier liquid 102, or a diverting composition including a diverting agent and the carrier liquid 102, into the well 420 by, for example, signaling the storage truck or other supply source 422 containing the carrier liquid 102 to begin pumping the carrier liquid 102 into the well 420 via the wellhead 426. Also included in this step 620 may be halting the flow of carrier liquid 102 into the well 420 by, for example, signaling the storage truck, or supply source 422 to stop the flow of carrier liquid 102. Carrier liquid 102 can be injected at rates of about 2 barrels/minute (bbl/min.) (84 gallons/min.) to greater than 200 bbl/min. (8400 gallons/min).

The next step 630 asks if the previous operations will be repeated. If the well 420 requires additional treatment, for example, to divert the flow of carrier liquid 102 from additional low stress zones 410 that were formed from the previous operations to newer high stress zones 414 for fracturing. Criteria indicating the need for a re-treatment may, for example, be if the carrier liquid 102 experiences a high pressure, which may indicate the presence of a higher stress zone that may potentially fracture. On the other hand, lower pressure in the well 420 may indicate the carrier fluid 102 is infiltrating lower stress zones. In this situation, the operations may be repeated or ended depending on the particulars of the situation. If the operation is to be repeated, gas 416 may be re-injected into the well 420 and reservoir for additional treatment as described previously with respect to step 600 of the method. The entire cycle of steps 600, 610, and 620 may be repeated any number of times until the end of treatment, at step 640. The methods as described herein can be used to stimulate or treat vertical, deviated, or horizontal wells.

Figure 7:
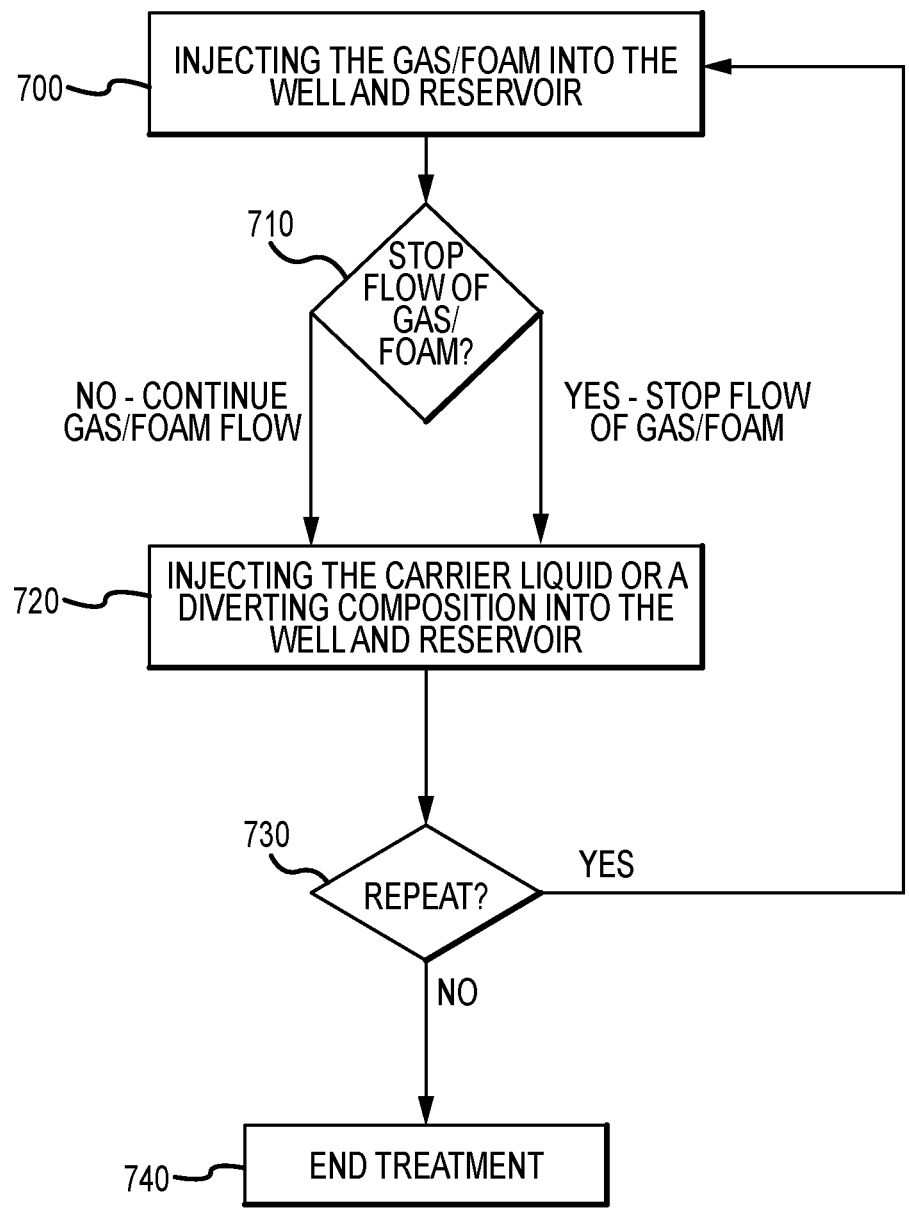
FIG. 7 is a flowchart illustrating another set of steps in utilizing the diversion technique described herein.

Reference is now made to the flowchart of FIG. 7. As seen in the figure, a first step 700 of the method includes injecting the gas or foam 416 into the well 420 and reservoir. The next step 710 asks whether the flow of gas or foam 416 will be stopped before the carrier liquid 102 is injected into the well 420 and reservoir. In certain implementations, the flow of gas or foam 416 may stop and the carrier liquid 102, or a diverting composition including a diverting agent and the carrier liquid 102, may be subsequently injected into the well 420, as was shown in FIG. 6. In other implementations, the flow of gas or foam 416 may continue or not be stopped. In these implementations, the carrier liquid 102 may be injected into the well 420 at step 720 while the foam or gas 416 is also or simultaneously flowing into the well 420. Next, the previous steps 700, 710, 720 may be repeated, if desired. The treatment may be ended at step 740.

It is noted that the carrier liquid 102 may be injected into the well 420 by itself or as part of the diverting composition. That is, for example, a first round of treatment may involve the introduction of the carrier liquid 102 by itself at step 620, 720 and a subsequent or second treatment of the well 420 may involve the introduction of the diverting composition (including the carrier liquid 402) at step 620, 720 or vice versa. Alternatively, multiple rounds of well treatment may involve the introduction of the carrier liquid 102 by itself with some rounds of well treatment involving the introduction of the diverting composition (including the carrier liquid 102). As another example, a first round of treatment may involve the introduction of the diverting composition (including the carrier liquid 102) and a subsequent or second treatment of the well 420 may involve the introduction of only the carrier liquid 102. Other combinations are possible and contemplated herein.

Figure 8:
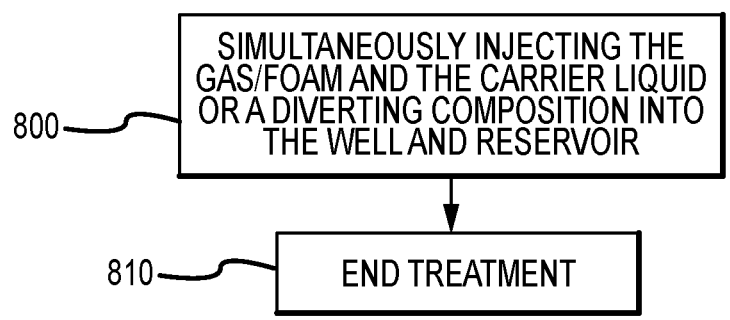
FIG. 8 is a flowchart illustrating yet another set of steps in utilizing the diversion technique described herein.

Turning to the flowchart of FIG. 8, at step 800, the gas or foam 416 and the carrier liquid 102, or a diverting composition including a diverting agent and the carrier liquid 102, may be simultaneously injected into the well 420 and reservoir without any previous injections of the gas or foam 416 into the well 420. The gas or foam 416 and the carrier liquid 102 may be connected at the wellhead 426 to be delivered downhole. The gas or foam 416 may mix with the carrier liquid 402 at the wellhead 426 or within the wellbore 418. This step 800 may continue until the end of treatment at step 810.

Figure 9:
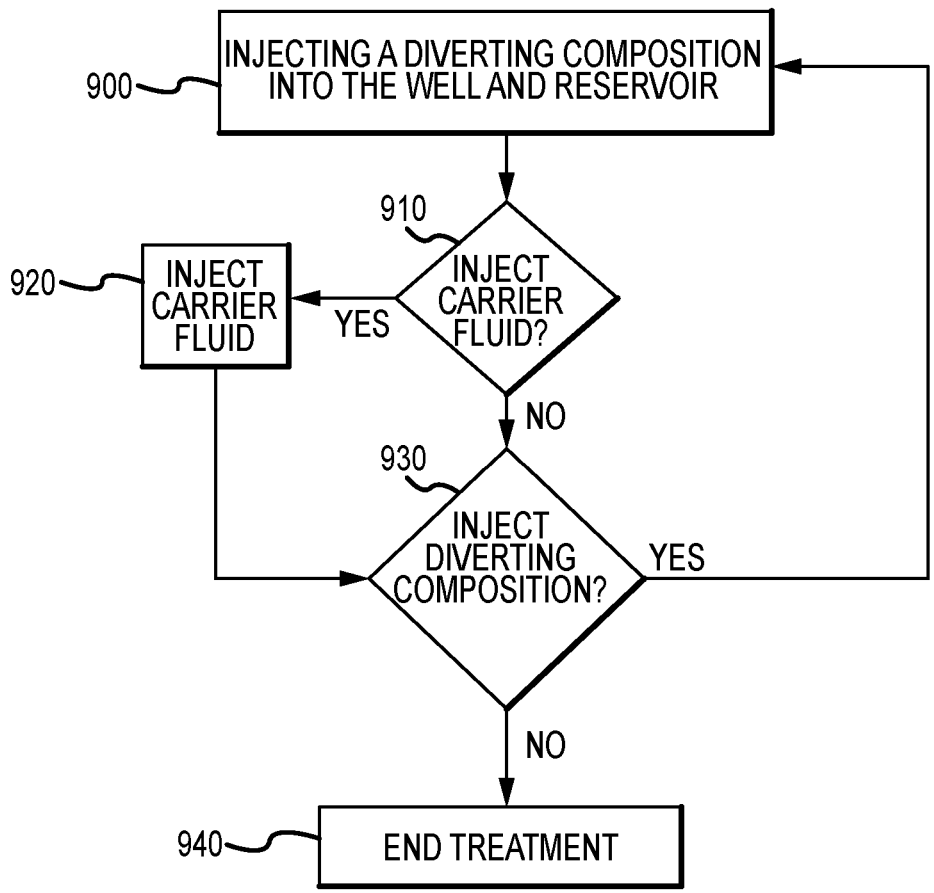
FIG. 9 is a flowchart illustrating another set of steps utilizing the diversion technique described herein.

Reference is now made to FIG. 9, which is a flowchart depicting another method of treating a well. As seen in the figure, at step 900, a diverting composition may be injected into the well and reservoir. The diverting composition may be the gas or foam 416. Alternatively, the diverting composition may be the diverting composition including a diverting agent mixed with the carrier liquid 102. The next step 910 includes asking whether or not a carrier liquid 102 will be injected into the well. An affirmative response indicates that carrier liquid 102 is injected into the well at step 920. A negative response proceeds to asking whether to inject another diverting composition into the well and reservoir at step 930. A negative response ends treatment at step 940. At step 930, an affirmative response indicates that another diverting composition is injected into the well and reservoir at step 900. As stated previously, the diverting composition may be the gas or foam 416. Alternatively, the diverting composition may be the diverting composition including a diverting agent mixed with the carrier liquid 102. The steps of this method may continue or end, accordingly. While this method begins at step 900 with injecting a diverting composition into the well and reservoir, the method may begin at any step in the process. For example, the method may begin at step 920 with injecting a carrier fluid 102 into the well and reservoir.

The steps in this method indicate that an example order of injections may be as follows: a first diverting composition is injected; a second diverting composition is injected; and the carrier fluid is injected. Another example order of injections into the well and reservoir may be as follows: a first diverting composition is injected; the carrier fluid is injected; a second diverting composition is injected. In each of these examples, the first and second diverting compositions may be the gas or foam 416 or the diverting composition including a diverting agent mixed with the carrier liquid 102. Consequently, and more specifically, the examples above may be as follows: a gas or foam is injected; a diverting composition including the diverting agent mixed with a carrier fluid is injected; the carrier fluid is injected. The second example may, more specifically, be as follows: a gas or foam is injected; the carrier fluid is injected; a diverting composition including the diverting agent mixed with a carrier fluid is injected. These are merely examples and other sequences are possible and contemplated herein.

The teachings of this disclosure can be applied in a multi-well configuration, such as one having a target well and multiple injection wells. As will be appreciated, fluids, whether in the gas or liquid phase, can be injected to surrounding injection wells to influence behavior of a target well. The behavior can be, for example, fracturing characteristics or patterns, valuable fluid production (whether liquid or gas-phase hydrocarbons), and the like. While four equally spaced injection wells are shown around the target well, any number and surface/underground well configurations can be employed depending on the application.

Figure 10:
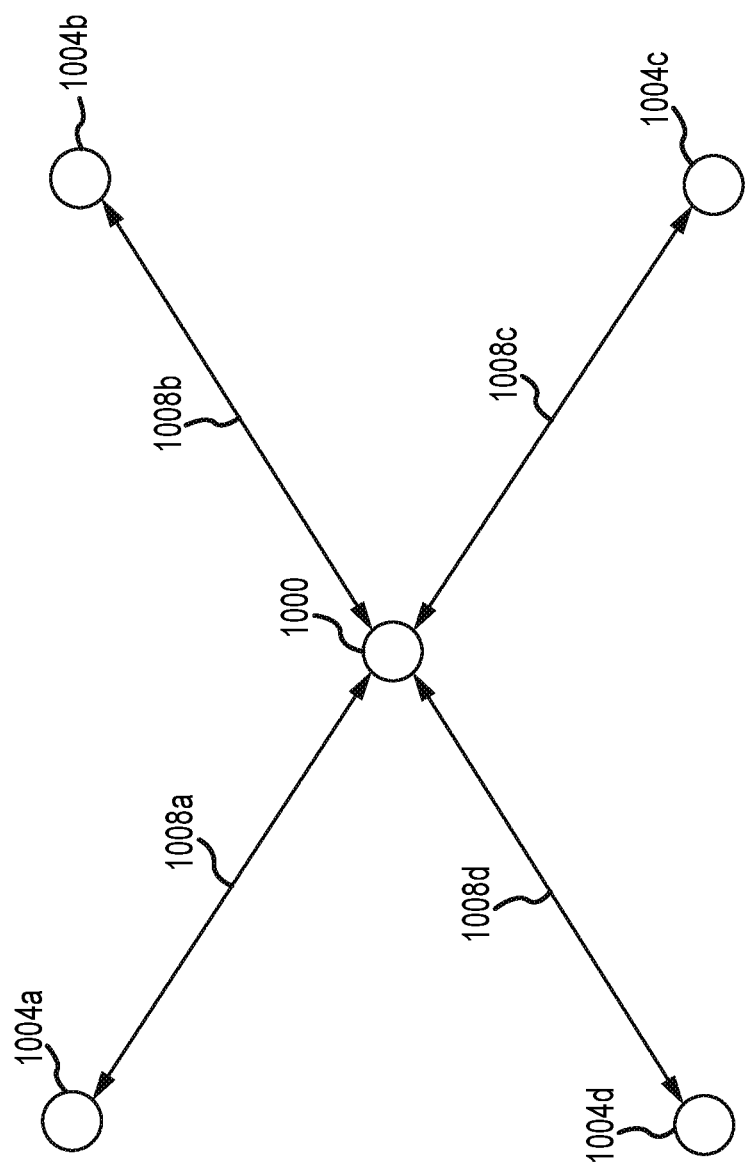
FIG. 10 depicts a multi-well configuration according to an embodiment.

Referring to FIG. 10, a target well 1000 is surrounded by injection wells 1004$a,b,c,d$. Each injection well is positioned a respective distance 1008$a,b,c,d$ from the target well 1000. The distance is a function of the type of fluid injected and the permeability and porosity of the underground formations in the underground zones of interest. Each injection well 1004$a$-$d$ is injected simultaneously or sequentially, in accordance with the parameters set forth above, with a pressurized fluid diversion medium, such as a gas, liquid, or mixture thereof (e.g., foam) (which may or may not be in the form of a diverting composition including a diverting agent), at injection pressure PSI at the surface and pressure PDHI down hole. The target well 1000 can also be injected simultaneously or sequentially with the pressurized fluid at injection pressure PST at the surface and pressure PDHT down hole. The injection and down hole pressures are selected according to the teachings of this disclosure to induce fracturing in the high stress areas rather than low stress areas of the target well. The injected fluid in each of the injection wells will, after a selected period of time, migrate towards and pressurize the target well. The migration time required for inter-well fluid communication depends on a number of factors including the type of fluid injected and the permeabilities and porosities of the underground formations in the zones of interest. In one configuration, a fluid is injected into the target well while in other configurations no fluid is injected into the target well due to fluidization and pressurization of the target well by the fluids injected into the zones of interest by the injector wells.

The fluid pressures PSI at the surface and PDHI down hole in one injection well generally are substantially the same as the respective fluid pressure in another injection well. Typically, the fluid pressure PSI at a first injection well is within about 25%, more typically within about 20%, more typically within about 15%, more typically within about 10%, and more typically within about 5% of the fluid pressure PSI at a second injection well. Likewise, the fluid pressure PDHI at a first injection well is within about 25%, more typically within about 20%, more typically within about 15%, more typically within about 10%, and more typically within about 5% of the fluid pressure PDHI at a second injection well. Commonly, the fluid pressure PSI at any injection well is within about 25%, more typically within about 20%, more typically within about 15%, more typically within about 10%, and more typically within about 5% of the fluid pressure PST at the target well, and the fluid pressure PDHI at any injection well is within about 25%, more typically within about 20%, more typically within about 15%, more typically within about 10%, and more typically within about 5% of the fluid pressure PSDHT at the target well.

When the injection and target wells are sufficiently pressurized and after a suitable injected fluid dwell time in the target well, the carrier liquid is introduced into the target well 1000 to induce fracturing of high stress areas. The pressurization of the injection wells can force the fracture to propagate through the high stress areas as the fractures propagate outwardly rather than towards low stress areas Another multi-well configuration having a target well and multiple injection wells can be employed using movable isolation device. The multi-well configuration can fracture a selected formation radially outwardly from a toe of the target well, with the fractures propagating forwardly and distally from the toe.

Figure 11:
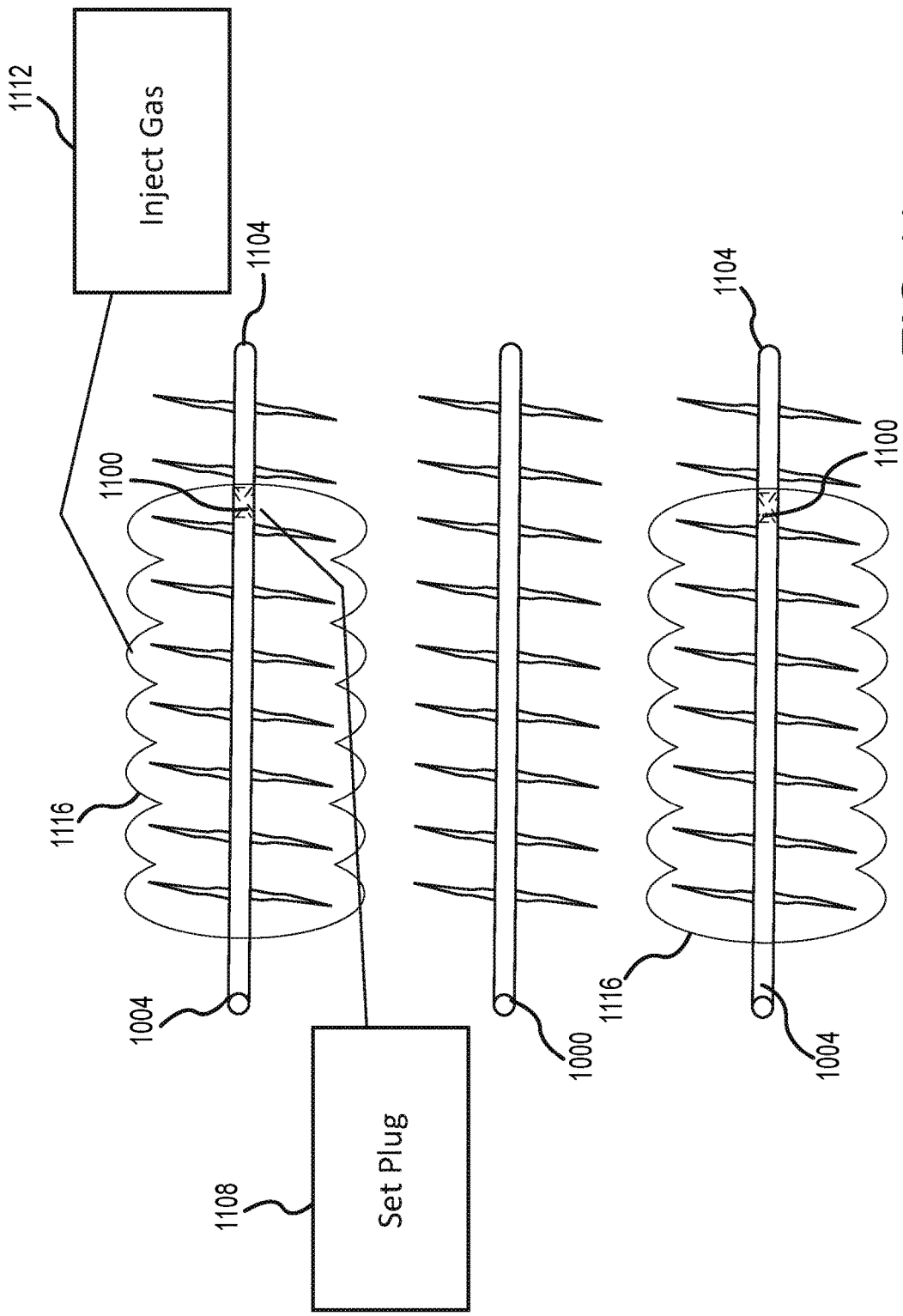
FIG. 11 depicts a multi-well configuration according to an embodiment.

As shown in FIGS. 10-11 first and second injector wells are positioned on either side of the target well, which are substantially horizontal inclined. While a horizontal inclination is shown, any inclination of the wells, whether vertical or horizontal or a combination thereof is possible. Movable isolation device 1100 is positioned along a length of each of the injection wells 1004 at a selected distance from a toe 1104 of each well 1004. Once the movable isolation devices 1100 are in position (step 1108), a fluid, typically a gas (through a liquid or combination of gas and liquid can be used), is injected into each injection well 1004 (step 1112) as discussed above, so that the injected fluid moves radially outwardly from the injection well as shown by fluid penetration profile 1116.

Figure 12:
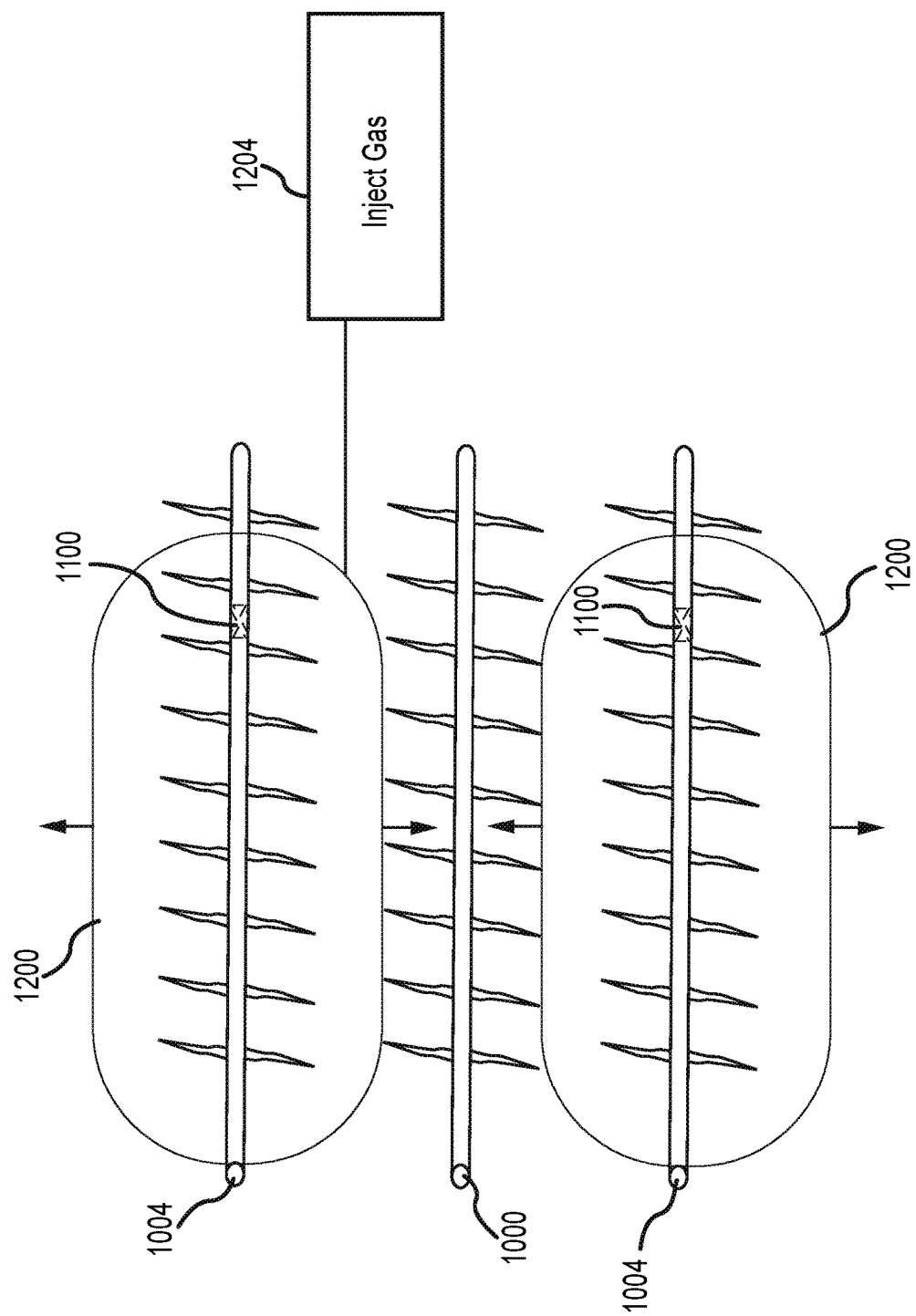
FIG. 12 depicts a multi-well configuration according to an embodiment.

Referring to FIG. 12, the fluid continuously injected into the injection wells 1004 to continue moving the fluid penetration profile radially outwardly from each injection well as shown by fluid penetration profile 1200 (step 1204).

Figure 13:
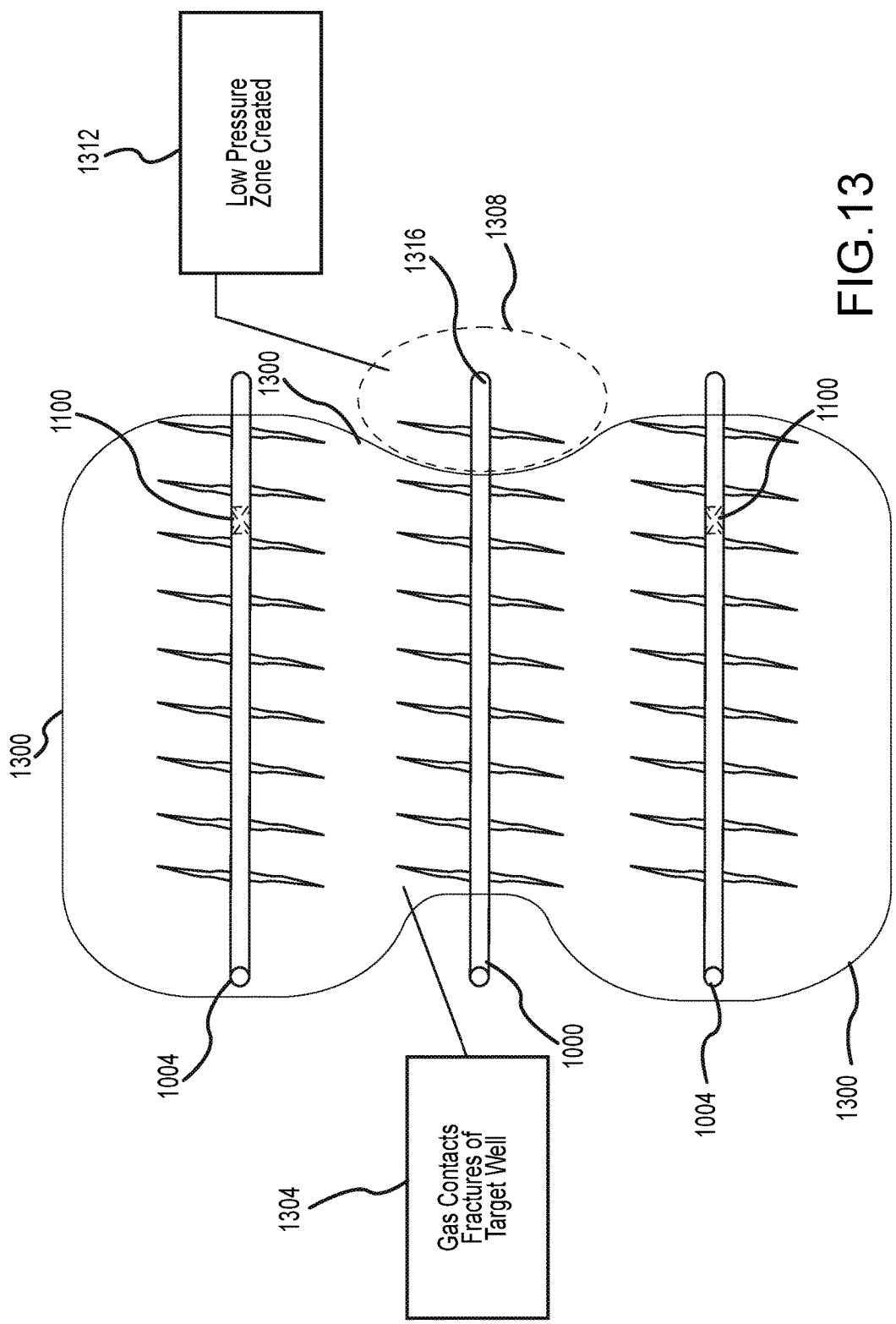
FIG. 13 depicts a multi-well configuration according to an embodiment.

Referring to FIG. 13, the fluid, while still being injected continuously, has moved radially outwardly, whereby the fluid injected from each injection well 1004 has intersected fluidly, forming a fluid penetration profile 1300 encompassing both inject wells 1004 and the target well 1000. As shown by box 1304, the injected fluid has contacted the pre-existing radial fractures of the target well 1000. Fluid may or may not be injected into the injection well 1000 during the foregoing steps. As shown by box 1312, a low pressure zone is created at a toe 1316 of the target well 1000. The low pressure zone 1308 may be in a high stress area while the other fractures along the length of the target well 1000 are in a low stress area. The low pressure zone 1308, however, is defined by the lower penetration of the pressurized and injected fluid into the low pressure zone 1308 when compared to the penetration and injected fluid into the fractures along the length of the target well 1000. The differential penetration along the length of the target well 1000 is caused largely by, and is a function of, the position of the isolation devices 1100 along the lengths of the injection wells. Typically, the fluid pressure in the low pressure zone 1308 is less than the fluid pressure along the length of the target well 1000 where the fluid has penetrated.

Figure 14:
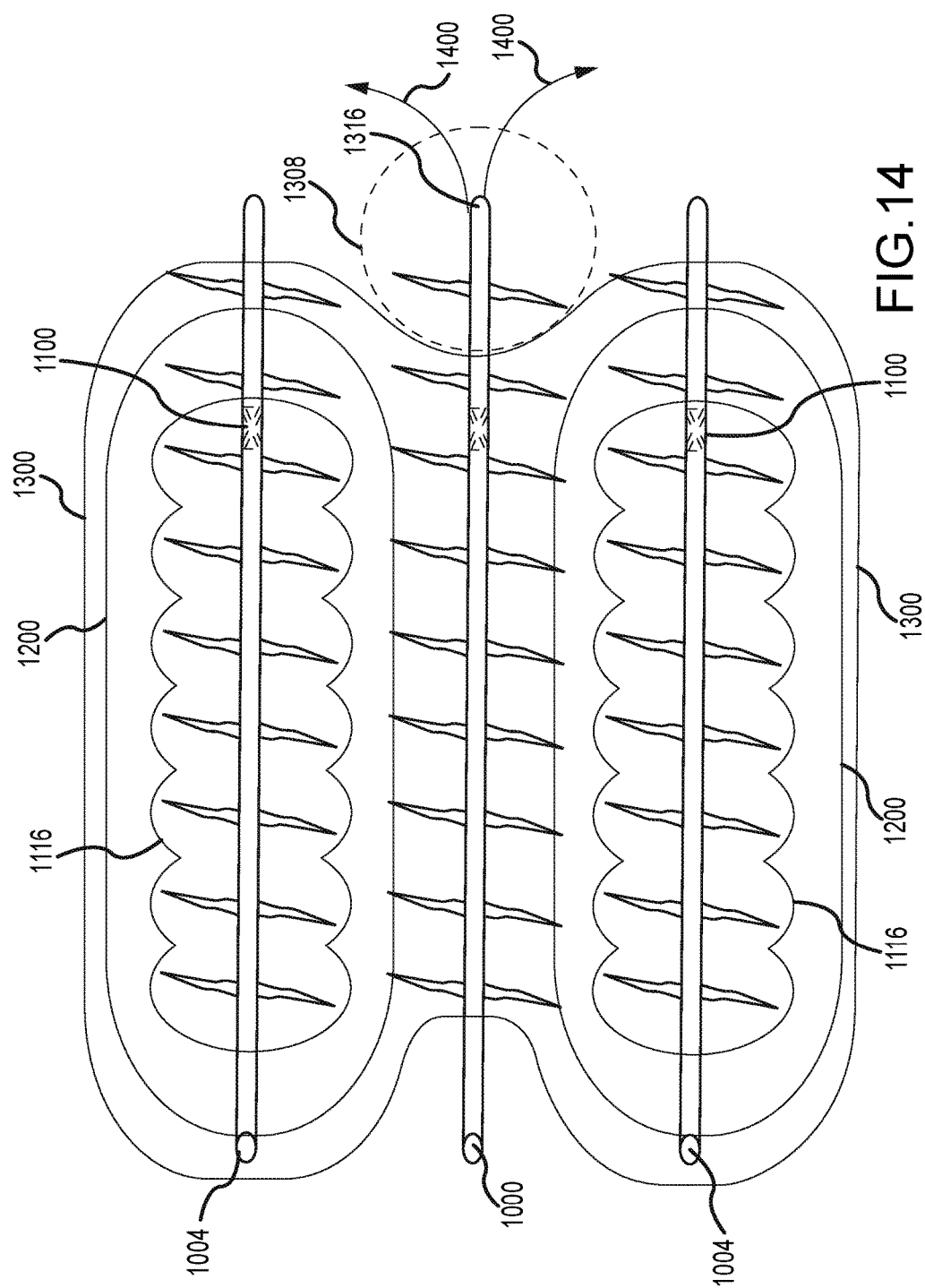
FIG. 14 depicts a multi-well configuration according to an embodiment.

Referring to FIG. 14, the progressive fluid penetration profiles 1116, 1200, and 1300 of FIGS. 11-13 are depicted along with the low pressure zone 1308 at the toe 1316 of the target well 1000. After a suitable fluid dwell time, a carrier fluid can be injected into the target well to cause fractures to propagate largely in the low pressure zone 1308 outwardly from the toe 1316 as shown by the arrows 1400 rather than in the weaker or low stress areas along the length of the target well 1000. This is due to the penetration of the injected fluid into the pre-existing fractures, which diverts the carrier fluid away from the pre-existing fracture and towards the toe 1316 of the target well 1000.

The target well 1000 can be deepened followed by repositioning of the isolation devices 1100 farther down the length and/or depth of the injection wells 1004 and the steps repeated to cause further fracturing from the target well 1000.

In another configuration, an isolation device 1100 is positioned farther down the length and/or depth of the target well 1000 than along the length and/or depth of the injection wells 1004. In the example shown, the target well could extend further than depicted (or be deeper) with an isolation device 1100 positioned at the current position of the toe 1316, which position would be a distance from the toe of the deeper well. The isolation devices 1100 in the injection wells 1004 would be in the same position, causing a spatial offset (along the lengths of the wells) of the isolation devices 1100 in the injection wells from the isolation device in the target well. The steps of FIGS. 11-14 would be performed to produce fractures propagating forwardly from the position of the isolation device in the target well. The isolation devices would then be moved deeper into the injection and target wells to produce a similar spatial offset, and the steps repeated again to produce fractures propagating forwardly from the position of the isolation device in the target well. These steps can be repeated as frequently as possible to produce the desired fracture profile along the length of the target well.

The technique of FIGS. 11-14 work more effectively when the injected fluid pressurizes only a portion of the injection wells 1004 and no fluid is introduced into the target well 1000.

Aspects of the presently disclosed technology involve a diversion technique for use in vertical, deviated, or horizontal wells undergoing a stimulation process (e.g., initial stimulation or re-stimulation) to divert a carrier liquid from treating previously stimulated areas (i.e., lower stress zones of the formation) and to force the carrier liquid to treat previously unstimulated areas (i.e., higher stress zones of the formation). The methods disclosed provide cost-effective means for improving the well production. After a wellbore is drilled and completed, stimulation operations are usually performed to enhance hydrocarbon (e.g. gas, oil, etc.) production into the wellbore and to enhance extraction of the hydrocarbons from the subterranean formation. Current diversion techniques use liquid or solid forms, such as chemical solutions (e.g., a borate solution) or, particulates (e.g., polymers spheres), which can be costly and potentially ineffective in diverting fluid to the higher stress regions/zones of the reservoir. Additionally, liquid- and solid-form diverters can be problematic as they leave residue that can damage the subterranean formation and can lead to inhibited production from the well. In contrast, the methods of the present disclosure are cost effective, operationally feasible based on current equipment available to the industry, and can enhance the rate of extraction of the hydrocarbons. In particular, the use of a gas as the diversion medium allows for greater filling of the reservoir in lower stress zones such that a carrier liquid can be more efficiently diverted to the higher stress zones of the reservoir. The use of a gas as the diversion medium also has advantages in that no residue remains and the gas can be recovered during flowback. In certain instances, the gas may be recovered during flowback can be reused, recycled, or marketed.

Figure 15:
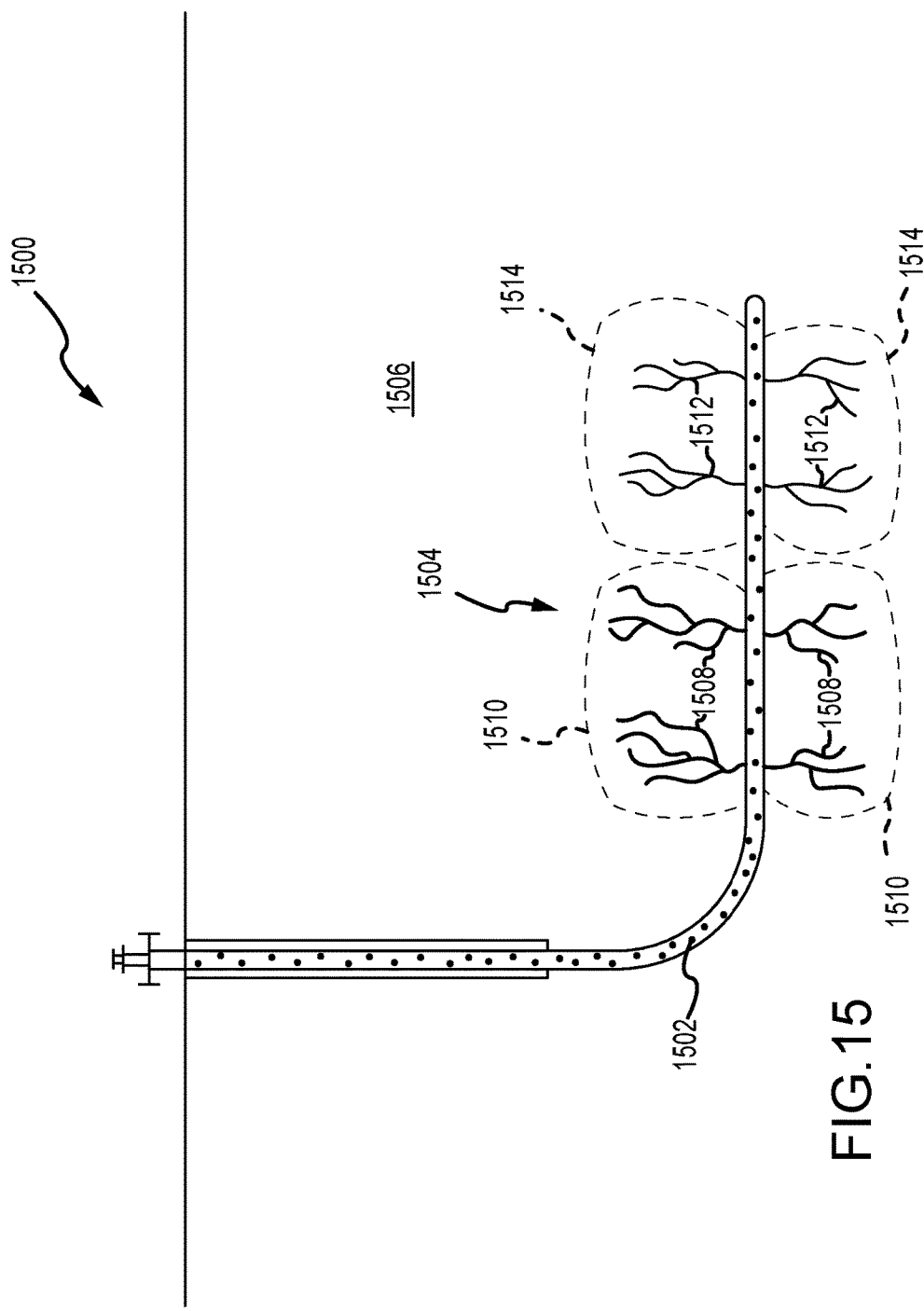
FIG. 15 is a side view of a hydraulic fracturing operation showing high and low stress zones.

As seen in FIG. 15, which is a side view of a horizontal drilling operation 1500 utilizing hydraulic fracturing, a pressurized liquid 1502 may cause multiple fractures 1504 within the subterranean formation 1506. Fractures 1504 formed by the pressurized liquid 1502 can be of varying sizes. Accordingly, larger fractures or pore volumes 1508 may cause a lower stress zone 1510 within the formation such that upon stimulation and re-stimulation of the well the carrier liquid 1502 tends to concentrate in these lower stress zones 1510. These lower stress zones 1510 can be caused by hydrocarbon depletion, lower pore pressure, and/or higher permeability of the reservoir 1506. Permeability of the reservoir can, in part, depend on the extensiveness of fractures and/or pores, and the interconnectivity of the fractures and/or pores that create pathways for hydrocarbons to flow. As a result of the lower stress zones, the hydrocarbons are more likely to flow through these larger fractures or pore volumes 1508, and/or those with interconnectivity, until depletion. The fractures and/or pore volumes 1504 of finer sizes 1512 and/or those lacking interconnectivity tend to be concentrated in higher stress zones 1514 such that the carrier liquid 1502 is less likely to effectively hydraulically fracture those higher stress zones and thus influence the flow of hydrocarbons in these regions upon stimulation or re-stimulation. This is in part, because the pressure of the carrier liquid 1502 is generally evenly distributed along the wellbore in the treated area such that the carrier liquid 1502 remains concentrated in the lower stress zones 1510 rather than the higher stress zones 1514. The higher stress zones 1514, in contrast to the lower stress zones 1510, can be caused by higher pore pressure, ineffective hydraulically fractured regions, lower permeability of the reservoir 1506, or generally less depleted portions of the reservoir 1506. As such, the carrier liquid 1502 tends to not affect the higher stress zones 1514, which may contain hydrocarbons, unless additional systems and methods are employed.

In subsequent well treatments or in initial well treatments, diverter systems may be used to divert the carrier liquid 1502 from the lower stress zones 1510, which may be depleted from previous treatments, to the previously un-accessed, higher stress zones 1514. Diverting the carrier liquid 1502 into these higher stress zones 1514 may be difficult over large areas of the wellbore and reservoir for a number of reasons. In new wells, the difficulty may be due to differences in stresses from different lithologies or from different reservoir characteristics along the well. Differences in stress can be due to natural in-situ stress conditions or man-made activities such as well stimulation or depletion of fluids. In previously stimulated wells, the difficulty may be due to adequately blocking the fractures and/or pore volume 1508 in the lower stress zones 1510 such that the carrier liquid 1502 pressurizes the fractures 1512 of the higher stress zones 1514. Diverter systems include the use of particulates (e.g., polymers) and chemical diverters within the carrier liquid 1502, among other methods, to block either the wellbore or the formation near the wellbore so that a portion of the carrier liquid 1502 may be diverted to the fractures 1512 in the higher stress zones 1514 and also create new fractures in the higher stress zones.

Figure 16:
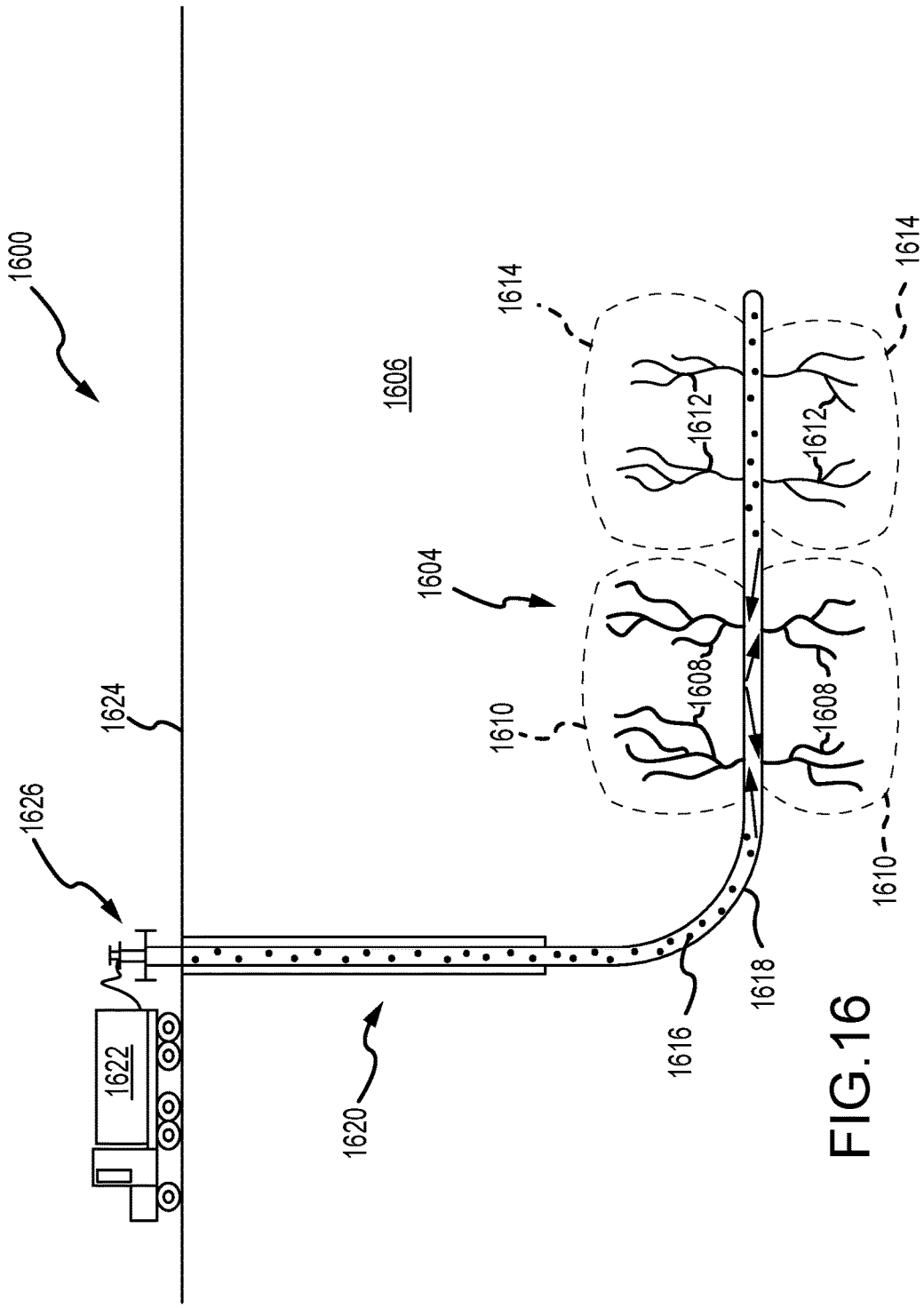
FIG. 16 is a side view of a horizontal drilling operation utilizing the diversion technique described herein where a gas is introduced into the well.

More particularly, and as seen in FIG. 16, which is a side view of a horizontal drilling operation 1600 utilizing the diversion technique described herein, a first step in the diversion technique includes injecting a gas 1616 into a wellbore 1618 of a well 1620 to pressurize the fractures 1608 in the lower stress zones 1610 of the subterranean formation 1606 and the reservoir. In certain implementations, the gas 1616 may be in a liquid phase, a gas phase, or a foam mixture of gas and a liquid. The gas is introduced to infiltrate the formation 1606 and the reservoir holding the hydrocarbons. The gas can travel through a stimulation network of fractures and/or pore volumes (i.e., man-made or naturally occurring). Upon infiltration, the gas will occupy pore volumes and existing fractures in the formation 1606. In some instances, the pore volume can be preexisting from the natural formation or areas/regions of hydrocarbon depletion. This gas infiltration creates a barrier for a carrier liquid 1502 that is subsequently delivered into the wellbore and diverted to the higher stress zones 1614. The gas in the stimulation network can build a sufficient pressure in the network allowing subsequently delivered carrier fluid or liquid to be diverted into previously untreated areas of the formation. In some instances, this method will allow for the diversion of a fluid or liquid to a portion of the formation that is a significant distance from the wellbore (i.e. far-field).

The subterranean formation may include one or more of any type of rocks, such as sedimentary rocks like sandstone, limestone, and shale; igneous rocks like granite and andesite; or metamorphic rocks like gneiss, slate, marble, schist, and quartzite. In certain implementations, the subterranean formation may be a shale formation, a clay formation, a sandstone formation, a limestone formation, a carbonate formation, a granite formation, a marble formation, a coal bed, or combinations thereof.

Figure 17:
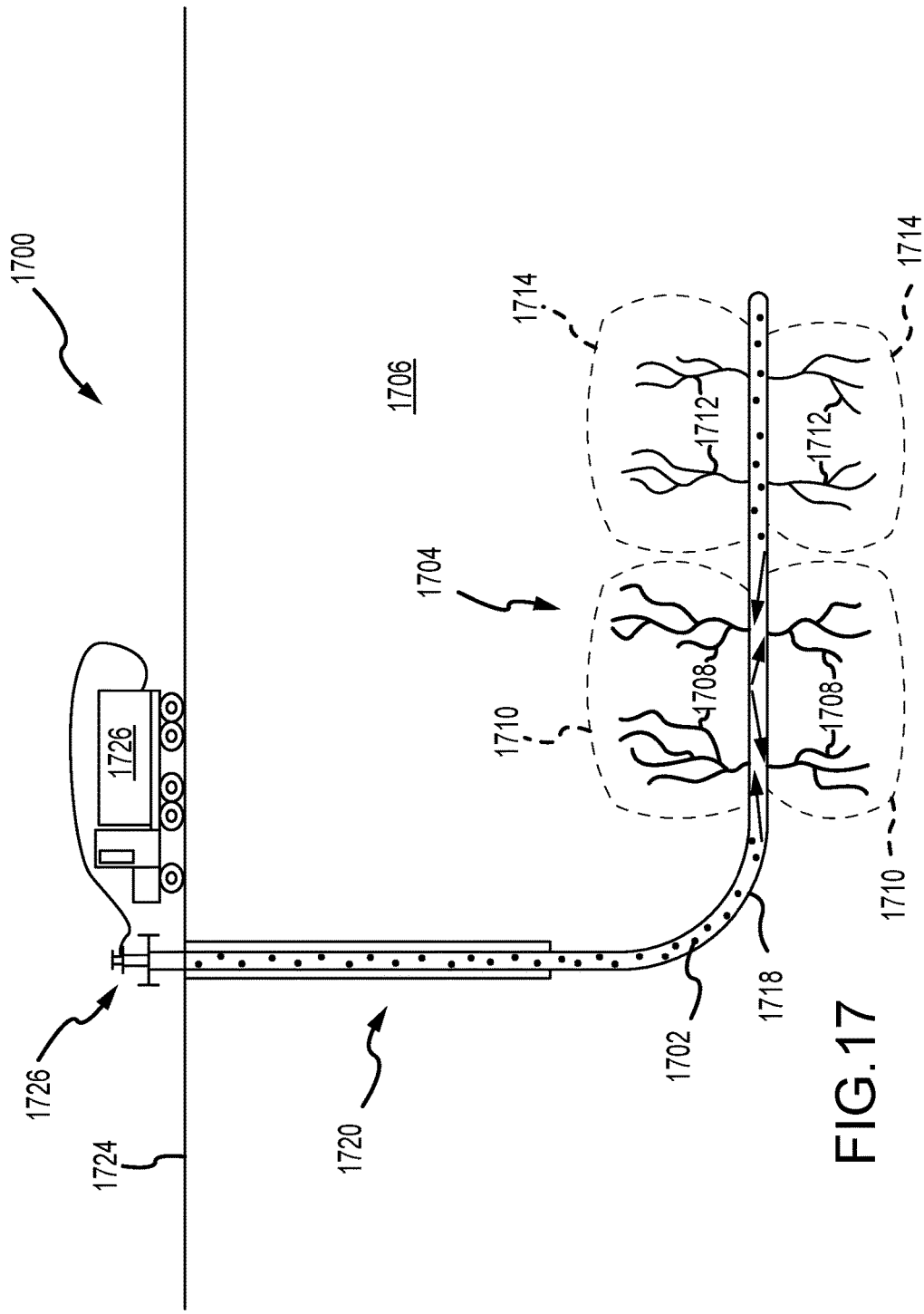
FIG. 17 is a side view of the horizontal drilling operation utilizing the diversion technique described herein where a carrier liquid is introduced into the well.

As seen in FIG. 17, which is a side view of the horizontal drilling operation 1700 utilizing the diversion techniques described herein, a second step in the diversion technique includes injecting the carrier liquid 1502 into the wellbore 1718 such that the carrier liquid 1502 pressurizes and fractures additional fractures 1712 of the formation 1706 that were previously not stimulated. Without injecting the gas 1616 into the wellbore, the carrier liquid 1502 would not be diverted to untreated areas and would otherwise infiltrate the fractures 1708 of the lower stress zone 1710. Sufficiently pressurizing the fractures 1708 in the lower stress zone 1710 causes the subsequently injected carrier liquid 1502 to bypass the gas-filled, pressurized fractures 1708 in the lower stress zones 1710 and can be directed to infiltrating the fractures 1712 of the high stress zone 1714 or create new fractures.

The gas 1616 may be delivered through a wellhead 1726 of the well 1720. In some embodiments, the gas 1616 may be delivered via a storage truck 1622 positioned on the ground 1724 near the wellhead 1726. In other embodiments, the gas 1616 may be delivered via pipeline, a storage tank, other gas producing wells, or other suitable supply sources.

Factors effecting the volume of gas 1616 to be introduced in the well 1720 include the size of the depleted regions of the reservoir (including pore volume and fractures), leak off rate of the gas 1616, and the extent of existing fracture and reservoir conditions (e.g. reservoir pressure—if the pressure is high it will compress the gas or foam requiring more volume to occupy the fractures/pore volumes).

For instance, in some embodiments, the volume of the gas can range from about 1000 standard cubic feet (scf) to about 100,000,000 scf or greater. In various embodiments, the gas can be injected at rates within a range of about 30 scf/min to about 500,000 scf/min. In some embodiments, the gas can be injected at a rate of about 10,000 to about 20,000 scf/min.

In certain instances, the gas 1616 may be injected into the well over an extended period of time. For example, the gas 1616 may be injected over a period of time that can be minutes, hours, days, or months, depending on a number of factors. In some embodiments, the gas 1616 may be injected over a period of time of at least 2 hrs. In other embodiments, the gas 1616 may be injected over a period of time of at least a day. For example, in certain instances, the gas 1616 may be injected into the well from a neighboring natural gas well, for example. A worker may check the pressure at a subsequent time (e.g., days later) and determine that, in order to meet a desired pressure within the wellbore, additional gas 1616 may need to be injected into the wellbore and continue the injection of the gas. A subsequent check of the pressure (e.g., days later), may indicate that the pressure is sufficient for the introduction of the carrier liquid 1502. Thus, in this example, it is possible for weeks to go by with intermittent addition of gas 1616 into the well before a sufficient pressure is reached to begin introduction of the carrier liquid 1502.

The gas 1616 may include any number of gasses and may include nitrogen, hydrogen, methane, ethane, propane, butane, carbon dioxide, any inert gas, or any combinations thereof. The gas 1616 may be deployed into the well 1720 in a number of ways and in various phases. In certain implementations, the gas 1616 may be in a gas phase and pumped directly into the wellbore 1718 from the wellhead 1726. In other implementations, the gas 1616 may be in a liquid phase above ground 1724, and the gas 1616 is heated sufficiently at the surface for the gas 1616 to enter the gas phase as it is being introduced into the wellbore 1718, thereby being in the gas phase when it infiltrates the pore volumes and/or fractures. In yet other implementations, the gas may be in a liquid phase when it is introduced to the wellbore. The gas in the liquid phase may be pumped into the well and allowed to remain in the well 1720 for a sufficient amount of time such that the reservoir temperature causes the liquid phase gas 1616 to change phases from a liquid to a gas and infiltrate the fractures and pore volumes 1508. For example, the reservoir temperature may range from 1620 degrees Fahrenheit (F) to greater than 600 degrees F. The gas 1616 in a liquid phase may be pumped into the well at a lower temperature (e.g., −69 F to 80° F.), and through heat exchange from the higher temperature of the well, can transition from the liquid phase to a gas phase.

In certain implementations, a foam mixture of liquid and gas may be pumped into the well 1720, instead of gas 1616. The foam may be delivered through a wellhead of the well. In some embodiments, the foam may be delivered via a storage truck 1622 positioned on the ground 1724 near the wellhead 1726. In other embodiments, the gas 1616 may be delivered via pipeline, a storage tank, or other suitable supply sources.

Foam quality is conventionally defined as the volume percent gas within foam at a specified pressure and temperature. In certain instances, the quality of the foam may be at least 30. That is, there is at least 30% gas in the foam and the balance is liquid. In certain instances, the quality of the foam may be at least 40. That is, there is at least 40% gas in the foam and the balance is liquid. In certain instances, the quality of the foam may be at least 50. That is, there is at least 50% gas in the foam and the balance is liquid. In certain instances, the quality of the foam may be at least 60. That is, there is at least 60% gas in the foam and the balance is liquid. In certain instances, the quality of the foam may be greater than 70. In certain instances, the quality of the foam may be greater than 80. In certain instances, the quality of the foam may be greater than 90.

A first step in the diversion technique includes injecting a gas 1616 into a wellbore 1718 of a well 1720 to pressurize the fractures and/or pore volumes 1508 in the lower stress zones 1710 of the subterranean formation 1706 and the reservoir. The gas 1616 is introduced to infiltrate the formation 1706 and the reservoir holding the hydrocarbons. The gas 1616 can travel through a stimulation network of fractures and/or pore volume (manmade or naturally occurring) extending from the wellbore 1718. Upon infiltration, the gas 1616 will occupy pore volumes and existing fractures in the formation 1706. In some instances, the pore volume and fractures 1708 can be preexisting from the natural formation or areas/regions of hydrocarbon depletion. This gas 1616 infiltration creates a barrier for a carrier liquid 1502 that is subsequently delivered into the wellbore 1718 and diverted to the higher stress zones 1714. The gas 1616 in the stimulation network will build a sufficient pressure, allowing subsequently delivered carrier fluid or liquid 1502 to be diverted into previously untreated areas of the formation.

In all implementations, the gas 1616 or foam may infiltrate the fractures and pore volumes of the formation beyond the wellbore of the well 1720 to a distance that is substantial or far-field from the wellbore, outside of a perforation tunnel, or outside of a formation face in open hole. The gas or foam 1616 can infiltrate the fractures and/or pore volumes extending through the length of the well and throughout the reservoir, including far-field areas. This is an advantage of the gas and foam 1616 that typical chemical and particulate diverter systems do not have. As an example, in certain implementations, far-field areas of the formation may be about 10 feet to about 3000 feet from a wellbore or perforation tunnel. In other implementations, far-field areas of the formation may be about 100 feet to about 5,000 feet from a wellbore or perforation tunnel.

As illustrated in FIG. 17, the carrier liquid 1502 may be delivered through the wellhead 1726. In some embodiments, the carrier liquid 1502 may be delivered to the well 1720 via a storage truck 1726 positioned on the ground 1724 near the well head 1726. In certain implementations the carrier liquid 1502 or an amount of water used in the carrier liquid 1502 may be supplied by storage tanks, naturally formed features (e.g., spring), a pipeline, etc.

The carrier liquid 1502 may be: slick-water, which is a water-based fluid and proppant combination of a low viscosity; a gel (e.g., borate, HPG, CMHPG, CMG); or a foam (e.g., nitrogen and water with gel, carbon dioxide, propane, and combinations thereof), among other carrier liquids.

In the implementations described herein, the gas 1616 may be substantially compressible within the wellbore and the reservoir, whereas the carrier liquid 1502 may be substantially incompressible. The gas 1616, as compared with the carrier liquid 1502, tends to more easily fill the fractures and pore volumes because of its compressible nature, has a high relative permeability to the reservoir, and has a lower coefficient of friction, which allows it to fill the fractures and pore volumes that may not otherwise be penetrated by the carrier liquid 1502. The carrier liquid 1502, on the other hand, can more readily, as compared with the gas 1616, fracture the formation of the reservoir, in part, because it is substantially incompressible.

Figure 18:
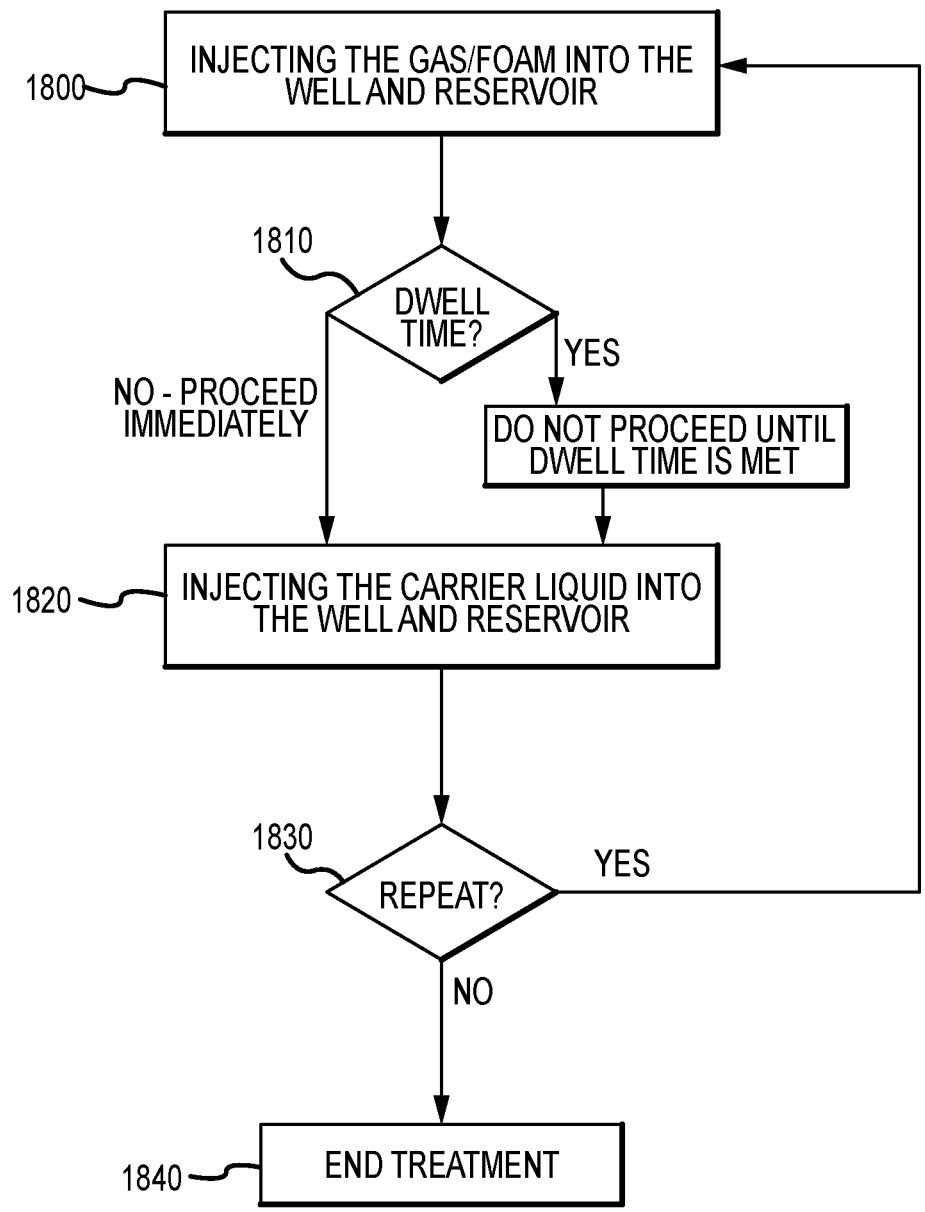
FIG. 18 is a flowchart illustrating the steps in utilizing the diversion technique described herein.

In operation, as seen in the flow chart of FIG. 18, a first step 1800 in the method is injecting the gas or foam 1616 into the well 1620 and reservoir. As stated previously, the gas or foam 1616 is configured to pressurize the fractures and pore volumes 1508 in the low stress zone 1610. This step 1800 may include initially introducing the gas 1616 into the well 1620 by, for example, signaling the storage truck, tanker, or pipeline, among supply sources, 1622 containing the gas 1616 to begin pumping the gas 1616 into the well 1620 via the wellhead 1626. Also included in this step 1800 may be the halting the flow of gas 1616 into the well 1620 by, for example, signaling the storage truck 1622 to stop the flow of gas 1616. In other embodiments, the flow of the gas 1616 can be monitored and controlled via a control system that may include pressure sensors, gauges or switches.

In some embodiments, step 1800 can comprise injection of gas using a continuous flow until the desired volume has been injected. In other embodiments, step 1800 can comprise injecting the gas intermittently, in which the flow of the gas can be started, stopped, and started again, and stopped again in succession. In such embodiments, the flow of gas can be started and stopped any number of times until the desired volume has been injected.

As stated previously, this step 1800 may take place over a period of minutes, hours, days or weeks depending on the well and the type and availability of the diverting agent. In certain instances, the step 1800 of injecting the well 1620 with gas or foam 1616 may take a period of hours until a desired pressure is reached within the well 1620. Alternatively, in other implementations, gas or foam 1616 may be injected into the well 1620 and it may take a period of weeks for sufficient pressure to be reached in the well 1620 to begin injecting the carrier liquid 1502. And, over the period of weeks, gas or foam 1616 may be added continuously, intermittently, or otherwise.

Next, step 1810 includes allowing the gas or foam 1616 to remain in the well 1620 and reservoir for a chosen dwell time, if appropriate, given the chosen deployment method. For example, with certain deployment methods, the gas or foam 1616 may be required to remain in the well 1620 and reservoir for a period of time before the carrier liquid 1502 can be injected into the well 1620. For example, if the gas 1616 is in a gas phase, there may not be a dwell time. That is, the carrier liquid 1502 may be injected immediately upon halting of the flow of gas 1616 into the well 1620. If the gas 1616 is in the liquid phase and the gas will be heated into the gas phase by the heat/energy from the well 1620 and reservoir, for example, the gas or foam 1616 may need to remain in the well 1620 for a dwell time of about 5 minutes to about 24 hours. In certain instances, the dwell time may be longer or shorter. In some embodiments, the dwell time can be less than twenty-four hours. In some embodiments, the dwell time can be less than one hour. In some embodiments, the dwell time can be less than thirty minutes. In other embodiments, the dwell time can be more than twenty-four hours. Continuing on, the next step 1820 in the method is injecting the carrier liquid 1502 into the well 1620 and reservoir. This step 1820 may include initially introducing the carrier liquid 1502 into the well 1620 by, for example, signaling the storage truck or other supply source 1726 containing the carrier liquid 1502 to begin pumping the carrier liquid 1502 into the well 1620 via the wellhead 1626. Also included in this step 1820 may be halting the flow of carrier liquid 1502 into the well 1620 by, for example, signaling the storage truck, or supply source 1622 to stop the flow of carrier liquid 1502. Carrier liquid 1502 can be injected at rates of about 2 barrels/minute (bbl/min.) (84 gallons/min.) to greater than 200 bbl/min. (8400 gallons/min).

The next step 1830 asks if the previous operations will be repeated. If the well 1620 requires additional treatment, for example, to divert the flow of carrier liquid 1502 from additional low stress zones 1610 that were formed from the previous operations to newer high stress zones 1614 for fracturing. Criteria indicating the need for a re-treatment may, for example, be if the carrier liquid 1502 experiences a high pressure, which may indicate the presence of a higher stress zone that may potentially fracture. On the other hand, lower pressure in the well 1620 may indicate the carrier fluid 1502 is infiltrating lower stress zones. In this situation, the operations may be repeated or ended depending on the particulars of the situation. If the operation is to be repeated, gas 1616 may be re-injected into the well 1620 and reservoir for additional treatment as described previously with respect to step 1800 of the method. The entire cycle of steps 1800, 1810, and 1820 may be repeated any number of times until the end of treatment, at step 1840. The methods as described herein can be used to stimulate or treat vertical, deviated, or horizontal wells.

Figure 19:
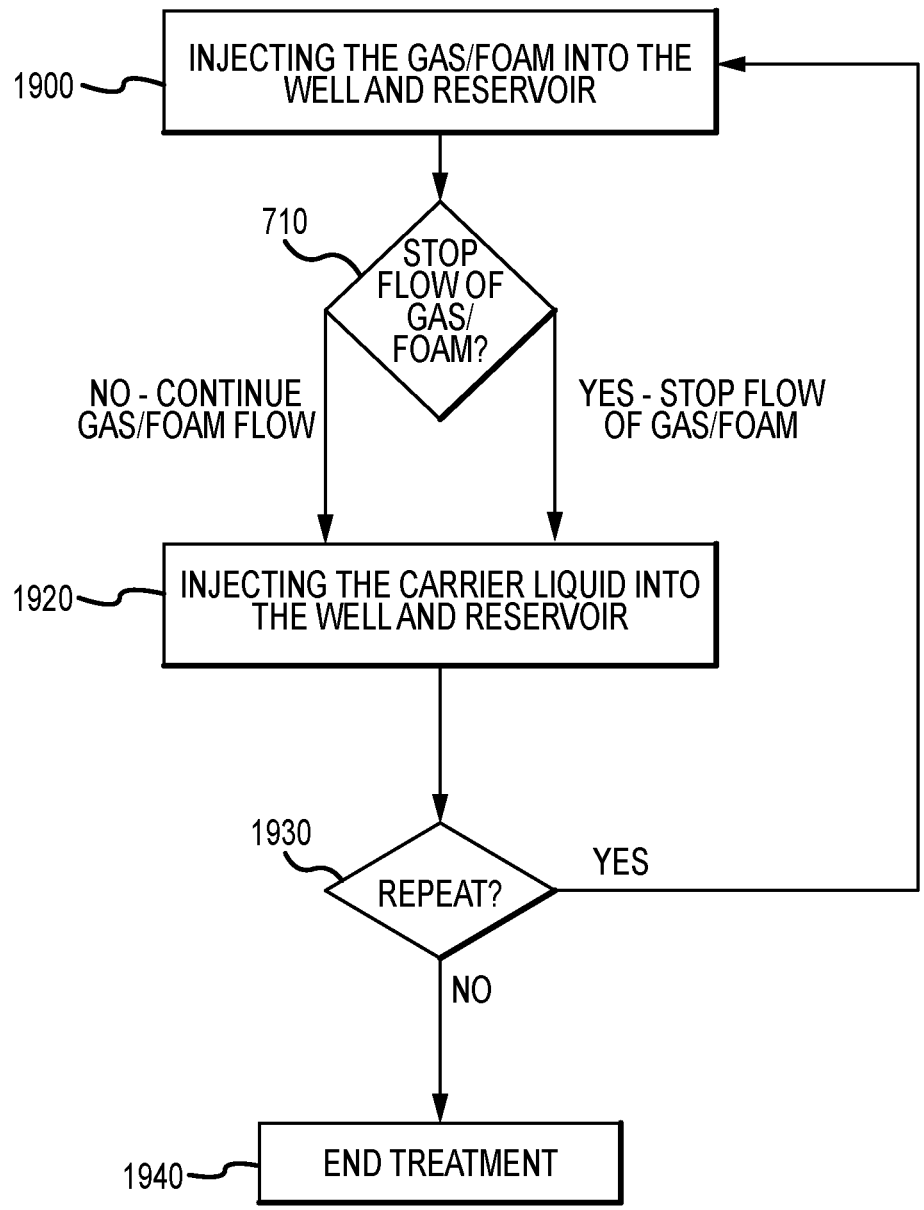
FIG. 19 is a flowchart illustrating another set of steps in utilizing the diversion technique described herein.

Reference is now made to the flowchart of FIG. 19. As seen in the figure, a first step 1900 of the method includes injecting the gas or foam 1616 into the well 1620 and reservoir. The next step 1910 asks whether the flow of gas or foam 1616 will be stopped before the carrier liquid 1502 is injected into the well 1620 and reservoir. In certain implementations, the flow of gas or foam 1616 may stop and the carrier liquid 1502 may be subsequently injected into the well 1620, as was shown in FIG. 18. In other implementations, the flow of gas or foam 1616 may continue or not be stopped. In these implementations, the carrier liquid 1502 may be injected into the well 1620 at step 1920 while the foam or gas 1616 is also or simultaneously flowing into the well 1620. Next, the previous steps 1900, 1910, 1920 may be repeated, if desired. The treatment may be ended at step 1940.

Figure 20:
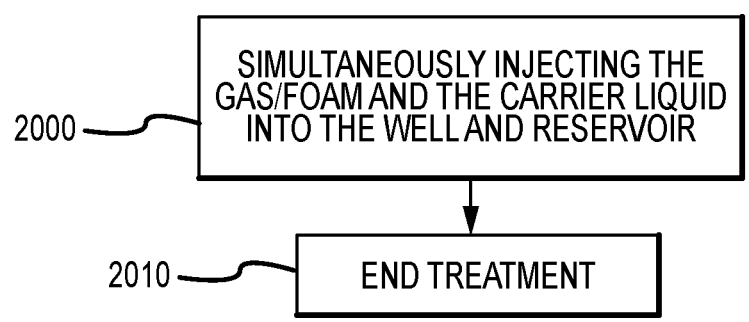
FIG. 20 is a flowchart illustrating yet another set of steps in utilizing the diversion technique described herein.

Turning to the flowchart of FIG. 20, at step 2000, the gas or foam 1616 and the carrier liquid 1502 may be simultaneously injected into the well 1620 and reservoir without any previous injections of the gas or foam 1616 into the well 1620. The gas or foam 1616 and the carrier liquid 1502 may be connected at the wellhead 1626 to be delivered downhole. The gas or foam 1616 may mix with the carrier liquid 1502 at the wellhead 1626 or within the wellbore 1618. This step 2000 may continue until the end of treatment at step 2010.

Various modifications and additions can be made to the exemplary embodiments discussed without departing from the spirit and scope of the presently disclosed technology. For example, while the embodiments described above refer to particular features, the scope of this disclosure also includes embodiments having different combinations of features and embodiments that do not include all of the described features. Accordingly, the scope of the presently disclosed technology is intended to embrace all such alternatives, modifications, and variations together with all equivalents thereof.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of influencing behavior of a subterranean formation, comprising:
    (a) injecting a pressurized fluid comprising a gas into at least two injection wells to pressurize pre-existing fractures of the subterranean formation adjacent to the at least two injection wells, the at least two injection wells being spatially proximate to a target well of the subterranean formation, and increase a pressure of the at least two injection wells; and
    (b) maintaining, for a suitable injected fluid dwell time, the pressurized fluid in the pressurized pre-existing fractures while a carrier liquid is introduced into the target well to induce hydraulic fracturing in the target well,
    wherein the target well and the injection wells are not all collinear, and
    wherein the pressurized fluid is maintained at an injection pressure below a fracture gradient of the subterranean formation during the duration of steps (a) and (b), and wherein the carrier liquid is injected into the target well at a sufficient pressure above the fracture gradient to fracture the subterranean formation.

2. The method of claim 1, wherein step (a) influences one or more of fracturing characteristics or patterns and hydrocarbon fluid production in the target well, and wherein the fluid is injected into the at least two injection wells at an injection pressure less than a fracture gradient of a selected formation along a wellbore of the at least two injection wells.

3. The method of claim 1, wherein a portion of the pressurized fluid occupies the pressurized pre-existing fractures in the at least two injection wells at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area, wherein the pressurized fluid is injected into the at least two injection wells through a wellhead and a wellbore of the at least two injection wells, and wherein the pressurized fluid infiltrates and occupies pore volumes of the subterranean formation in a far afield area of the subterranean formation to a distance of between about 10 feet and about 3,000 feet from the wellbore.

4. The method of claim 3, wherein the pressurized fluid comprises no more than about 1% by volume solid particulates, wherein the carrier liquid comprises a proppant, wherein both the pressurized fluid and the carrier liquid are substantially incompressible, wherein at least a portion of the pressurized fluid occupies pressurized features in the at least two injection wells at a pressure sufficient to cause the carrier liquid to be diverted to fracture additional features of the subterranean formation to form additional fractures or pore volumes, wherein the pressurized fluid diverts the carrier liquid from fracturing a previously stimulated area and forces the carrier liquid to fracture a previously unstimulated area, and wherein pressurization of the features in the at least two injection wells by the pressurized fluid inhibits fracturing of the pressurized features by the carrier liquid in the target well.

5. The method of claim 1, wherein pressurization of the pre-existing fractures adjacent to the at least two injection wells by the pressurized fluid inhibits fracturing of the pressurized pre-existing fractures by the carrier liquid in the target well, wherein a dwell time of the pressurized fluid in the at least two injection wells is at least about 5 minutes, and wherein the pressurized fluid infiltrates and occupies pore volumes of the subterranean formation in a far afield area of the subterranean formation to a distance of between about 100 feet and about 5,000 feet from a wellbore of the at least two injection wells.

6. The method of claim 5, and wherein the dwell time is between about 5 minutes and about 24 hours.

7. The method of claim 1, wherein a portion of the pressurized fluid occupies the pressurized pre-existing fractures in the at least two injection wells at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area, wherein the pressurized fluid migrates through a stimulation network of manmade and naturally occurring fractures and/or pore volumes to create a barrier, wherein the carrier liquid comprises a proppant, and wherein the pressurized fluid comprises at least one material selected from the group consisting of nitrogen, hydrogen, methane, ethane, propane, butane, carbon dioxide, and an inert gas.

8. The method of claim 1, wherein a portion of the pressurized fluid occupies the pressurized pre-existing fractures in the at least two injection wells at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area, and wherein step (b) is started before completion of step (a).

9. The method of claim 1, wherein pressurization of the pre-existing fractures adjacent to the at least two injection wells by the pressurized fluid inhibits fracturing of the pressurized pre-existing fractures by the carrier liquid in the target well, and wherein step (b) is started after completion of step (a).

10. The method of claim 1, wherein the pressurized fluid is free of liquid.

11. The method of claim 1, wherein the pressurized fluid comprises no more than about 50 volume % liquid.

12. The method of claim 1, wherein the pressurized fluid is free of solid particulates.

13. The method of claim 1, wherein the pressurized fluid comprises no more than about 5 volume % solid particulates.

14. A method of influencing behavior of a subterranean formation, comprising:
(a) injecting a pressurized fluid comprising a gas into an injection well to pressurize pre-existing fractures of the subterranean formation adjacent to the injection well, the injection well being spatially proximate to a target well of the subterranean formation, and increase a pressure of the injection well; and
(b) maintaining, for a suitable injected fluid dwell time, the pressurized fluid in the pressurized pre-existing fractures while a carrier liquid is introduced into the target well to induce fracturing in the target well,
wherein the pressurized fluid is maintained at an injection pressure below a fracture gradient of the subterranean formation during the duration of steps (a) and (b), and wherein the carrier liquid is injected into the target well at a sufficient pressure above the fracture gradient to fracture the subterranean formation.

15. The method of claim 14, wherein a portion of the pressurized fluid occupies the pressurized pre-existing fractures in the injection well at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area, wherein step (a) influences one or more of fracturing characteristics or patterns and hydrocarbon fluid production in the target well.

16. The method of claim 14, wherein pressurization of the pre-existing fractures adjacent to the injection well by the pressurized fluid inhibits fracturing of the pressurized pre-existing fractures by the carrier liquid in the target well, wherein the pressurized fluid is injected into the injection well through a wellhead and a wellbore of the injection well, and wherein the pressurized fluid infiltrates and occupies pore volumes of the subterranean formation in a far afield area of the subterranean formation to a distance of between about 10 feet and about 3,000 feet from the wellbore.

17. The method of claim 14, wherein a portion of the pressurized fluid occupies the pressurized pre-existing fractures in the injection well at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area, wherein a dwell time of the pressurized fluid in the injection well is at least about 5 minutes, wherein the carrier liquid comprises a proppant, and wherein the pressurized fluid infiltrates and occupies pore volumes of the subterranean formation in a far afield area of the subterranean formation to a distance of between about 100 feet and about 5,000 feet from the wellbore.

18. The method of claim 17, wherein the pressurized fluid comprises no more than about 1% by volume solid particulates, and wherein the dwell time is between about 5 minutes and about 24 hours.

19. The method of claim 17, wherein the pressurized fluid comprises no more than about 1% by volume solid particulates, wherein the carrier liquid comprises a proppant, wherein both the pressurized fluid and the carrier liquid are substantially incompressible, wherein at least a portion of the pressurized fluid occupies pressurized features in the injection well at a pressure sufficient to cause the carrier liquid to be diverted to fracture additional features of the subterranean formation to form additional fractures or pore volumes, wherein the pressurized fluid diverts the carrier liquid from fracturing a previously stimulated area and forces the carrier liquid to fracture a previously unstimulated area, and wherein pressurization of the features in the injection well by the pressurized fluid inhibits fracturing of the pressurized features by the carrier liquid in the target well.

20. The method of claim 14, wherein the pressurized fluid comprises no more than about 1% by volume solid particulates, wherein the pressurized fluid migrates through a stimulation network of manmade and naturally occurring fractures and/or pore volumes to create a barrier, and wherein the pressurized fluid comprises at least one material selected from the group consisting of nitrogen, hydrogen, methane, ethane, propane, butane, carbon dioxide, and an inert gas.

21. The method of claim 14, wherein a portion of the pressurized fluid occupies the pressurized pre-existing fractures in the injection well at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area, and wherein step (b) is started before completion of step (a).

22. The method of claim 14, wherein pressurization of the pre-existing fractures adjacent to the injection well by the pressurized fluid inhibits fracturing of the pressurized pre-existing fractures by the carrier liquid in the target well, and wherein step (b) is started after completion of step (a).

23. The method of claim 14, wherein the pressurized fluid is free of liquid.

24. The method of claim 14, wherein the pressurized fluid comprises no more than about 50 volume % liquid.

25. The method of claim 14, wherein the pressurized fluid is free of solid particulates.

26. The method of claim 14, wherein the pressurized fluid comprises no more than about 5 volume % solid particulates.

27. A method of influencing behavior of a subterranean formation, comprising:
(a) injecting a pressurized fluid comprising a gas into at least one injection well to pressurize pre-existing fractures of the subterranean formation adjacent to at least one injection well, the at least one injection well being spatially proximate to a target well of the subterranean formation, and increase a pressure of the at least one injection well; and
(b) after starting step (a), introducing a carrier liquid into the target well to induce fracturing in the target well, wherein the pressurized fluid is maintained at an injection pressure below a fracture gradient of the subterranean formation during the duration of steps (a) and (b) to inhibit hydraulic fracturing of the pressurized pre-existing fractures adjacent to the at least one injection well by the carrier liquid in the target well, wherein the carrier liquid is injected into the target well at a sufficient pressure above the fracture gradient to fracture the subterranean formation.

28. The method of claim 27, wherein the pressurized fluid comprises no more than about 50 volume % liquid.

29. The method of claim 27, wherein the pressurized fluid is free of solid particulates.

30. The method of claim 27, wherein the pressurized fluid comprises no more than about 5 volume % solid particulates.

31. The method of claim 27, wherein the pressurized fluid is free of liquid.

32. The method of claim 27, wherein pressurization of the pre-existing fractures adjacent to at least one injection well by the pressurized fluid inhibits fracturing of the pressurized pre-existing fractures by the carrier liquid in the target well.

33. The method of claim 27, wherein a portion of the pressurized fluid occupies the pressurized pre-existing fractures in the at least one injection well at a sufficient pressure to cause the carrier liquid to be diverted to fracture additional features of the subterranean formation to form additional fractures or pore volumes, wherein the pressurized fluid diverts the carrier liquid from fracturing a previously stimulated area comprising the pre-existing fractures and forces the carrier liquid to fracture a previously unstimulated area.

* * * * *